(12) United States Patent
Hendrey et al.

(10) Patent No.: US 12,348,527 B2
(45) Date of Patent: Jul. 1, 2025

(54) TENANT-SPECIFIC SOLUTION SUBSCRIPTIONS FOR AN EXTENSIBILITY PLATFORM

(71) Applicant: Cisco Technology, Inc., San Jose, CA (US)

(72) Inventors: Geoffrey R. Hendrey, San Anselmo, CA (US); Manpreet Singh, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 18/129,442

(22) Filed: Mar. 31, 2023

(65) Prior Publication Data

US 2023/0319054 A1   Oct. 5, 2023

Related U.S. Application Data

(60) Provisional application No. 63/326,012, filed on Mar. 31, 2022.

(51) Int. Cl.
*H04L 9/40* (2022.01)
*G06F 16/27* (2019.01)

(52) U.S. Cl.
CPC ............ *H04L 63/105* (2013.01); *G06F 16/27* (2019.01); *H04L 63/102* (2013.01)

(58) Field of Classification Search
CPC ...... H04L 63/105; H04L 63/102; G06F 16/27
See application file for complete search history.

(56) References Cited

U.S. PATENT DOCUMENTS 8,978,122 B1 * 3/2015 Zolfonoon .......... H04L 63/0815
                                                                 726/8
9,043,458 B2 * 5/2015 Balaji ..................... H04L 67/10
                                                                 709/224

(Continued)

FOREIGN PATENT DOCUMENTS

CN         103699824 A        4/2014

OTHER PUBLICATIONS

Abeysinghe, et al., "Cell-Based Architecture—A Decentralized Reference Architecture for Cloud-native Applications", online: https://github.com/wso2/reference-architecture/blob/master/reference-architecture-cell-based.md, winter 2022, 28 pages.

(Continued)

*Primary Examiner* — El Hadji M Sall
(74) *Attorney, Agent, or Firm* — BEHMKE INNOVATION GROUP LLC; James M. Behmke

(57) ABSTRACT

According to one or more embodiments of the disclosure, an example method herein may comprise: providing access to a plurality of solution packages in a global repository associated with an extensibility platform, wherein the extensibility platform is a multi-celled architecture, the plurality of solution packages having specific configurations for execution of the extensibility platform; determining one or more tenants of a particular cell of the multi-celled architecture; and synchronizing one or more particular solution packages of the plurality of solution packages from the global repository to the particular cell based on one or more tenants of the particular cell and subscriptions of the one or more tenants to the one or more particular solution packages.

20 Claims, 39 Drawing Sheets

(56) References Cited

U.S. PATENT DOCUMENTS

| | | |
|---|---|---|
| 9,710,430 B2 | 7/2017 | Werner |
| 9,971,590 B2 | 5/2018 | Hoff et al. |
| 10,838,714 B2 | 11/2020 | Sanghvi et al. |
| 10,986,065 B1 | 4/2021 | Farhangi et al. |
| 11,258,797 B2 | 2/2022 | Wilson et al. |
| 11,314,601 B1 | 4/2022 | Natanzon et al. |
| 11,321,196 B1 | 5/2022 | Kobayashi et al. |
| 11,507,363 B2 | 11/2022 | Totale et al. |
| 2005/0050141 A1 | 3/2005 | An et al. |
| 2008/0288465 A1 | 11/2008 | Payton et al. |
| 2009/0177988 A1 | 7/2009 | Martins |
| 2009/0183185 A1 | 7/2009 | Srour et al. |
| 2010/0161648 A1 | 6/2010 | Eberlein et al. |
| 2011/0219354 A1 | 9/2011 | Zhang et al. |
| 2012/0084261 A1 | 4/2012 | Parab |
| 2012/0131646 A1 | 5/2012 | Chandolu et al. |
| 2014/0172914 A1 | 6/2014 | Elnikety et al. |
| 2014/0237560 A1 | 8/2014 | Knjazihhin et al. |
| 2014/0289391 A1 | 9/2014 | Balaji et al. |
| 2015/0067641 A1 | 3/2015 | Nyisztor et al. |
| 2015/0254289 A1 | 9/2015 | Junkergard et al. |
| 2015/0296000 A1 | 10/2015 | Chandramouli et al. |
| 2015/0324391 A1 | 11/2015 | Werner |
| 2015/0379082 A1 | 12/2015 | Hu et al. |
| 2016/0092455 A1 | 3/2016 | Pedapudi et al. |
| 2016/0352745 A1 | 12/2016 | Ilieva et al. |
| 2017/0177305 A1 | 6/2017 | Charfi et al. |
| 2017/0236212 A1* | 8/2017 | Purville ................ G06Q 40/12 705/30 |
| 2017/0255886 A1 | 9/2017 | Schmidt et al. |
| 2018/0173561 A1 | 6/2018 | Moroski et al. |
| 2019/0079788 A1 | 3/2019 | Ruty et al. |
| 2019/0205230 A1 | 7/2019 | Basham et al. |
| 2019/0306237 A1 | 10/2019 | Srinivasan et al. |
| 2019/0362087 A1 | 11/2019 | Ferrans et al. |
| 2020/0021615 A1 | 1/2020 | Wainner et al. |
| 2020/0052957 A1 | 2/2020 | Tubillara et al. |
| 2020/0053087 A1 | 2/2020 | Wilson et al. |
| 2020/0073896 A1 | 3/2020 | Nagaraj et al. |
| 2020/0073987 A1 | 3/2020 | Perumala et al. |
| 2020/0081727 A1* | 3/2020 | Ahluwalia .............. H04L 67/34 |
| 2020/0137097 A1 | 4/2020 | Zimmermann et al. |
| 2020/0192773 A1 | 6/2020 | Savino et al. |
| 2020/0274472 A1 | 8/2020 | Liu et al. |
| 2020/0349513 A1 | 11/2020 | Farah |
| 2021/0042098 A1 | 2/2021 | Madisetti et al. |
| 2021/0360083 A1 | 11/2021 | Duggal et al. |
| 2022/0012045 A1 | 1/2022 | Rudraraju et al. |
| 2022/0035714 A1 | 2/2022 | Schultz et al. |
| 2022/0171648 A1 | 6/2022 | Rodriguez et al. |
| 2022/0318060 A1 | 10/2022 | Choochotkaew et al. |

OTHER PUBLICATIONS

Lin, et al., "A multi-dimensional extensible cloud-native service stack for enterprises", Journal of Cloud Computing, 2022, 11:83, 18 pages.

Ma, et al., "Configuration-Driven Data Pipeline", online: https://learn.microsoft.com/en-us/azure/architecture/solution-ideas/articles/configuration-driven-data-pipeline, accessed Feb. 27, 2023, 7 pages.

Miller, Jim, Flexible Meta Models and IBM Cognos Framework Manager, online: https://blogs.perficient.com/2014/05/29/flexible-meta-models-and-ibm-cognos-framework-manager/, May 29, 2014, accessed Mar. 6, 2023, 17 pages.

"Webinar—Bring Extensibility into Your Data Pipelines with Snowflake", online: https://resources.snowflake.com/webinars-thought-leadership/webinar-bring-extensibility-into-your-data-pipelines-with-snowflake, Jul. 9, 2020, 1 page.

Yan, et al., "Multi-SQL: An extensible multi-model data query language", online: arXiv:2011.08724v1, Nov. 2020, 16 pages.

Zhou, et al., "DB2MMT: A massive multi-tenant database platform for cloud computing", 2011 Eighth IEEE International Conference on e-Business Engineering, Oct. 2011, pp. 335-340, IEEE Computer Society.

* cited by examiner

1210:
```
# For service instances, copy all matching attribute names to properties and remaining to
# tags (match by convention)
scopeFilter: containsAll(resourceAttributes, ["service.namespace", "service.name", "service.instance.id"])
fmmType: service.instance
```

1220:
```
# Copy all attributes starting with "service." to entity properties. Copy remaining to tags
scopeFilter: containsAll(resourceAttributes, ["service.namespace", "service.name", "service.instance.id"])
fmmType: service.instance
mappings:
  - to: attributes
    from: attributes.stream().filter (kv -> kv.getKey().startsWith("service."))
  - to: tags
    from: attributes.stream().filter(kv -> !kv.getKey().startsWith("service."))
```

1230:
```
#Define specific mappings for entity attribute and tags
scopeFilter: containsAll(resourceAttributes, ["service_name"])
fmmType: service
mappings:
  # Same mapping can be written concisely. See attributeNameMappings below.
  - to: attributes
    from: {"key": "service.name", "value": getValue(attributes, "service_name")}
           {"key": "business.unit", "value": getValue (attributes, "business_unit"))
    attributeNameMappings:
      service.name: service_name
    tagNameMappings:
  # Same mapping can be written concisely. See tagNameMappings below.
  - to: tags
    from: tags
      business.unit: business_unit
```

TENANT-SPECIFIC SOLUTION SUBSCRIPTIONS FOR AN EXTENSIBILITY PLATFORM

RELATED APPLICATION

This application claims priority to U.S. Prov. Appl. No. 63/326,012, filed Mar. 31, 2022, entitled TENANT-SPECIFIC SOLUTION SUBSCRIPTIONS FOR AN EXTENSIBILITY PLATFORM, by Hendrey, et al., the contents of which are incorporated herein by reference.

TECHNICAL FIELD

The present disclosure relates generally to computer systems, and, more particularly, to tenant-specific solution subscriptions for an extensibility platform.

BACKGROUND

The Internet and the World Wide Web have enabled the proliferation of web services available for virtually all types of businesses and many online applications now rely on a distributed set of web services to function. These web services introduce complex data dependencies, complex data handling configurations, and various other operational nuances, which make monitoring them particularly challenging. Indeed, the monitoring and logging of data across web services is currently handled today in a discrete and/or non-centralized fashion with respect to each web service. Doing so in this manner also makes it difficult to associate the logged data across the different web services. In addition, monitoring the web services in a discrete manner also runs the risk of breaking the software application already running in the cloud, such as when monitoring code is added for one web service without accounting for where that web service fits within the overall execution of the application and with respect to its dependencies, data handling, etc.

Monitoring the web services in a discrete manner has the additional consequence of requiring manual configuration across the various web services. As a result, developers are unable to package configurations for various web services in a prescriptive manner which limits monitoring software synchronization and use as per-user content. In addition, different tenants of the application (i.e., different users or organizations that share a single instance of the application), may still have different needs in terms of the monitoring.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 12 illustrates an example of resource mapping configurations;
FIG. 21A illustrates the entire example, and where
FIGS. 21B-21E illustrate respective quadrants of the example.

DESCRIPTION OF EXAMPLE EMBODIMENTS

Overview

Figure 1:
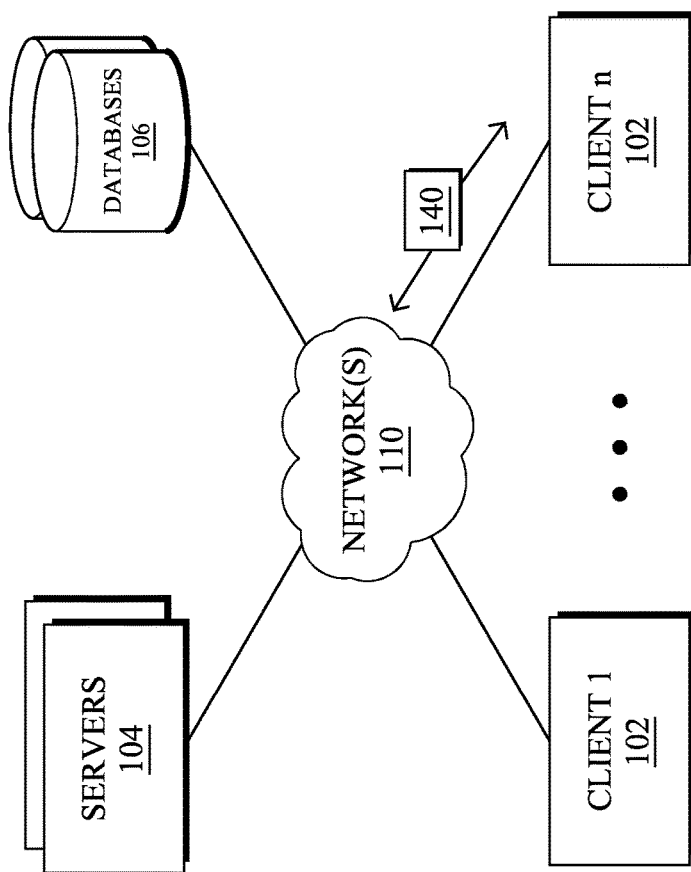
FIG. 1 illustrates an example computer network.

According to one or more embodiments of the disclosure, tenant-specific solution subscriptions for an extensibility platform are described herein. Such an extensibility platform provides for the monitoring of distributed web services in a centralized manner. In addition, the techniques herein are directed toward a JavaScript Object Notation (JSON) store for the extensibility platform that allows developers to package configurations in a prescriptive manner and referred to herein as a "solution." Solutions are synchronized from a global solution repository into the JSON store of each cell of a cell-based architecture, whereby each cell includes a logical grouping of connected web services. The services in a given cell then consume these configurations through a uniform JSON store application programming interface (API).

Specifically, according to one or more embodiments of the disclosure, an illustrative method herein may comprise: providing access to a plurality of solution packages in a global repository associated with an extensibility platform, wherein the extensibility platform is a multi-celled architecture, the plurality of solution packages having specific configurations for execution of the extensibility platform; determining one or more tenants of a particular cell of the multi-celled architecture; and synchronizing one or more particular solution packages of the plurality of solution packages from the global repository to the particular cell based on one or more tenants of the particular cell and subscriptions of the one or more tenants to the one or more particular solution packages Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
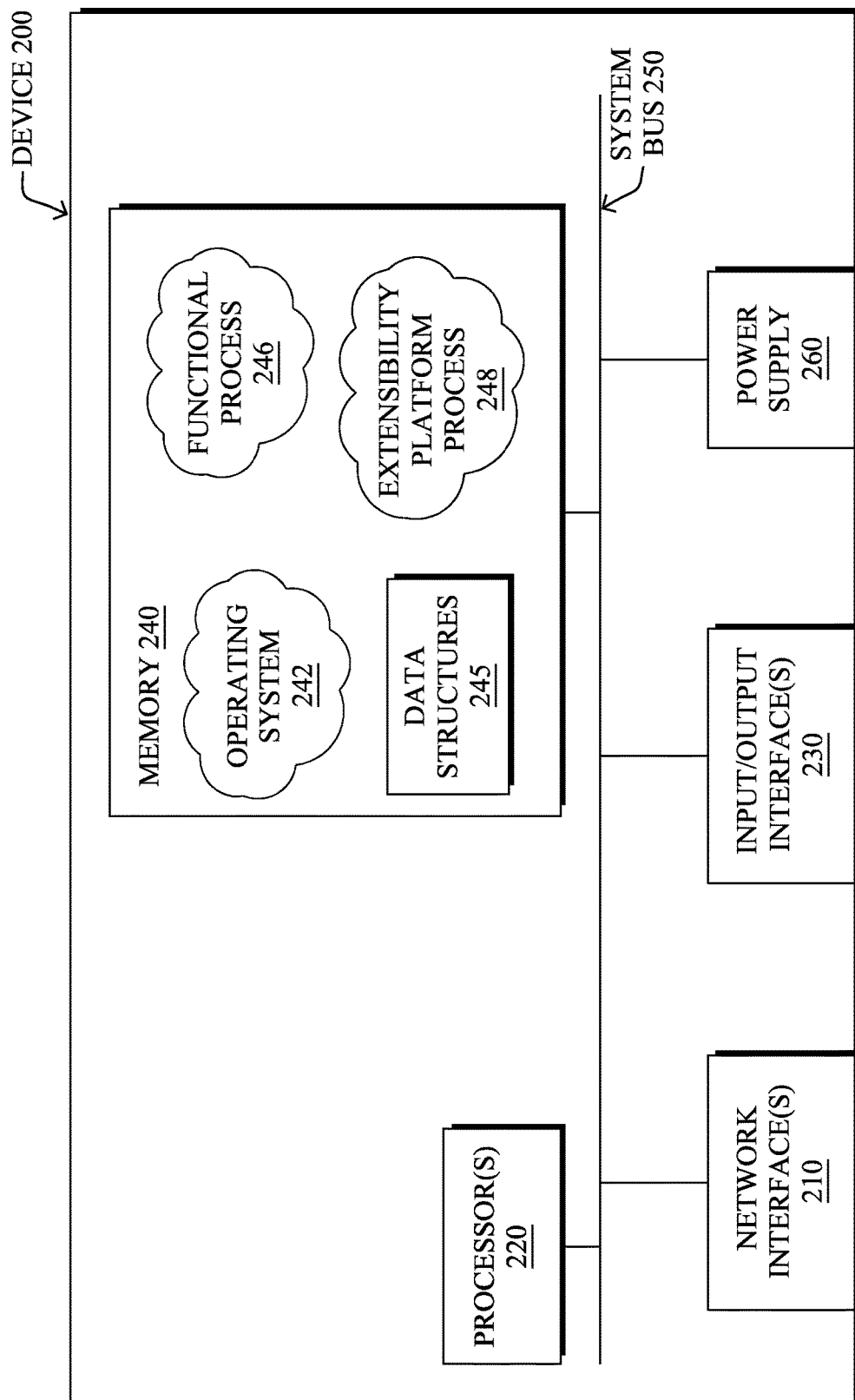
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "extensibility platform" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

———Observability Intelligence Platform———

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
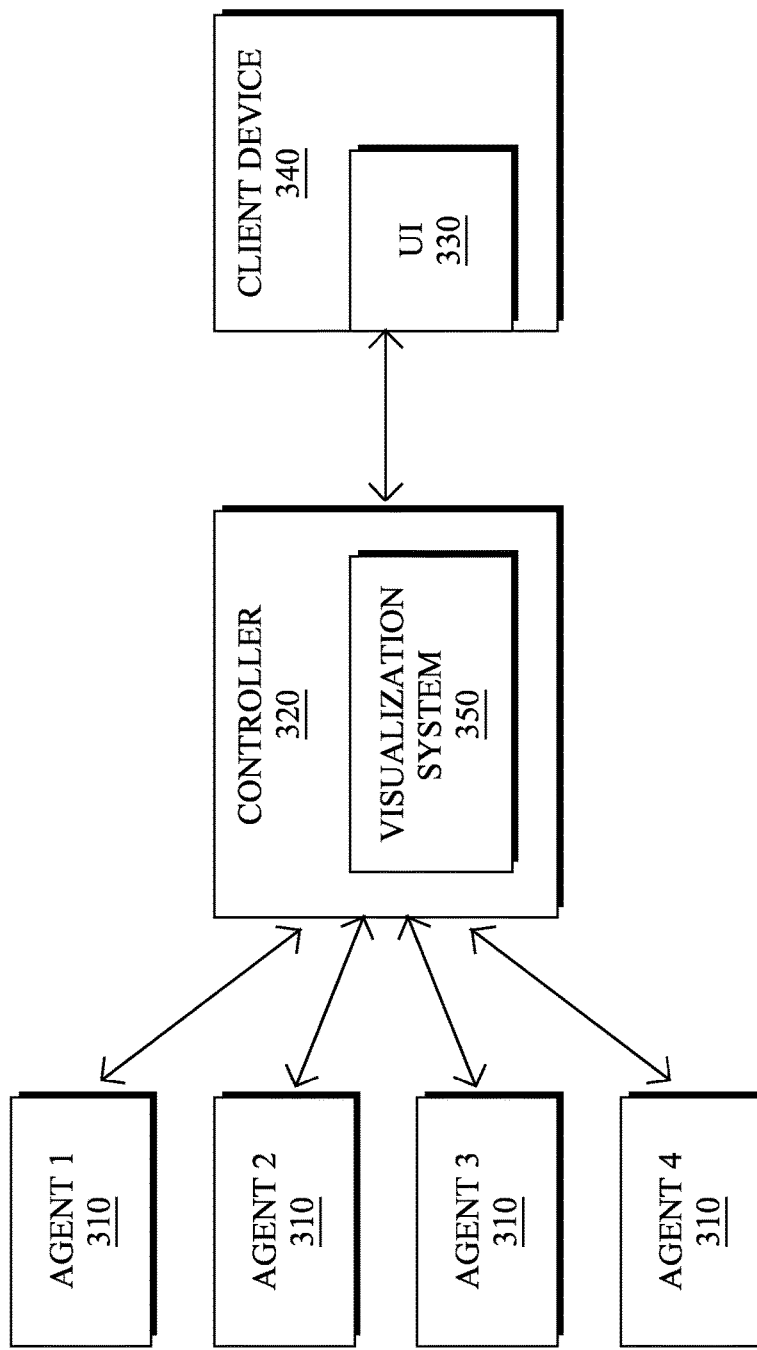
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——An Extensibility Platform——

One specific example of an observability intelligence platform above is the AppDynamics Observability Cloud (OC), available from Cisco Systems, Inc. of San Jose, California. The AppDynamics OC is a cloud-native platform for collecting, ingesting, processing and analyzing large-scale data from instrumented complex systems, such as Cloud system landscapes. The purpose of the platform is to host solutions that help customers to keep track of the operational health and performance of the systems they observe and perform detailed analyses of problems or performance issues.

Figure 4:
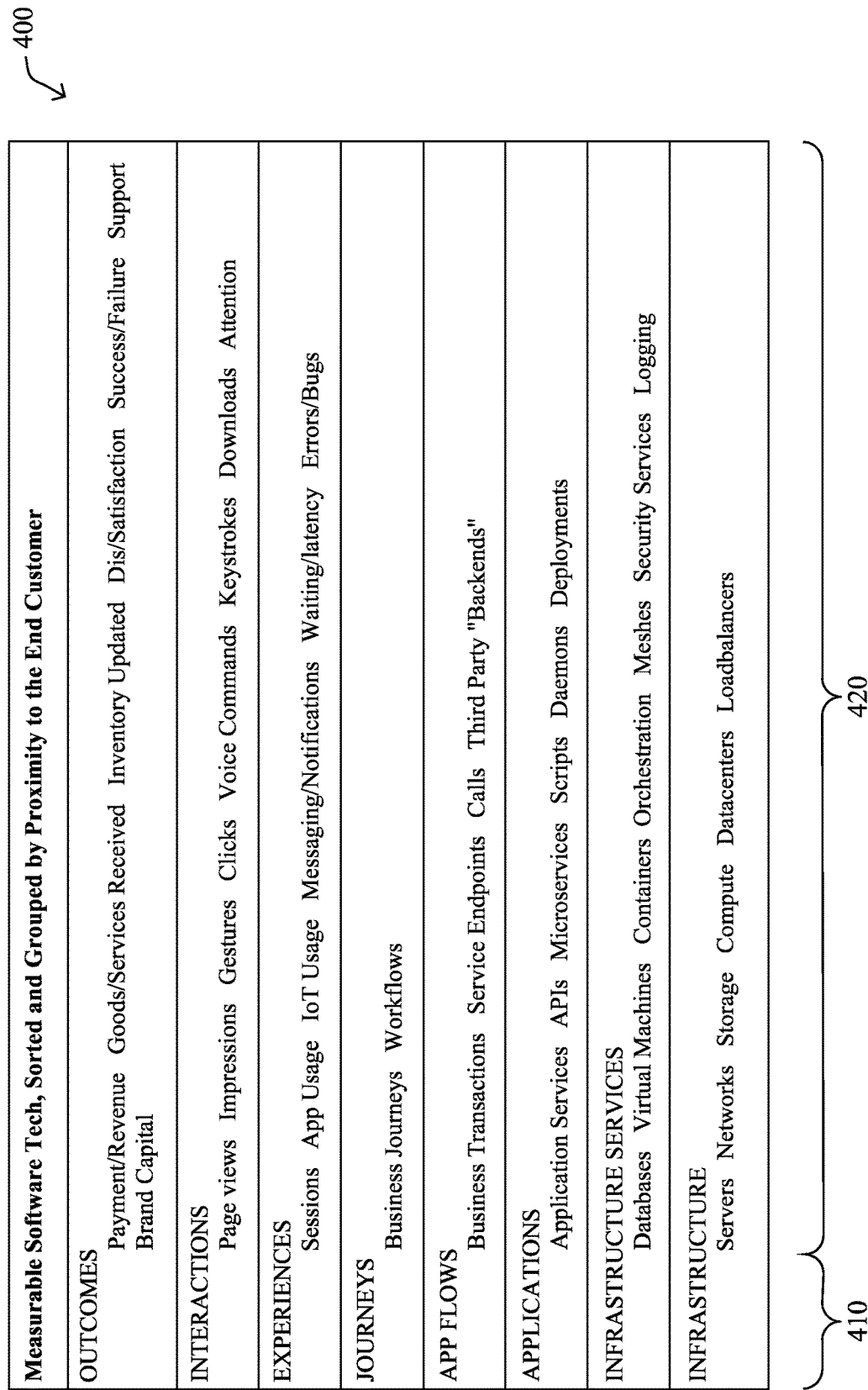
FIG. 4 illustrates an example of layers of full-stack observability.

AppDynamics OC is designed to offer full-stack Observability, that is, to cover multiple layers of processes ranging from low-level technical processes such as networking and computing infrastructure over inter-service communication up to interactions of users with the system and business processes, and most importantly, the interdependencies between them. FIG. 4, for example, illustrates an example

400 of layers of full-stack observability, demonstrating measurable software technologies, sorted and grouped by proximity to the end customer. For instance, the layers 410 and associated technologies 420 may be such things as:

Outcomes:
    payment/revenue; goods/services received; inventory updated; dissatisfaction/satisfaction; success/failure; support; brand capital; etc.

Interactions:
    page views; impressions; gestures; clicks; voice commands; keystrokes; downloads; attention; etc.

Experiences:
    sessions; app usage; IoT usage; messaging/notifications; waiting/latency; errors/bugs etc.

Journeys:
    business journeys; workflows; etc.

App Flows:
    business transactions; service endpoints; calls; third party "backends"; etc.

Applications:
    application services; APIs; microservices; scripts; daemons; deployments; etc.

Infrastructure Services:
    databases; virtual machines; containers; orchestration; meshes; security services; logging; etc.

Infrastructure:
    servers; networks; storage; compute; datacenters; load balancers; etc.

Each of these layers has different types of entities and metrics that need to be tracked. Additionally, different industries or customers may have different flavors of each layer or different layers altogether. The entirety of artifacts represented in each layer and their relationships can be described—independent of any digital representation—in a domain model.

In the development of a conventional application, the domain model is encoded in a data model which is pervasively reflected in the coding of all parts of a solution and thus predetermines all its capabilities. Any substantial extension of these capabilities requiring changes in the data model results in a full iteration of the software lifecycle, usually involving: Updating database schemas, data access objects, in-memory representation of data, data-processing algorithms, application interface (API), and user interface. The coordination of all these changes to ensure the integrity of the solution(s) is particularly difficult in cloud-native systems due to their distributed nature, and substantial teams in every software company are dedicated to this task.

The task becomes harder the more moving parts and the more actors are involved. But the sheer bandwidth of domain models and functionality hinted at in FIG. 4 above makes it all but impossible for a single company to deliver all the required solutions in a centralized development process. A platform thus should allow customers and partners to adapt and extend the solutions, or even provide entirely new solutions, with minimal risk of breaking or compromising the production system running in the cloud. The biggest challenge lies in the fact that all these solutions are not isolated from each other but must run for each tenant as an individually composed, integrated application sharing most of the data and infrastructure.

In order to make this possible, the techniques herein are directed at taking a novel approach to solution composition, informed by elements of model-driven architecture, graph data models, and modern pull-based software lifecycle management. That is, the techniques herein, therefore, are directed toward an extensibility platform that provides a solution packaging system that allows for data-type dependencies.

Figure 5:
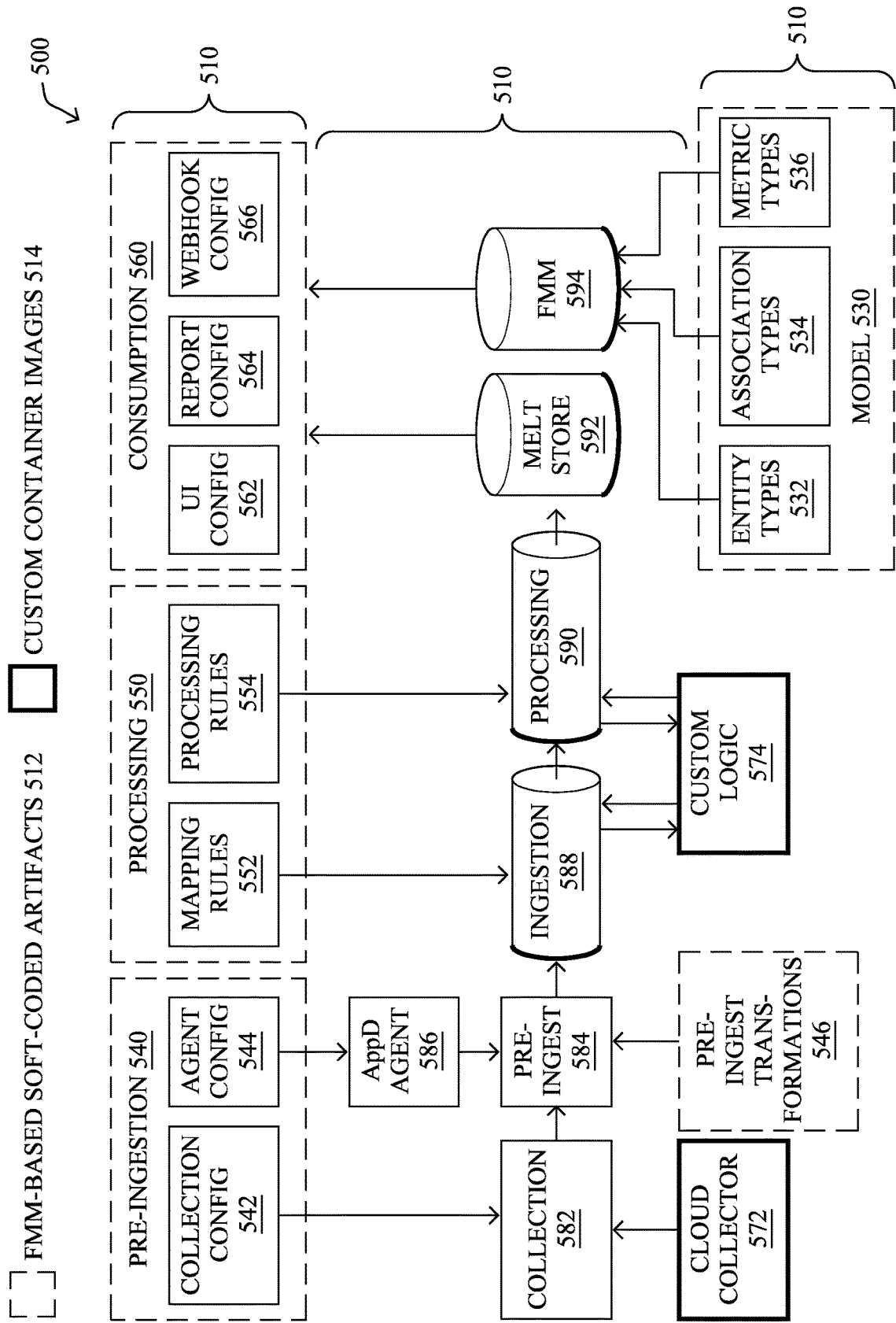
FIG. 5 illustrates an example platform data flow.

Operationally, the extensibility platform is built on the principle of strictly separating the solutions from the executing platform's technology stack in order to decouple their respective life cycles. The solutions are very much (e.g., almost entirely) model-driven, so that the platform can evolve and undergo optimizations and technological evolution without affecting the existing solutions. In the rare cases in which the models are not powerful enough, custom logic can be provided as a Function as a Service (FaaS) or container image exposing a well-defined service interface and running in a strictly controlled sandbox. FIG. 5, for instance, showing a platform data flow 500 (described further below), illustrates how different solution-specific artifacts 510 interact with the platform's core functionality 520 (e.g., the data flow in the middle).

Solutions herein thus provide artifacts that enrich, customize, or alter the behavior data ingestions, processing, and visualizations. This allows a company and/or application such as IT management companies/apps to provide a customized monitoring solution for data management platforms (e.g., NoSQL databases), for example, on the observability intelligence platform above. Such a custom solution may therefore include the definition of data management platform entities that are monitored, and the relationship between those entities, and their metrics. The example IT management app for data management platforms can also provide enrichments to the user interface, such as providing distinct iconography for their entities, and bundling dashboards and alerts that take particular advantage of data management platform-specific metrics, such as a data management platform heartbeat metric. This same system of packaging may be used to provision the system with having "core" domains specific to the illustrative observability intelligence platform, the only difference being that subscription to system apps is automatic. In addition, first party apps like EUM may also leverage the same system.

In particular, the extensibility platform techniques herein are directed to a solution packaging system that allows for data-type dependencies. It is essentially the JSON store and solution packaging that are collectively referred to herein as "Orion". The system is designed to allow modules to have dependencies like a traditional code/packaging system like java+maven, while simultaneously allowing these models to define their data model, access to that data model, packaging of objects conforming to other data solution data models, etc. This relies heavily on the concept of "layering", which is described further below in greater detail. While other systems may allow layering of local files, the ability to have layers that include global dynamic layers, as well as static global layers provided as part of a solution is never before seen, and solves a big problem.

As described herein, the techniques herein provide a system designed to provide "full stack observability" for distributed computer systems. That is, the system provides the ability to receive Metrics, Events, Logs, and Traces (MELT) data/signals in accordance with Open Telemetry standards. It also provides the ability to maintain an internal model of the actual entities being observed, as well as an ability to map incoming data/signals to entities under observation. Further, the extensibility platform herein provides the ability to query the entities of the system with regard to their associated MELT data/signals, and to infer health and other computed signals about entities. Entities may also be grouped together into composite entities to thus receive, generate, and maintain data/signals about composite entities, accordingly. Moreover, as detailed herein, the platform also has an openness to first, second, and third parties to "extend" all of the above so that the platform can continuously incorporate new use cases without each use case having to be "hand written" by the core engineering team.

The techniques herein also provide extensibility in a multi-tenant, app-aware, platform for MELT data processing, allowing for third parties to create solutions to which tenants can subscribe, and allowing for system capabilities to be defined and packaged in a way that is functionally identical to third party solutions. In addition, this allows third parties to extend the platform with capabilities not previously envisioned, such as, e.g., to augment the platform with new data types and storage for instances of those types, to augment the platform with new functions (lambda style), to augment the platform interfaces (REST, gRPC) with new APIs whose implementation is backed by lambda style functions and data storage, to augment the platform's built-in data processing in ways that benefit the solution without impacting tenants who have not subscribed to the solution, and so on.

Through providing extensibility in a multi-tenant, app-aware, platform for MELT data processing, the techniques herein also provide an extensible object modeling system for a multi-tenant microservices architecture. This allows dynamic composition of objects from mutable layers, which allows for applications/solutions to define object types, and for applications/solutions to bundle object instances (instances may be of a type defined by another solution that is a dependency or defined locally in the same solution). It also allows for tenants to override application/solution values, which enables tenants to customize the behavior of a solution.

The dynamic composition of objects from mutable layers also allows an implementation comprised of a tree-shaped object layering system with layers/awareness for, illustratively:
  depth 0 (tree root): global system settings/fields;
  depth 1: global application/solution constructs;
  depth 2: account (a collection of tenants spanning multiple cells);
  depth 3: tenant; and
  depth 4: user.

Moreover, the dynamic composition of objects from mutable layers further allows a communication system between globally distributed cells to enable each cell to have a synchronized local copy of the global layers, as well as a read-time composition system to compose object from layers.

The extensible object modeling system for a multi-tenant microservices architecture further provides a system for global solution management, which comprises a method of packaging apps/solutions, a method of declaring dependencies between solutions, a customer facing solution registry allowing developers to list their solutions, and so on.

The multi-tenant microservices architecture further provides a type system of meta-data for defining objects and their layers. That is, the techniques herein allow for specifying the shape of objects, declaring global/solution level object instances inside of solution packages, specifying which fields of the object support layering, specifying which fields are secrets, allowing inter-object references (e.g., allowing runtime spreading of fields to support inheritance and other use cases, allowing recursive prefetching of fields, allowing references to global object-layer-resident instances, etc.), and so on.

Additionally, the multi-tenant microservices architecture herein provides a system for managing object storage and retrieval by type. For instance, such a system may define a method of routing traffic to object stores based on the object type (e.g., a federation of object stores providing a single API/facade to access all types), as well as allowing atomic, eventually consistent maintenance of references between objects.

The extensible object modeling system for a multi-tenant microservices architecture additionally provides a system for ensuring atomicity of installation and updates to multi-object application/solutions across microservices in a cell. It also provides a library/client that allows pieces of our internal system to query and observe objects for changes (e.g., allowing MELT data ingestion pipeline to store configuration objects in memory, and avoiding having to query for "freshness" each time the object is needed).

As detailed herein, there are numerous concepts generally addressed by the extensibility platform of the present disclosure. Such concepts may comprise such things as:
  a programmable data ingestion framework;
  atomic maintenance of references between objects in a distributed type system;
  atomicity of keys in document shredding for domain events;
  automation of sagas in a distributed object store;
  type systems in functions as a service (FaaS);
  large scale data collection programmable by an end user;
  managing multi-tenancy in data ingestion pipeline;
  federation of a distributed object store;
  improvements to operations in a distributed object store;
  expression of user interface customization in terms of flexibly defined entity models;
  a system of type layering in a multitenant, global distributed system;
  customizing the inputs of a multi-tenant distributed system;
  management of secure keys in a distributed multi-tenant system;
  managing secure connections to external systems in a "bring your infrastructure" scenario;
  automating workflows for the collection of secrets in a layered configuration system;
  protecting developer secrets in FaaS environment;
  Optimization of FaaS using intelligent caching in a programmable distributed data environment;
  automating failover and restoration in a cell based architecture;
  a modular entity modeling system;
  a potential replacement for traditional telemetry for dashboards;
  eventually consistent deployment of artifacts in distributed data processing pipeline;
  Configuration-driven extensible MELT data processing pipeline;
  Extracting additional value from the MELT data via customizable workflows;
  Creating a graph-centric model from MELT data for observability;
  Tag-aware attribute based access control for distributed systems;
  Metadata-based graph schema definition;
  Ensuring fairness in a multi-tenant system via rate limiting;
  Configuration-driven Query Composition for Graph Data Structures;
  And so on.

Notably, and to aide in the discussion below, the smallest deployable unit of extension is a "solution", which is a package of models, configurations, and potentially container images for customizing extension points. Solutions can depend on other solutions. For example, a system health solution depends on a "Flexible Meta Model" (FMM) solution (described below), since health apps provide entities and metrics that depend on an FMM-type system. Core solutions may be automatically installed in each cell (e.g., similar to how certain platforms come with certain libs pre-installed with the system). Note further that a "solution artifact" is a JSON configuration file that a solution uses to configure an extension point.

An extension point, that is, is a part of the extensibility platform that is prepared to accept a configuration or other artifact to steer its behavior. Since the architecture of the extensibility platform herein is largely model-driven, most of the extensions can be realized by means of soft-coded artifacts: Model extensions and configurations expressed as JSON or other declarative formats. For instance, as shown in the extensibility platform data flow 500 in FIG. 5, soft-coded extension artifacts 512 are shown, while for more complex—or stateful—logic, services can be plugged in, i.e., custom container images 514. The extension points can be divided into four groups, Model, Pre-Ingestion, Processing, and Consumption, as shown:

Model 530 (e.g., entity types 532, association types 534, and metric types 536);
Pre-Ingestion 540 (e.g., collection configuration 542, agent configuration 544, and pre-ingestion transformations 546);
Processing 550 (e.g., mapping rules 552, and processing rules 554); and
Consumption. 560 (e.g., UI configuration 562, report configuration 564, and webhook configuration 566)

Moreover, custom container images 514 may comprise such things as a Cloud Collector 572 and Custom Logic 574.

As also shown in FIG. 5, the platform's core functionality 520 may comprise collection 582, pre-ingestion 584 (e.g., with agent configuration 544 coming via an observability or "AppD" agent 586), ingestion 588, processing 590, MELT store 592, and an FMM 594, with the functionalities being interconnected to each other and/or to the different solution-specific artifacts 510 as shown, and as generally described in detail herein.

Regarding details of the extensibility platform of the present disclosure, at the core of the extensibility platform herein is the Flexible Meta Model (FMM), which allows creation of models of each solution's specific artifacts, that is, entities (such as services or user journeys) and their associated observed data: Metrics, Events, Logs and Traces (together abbreviated as MELT).

Figure 6:
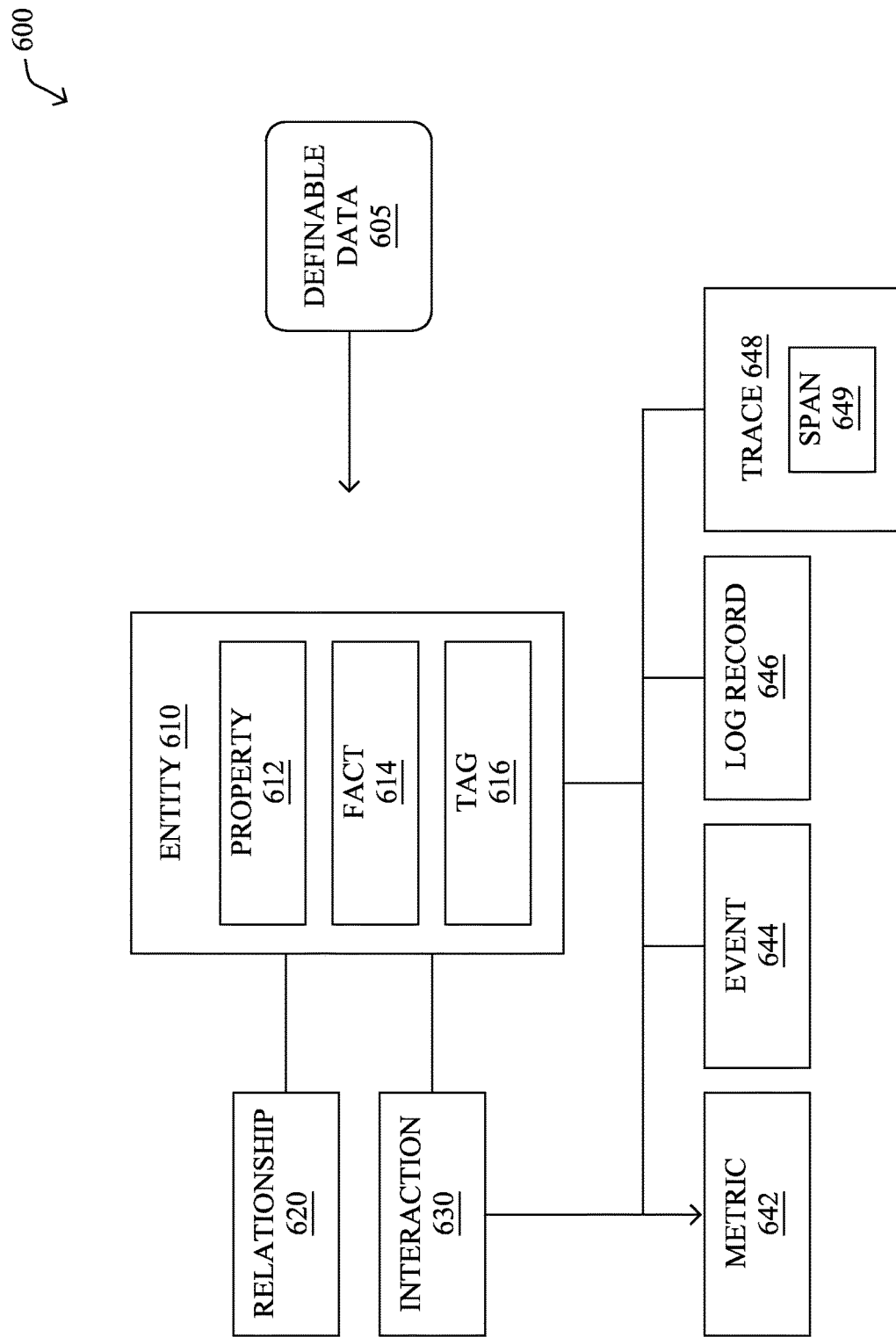
FIG. 6 illustrates an example of a Flexible Meta Model (FMM)

FIG. 6 shows a simplified schematic of the FMM 600. Each of the shaded boxes represents a "kind" of data 605 for which specific types (and instances) can be defined. Entity types 610 may have a property 612, fact 614, and tag 616. Examples for entity types 610 are: Service, Service Instance, Business Transaction, Host, etc.

Relationship types 620 define how entities are associated to each other (for example "contains" or "is part of"). Interaction types 630 describe how entities interact with each other. They combine the semantics of association types (e.g., a service "calls" a backend) with the capability of entity types to declare MELT data (Metric 642, Event 644, Log Record 646, and Trace 648 (with Span 649). In one embodiment, interaction types are treated just like entity types, though not so in other embodiments.

Figure 7A:
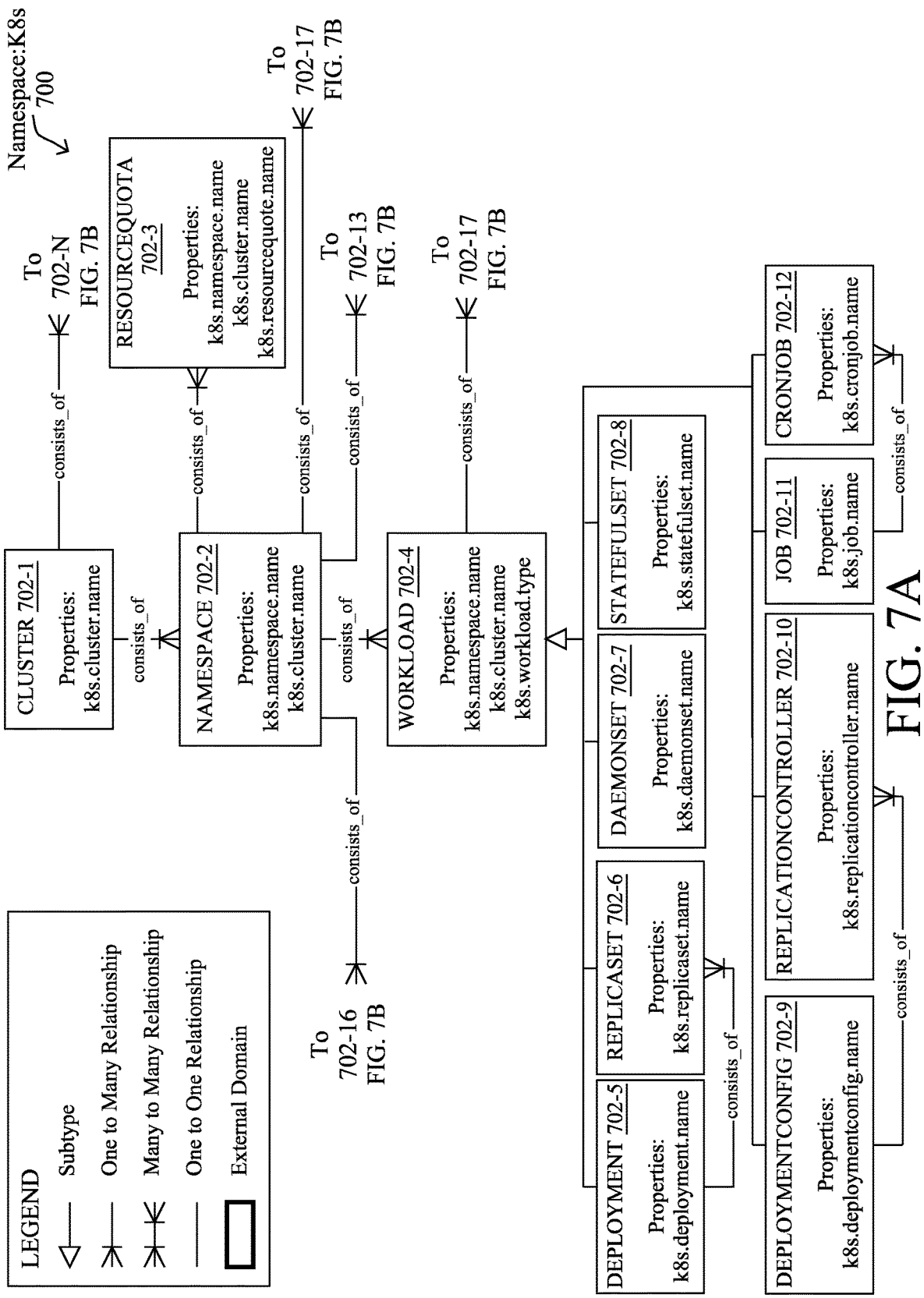
FIGS. 7A-7B illustrate a high-level example of a container orchestration domain model.
Figure 7B:
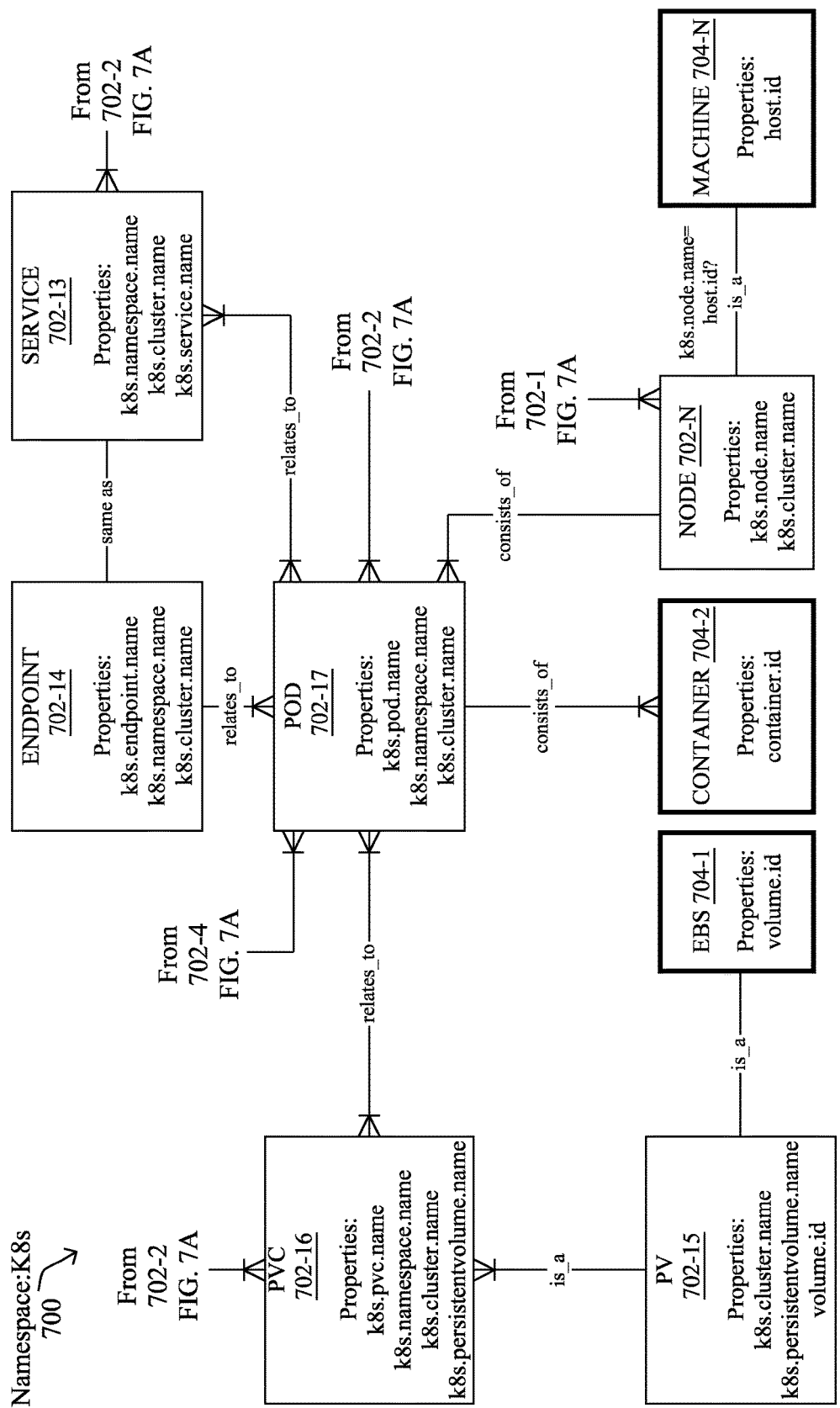

Based on this meta model, models of specific domains (such as a container orchestration) can be created. For instance, FIGS. 7A-7B illustrate a high-level example of a container orchestration domain model 700 (e.g., a Kubernetes or "K8s" domain model). The container orchestration domain model 700 may be made up of model components 702 (e.g., 702-1 . . . 702-N) organized with the illustrated relationships (e.g., subtype, one-to-many relationship, many-to-many relationship, one-to-one relationship). Additionally, the container orchestration domain model 700 may include model components that are external domain model components 704 (e.g., 704-1 . . . 704-N) that represent external domains sharing the illustrated relationships to the other model components 702. These models determine the content that a user eventually sees on their screen.

The description below provides greater details regarding the Flexible Meta Model (FMM) for an Extensibility Platform.

To complement this flexible metamodel, the platform has schema-flexible stores to hold the actual data: The graph-based entity store and schema-flexible stores for metrics, events, logs and traces respectively. Thus, a customer who wants to extend the data model just modifies the corresponding model in the FMM and can immediately start populating the data stores with the respective data, without having to make changes to the data stores themselves.

Corresponding changes in the models/configurations driving the data processing pipeline will immediately start generating the data to populate the stores according to the model changes. An important feature of the extensibility platform is that it doesn't treat the respective models of a solution (FMM data model, data processing and consumption models) in isolation. These models refer to each other (e.g., a UI field will have a reference to the field in the data model it represents) and the integrity and consistency of these mutual references is tracked and enforced.

The description below also provides greater details regarding these concepts within the FMM.

Notably, the description below provides greater details regarding Tenant-Specific Solution Subscriptions.

The extensibility platform herein is cloud-native, but at the same time, it allows every tenant to experience it as an individually configured application that reflects their specific business and angle of view. The tenants achieve this by selectively subscribing to solutions for each aspect of their business, and in some cases by even adding their own custom solutions.

Figure 8:
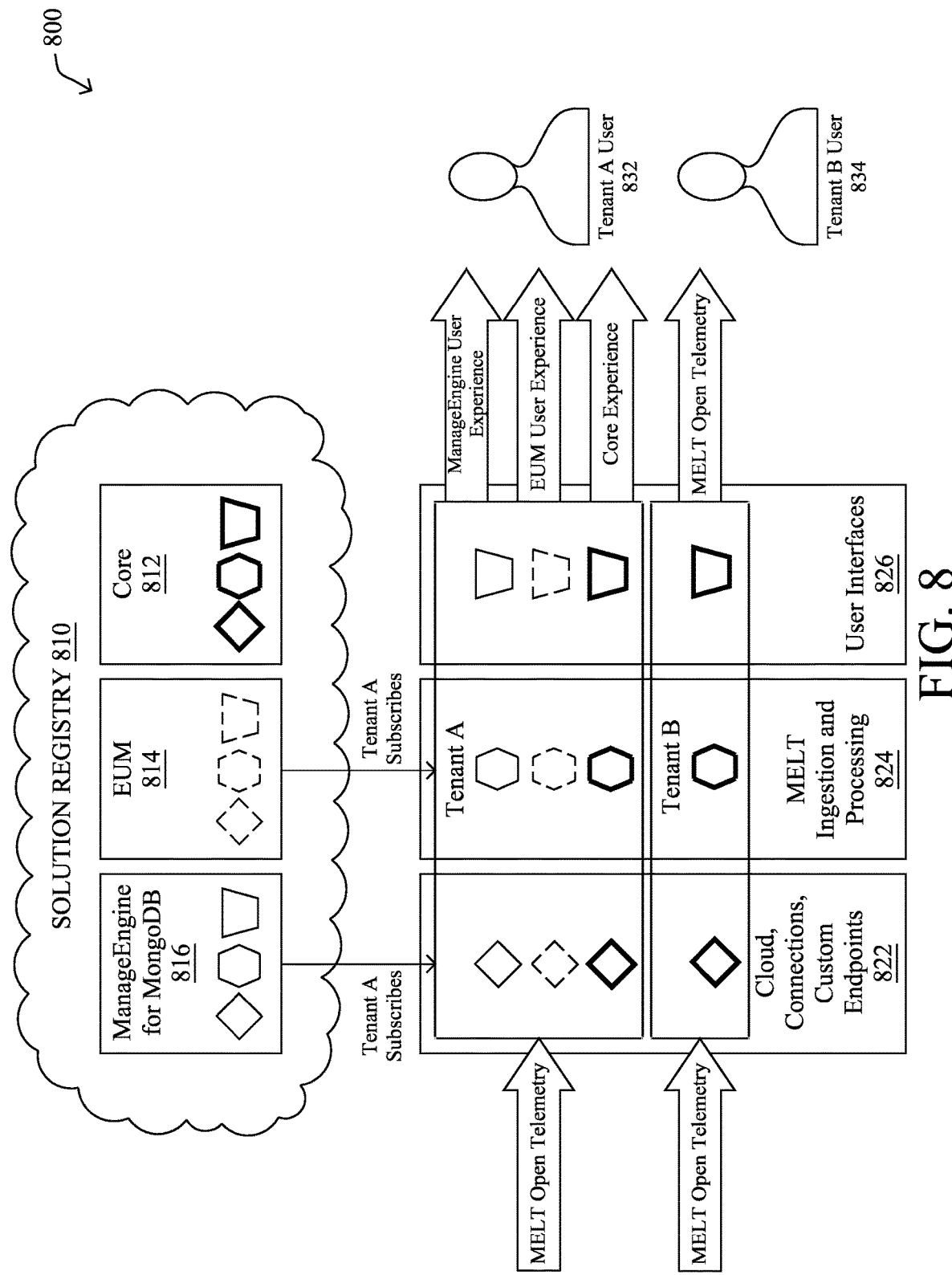
FIG. 8 illustrates an example of a sophisticated subscription and layering mechanism.

This is made possible by a sophisticated subscription and layering mechanism, illustrated in FIG. 8, illustrating tenant-specific behavior of the extensibility platform as a result of selective activation and layering of models. In this example mechanism 800, the solution registry 810 has three registered solutions, the platform core 812, End User Monitoring (EUM) 814 and a hypothetical third party solution, such as ManageEngine for MongoDB 816. Each of these solutions contains models for cloud connections and custom endpoints 822, MELT data ingestion and processing 824, and User Interfaces 826, respectively.

For each tenant (e.g., "A" or "B"), only the models that they are subscribed to are being used in the course of data collection, ingestion, processing and consumption, hence the experience of the tenant A user 832 in FIG. 8 is different from that of the tenant B user 834.

A particularly noteworthy characteristic of the platform herein is that these solutions don't necessarily live side-by-side. Rather, a solution can build on top of another solution, amend, and customize it. The final experience of tenant A user is therefore the result of the layering of the three subscribed solutions, where each can make modifications of the models of the layers below.

Notably, the scaling model of the extensibility platform herein is based on cells, where each cell serves a fixed set of tenants. Thus, the solution registry and model stores of each cell keep the superset of all the solutions (and the corresponding artifacts) to which the tenants of the cell have subscribed. When a tenant subscribes to a solution, the solution registry checks whether that solution is already present in the cell. If not, it initiates a pull from the solution repository.

Figure 9:
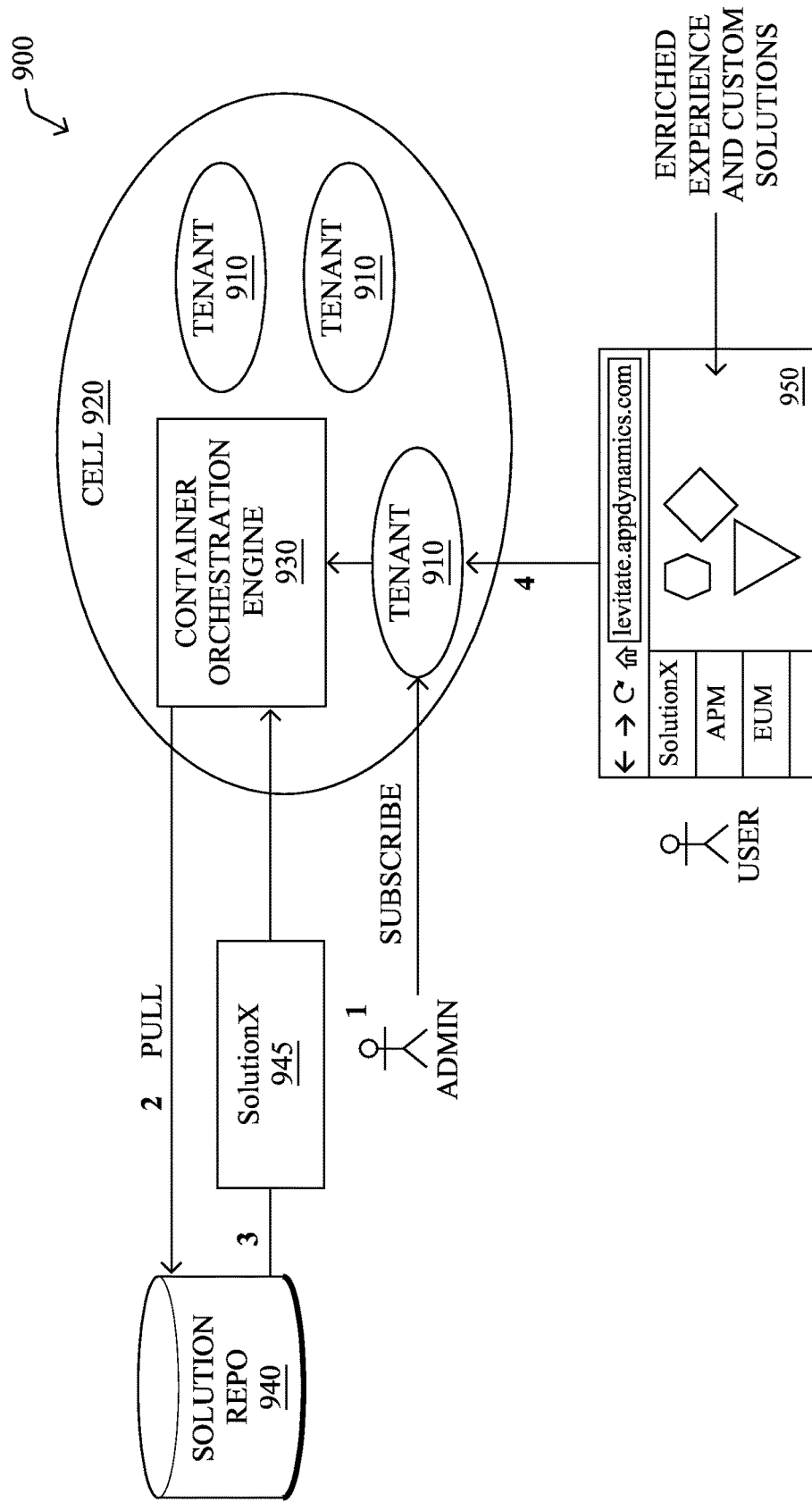
FIG. 9 illustrates an example interplay of tenant-specific solution subscription with cell management.

This concept is shown generally in FIG. 9, illustrating an example interplay 900 of tenant-specific solution subscription with cell management. In particular, tenants 910 exist within a cell 920, with an associated container orchestration engine 930 which pulls solutions 945 from a solution repository 940 ("solution repo"). A user interface 950 for the extensibility platform, such as an observability intelligence platform, can then illustrate an enhanced experience with custom solutions, accordingly.

Notably, in FIG. 9, when a solution is present in the cell (i.e., all its artifacts are present in the corresponding model stores), the solution is activated for the tenant. At that moment, the corresponding models/configurations will start taking effect.

Since the extensibility platform herein is a large distributed system, the models and configurations are not centrally stored but rather in multiple stores, each associated with one or more consumers of the respective model. Each of these stores is an instance of the same generic JSON store, and through routing rules, they are exposed as a single API with consistent behavior.

Figure 10:
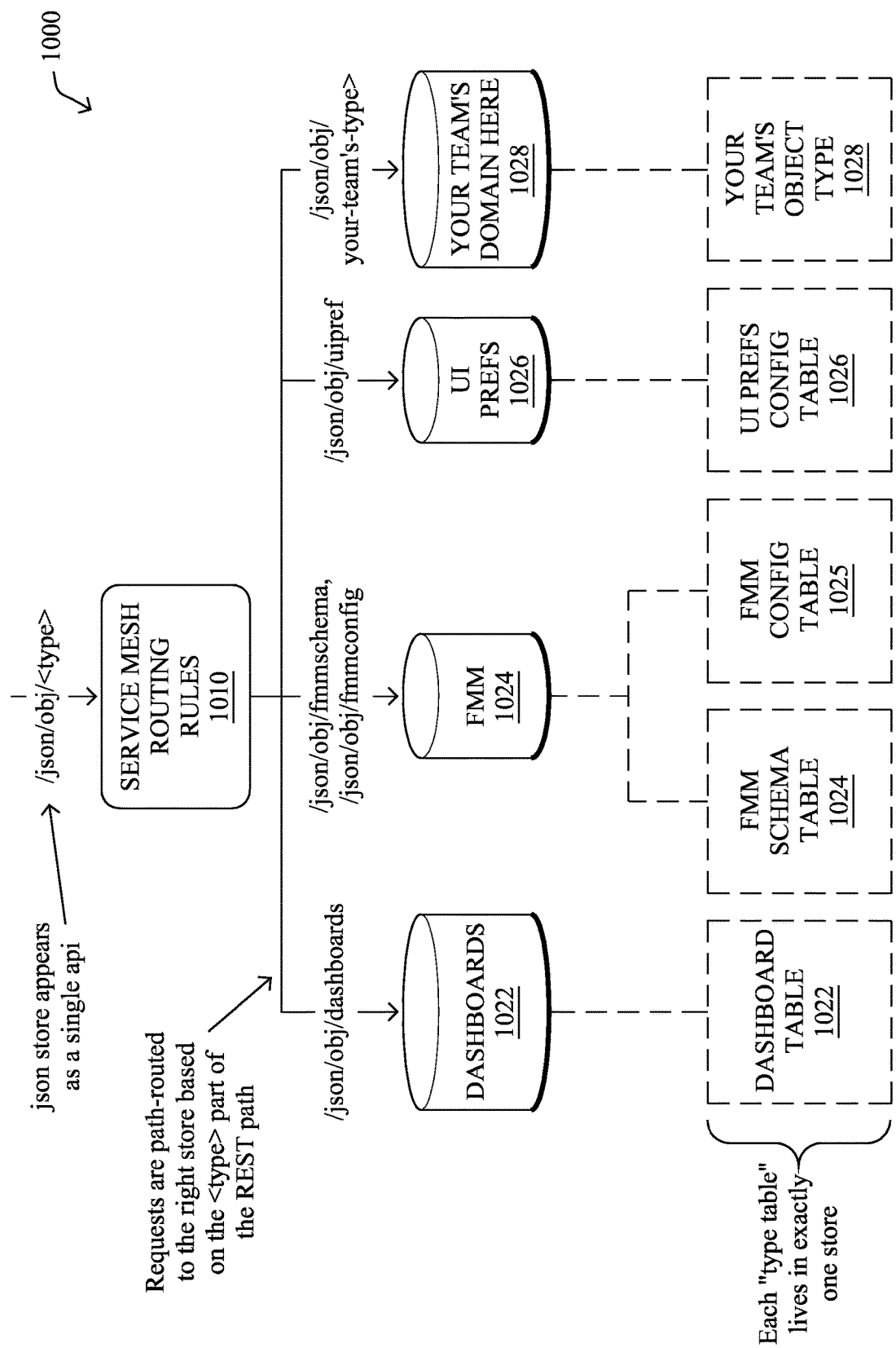
FIG. 10 illustrates an example of exposure of different configuration stores as a single API.

FIG. 10 illustrates an example 1000 of exposure of the different configuration stores as a single API. In particular, as shown, the JSON store appears as a single API and illustratively begins at service mesh routing rules 1010, where requests may be path-routed to the right store based on the <type> part of the REST path. The example stores may comprise dashboards 1022, FMM 1024, UI preferences 1026, custom stores 1028 (e.g., "Your Team's Domain Here"), and so on. From there, each "type table" lives in exactly one store. For instance, dashboard table 1032 (from dashboards 1022), FMM schema table 1034 or FMM config table 1035 (e.g., depending upon the access into FMM 1024), UI preferences config table 1036 from UI prefs 1026, and custom tables 1038 (e.g., from custom stores 1028, such as "Your Team's object type" from "Your Team's Domain Here").

Notably, the description below also provides greater details regarding the JSON object store.

Regarding a configuration-driven data processing pipeline herein, a core feature of the extensibility platform herein is its ability to ingest, transform, enrich, and store large amounts of observed data from agents and OpenTelemetry (OT) sources. The raw data at the beginning of the ingestion process adheres to the OpenTelemetry format, but is doesn't have explicit semantics. In a very simplified way, the raw data can be characterized as trees of key-value pairs and unstructured text (in the case of logs).

The purpose of the processing pipeline is to extract the meaning of that raw data, to derive secondary information, detect problems and indicators of system health, and make all that information "queryable" at scale. An important part of being queryable is the connection between the data and its meaning, i.e., the semantics, which have been modeled in the respective domain models. Hence the transformation from raw data to meaningful content can't be hard-coded, it should (e.g., must) be encoded in rules and configurations, which should (e.g., must) be consistent with the model of each domain.

Figure 11A:
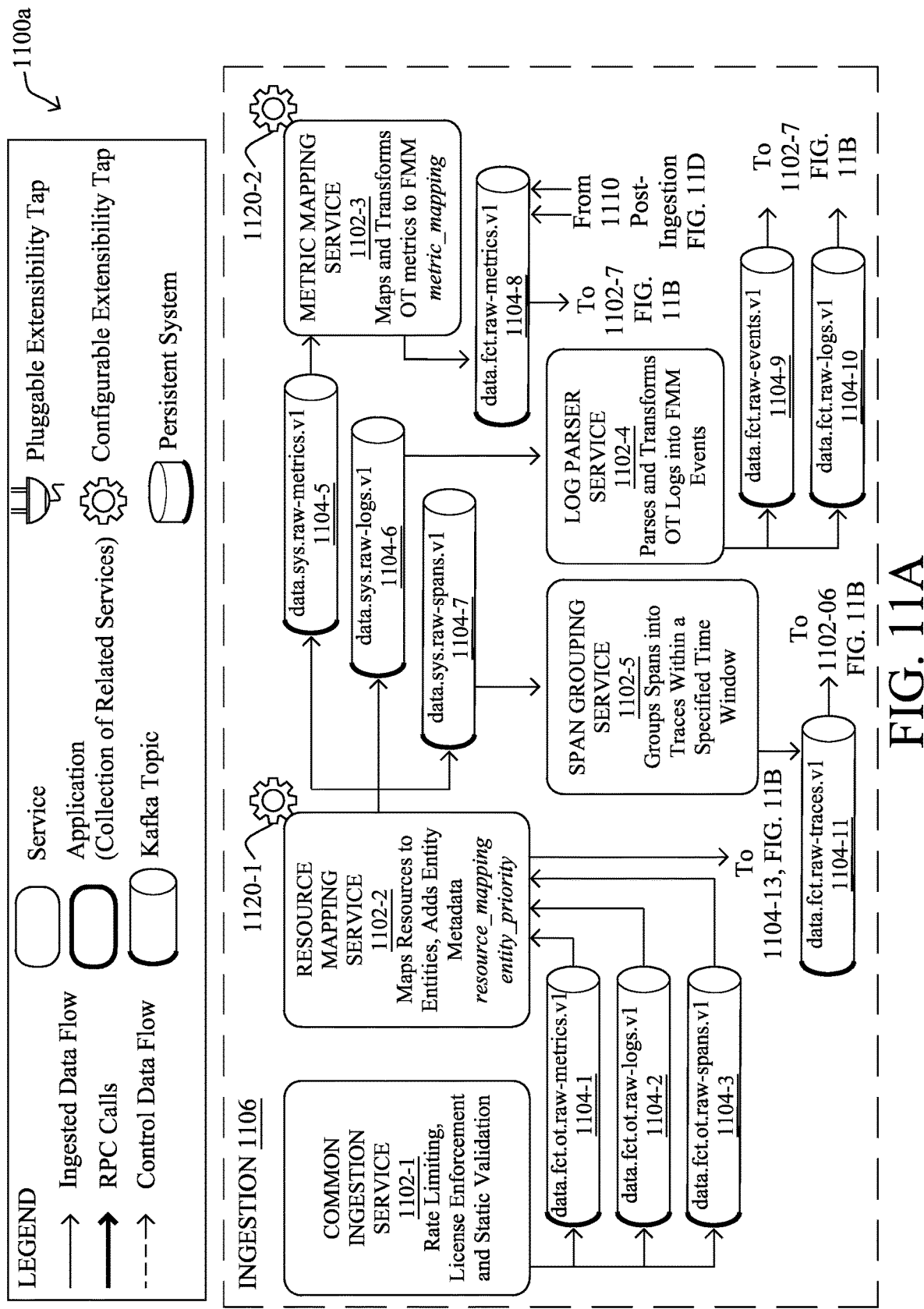
FIGS. 11A-11E illustrate an example of a common ingestion pipeline, in particular where each of FIGS. 11A-11E illustrate respective portions of the pipeline.
Figure 11B:
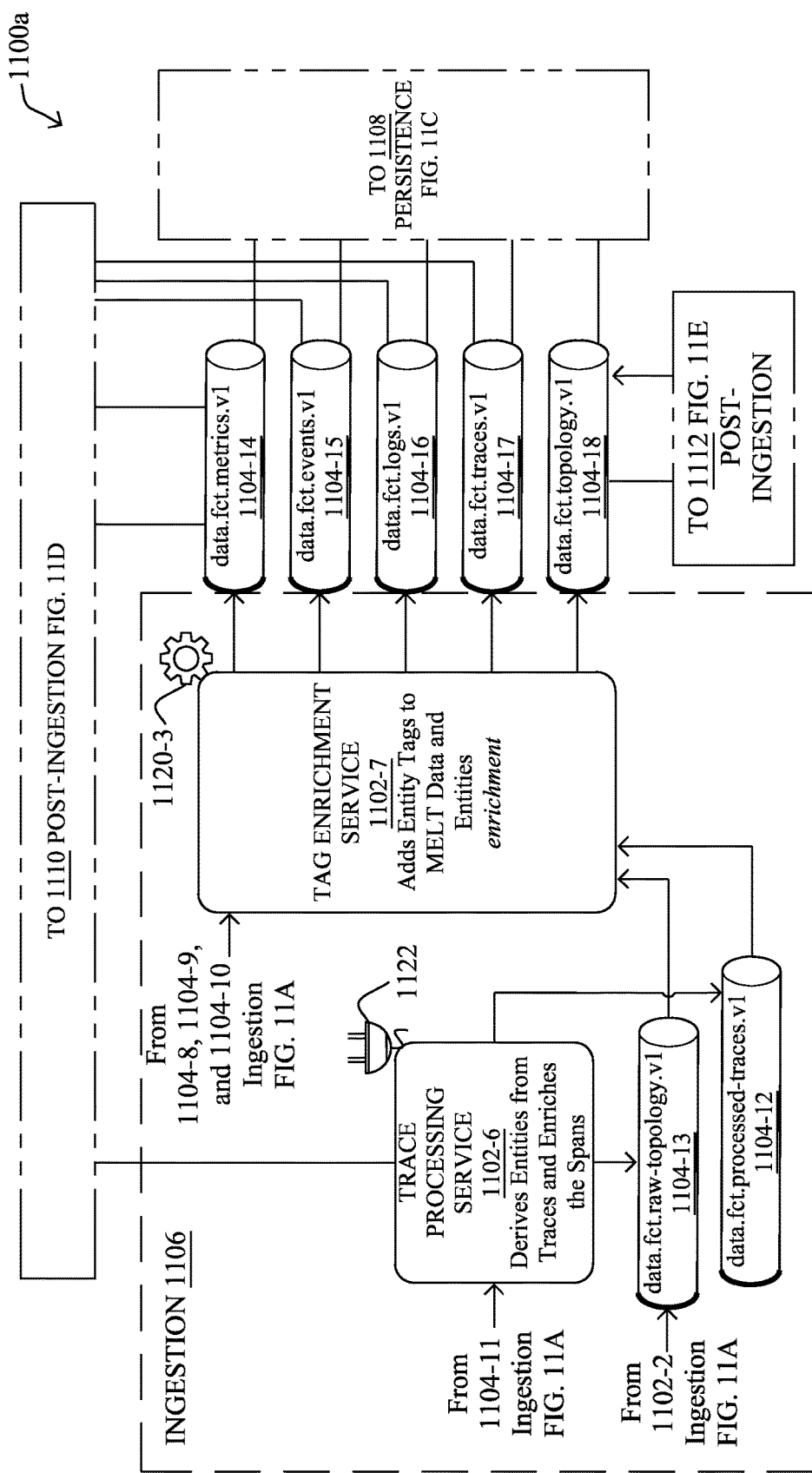
Figure 11C:
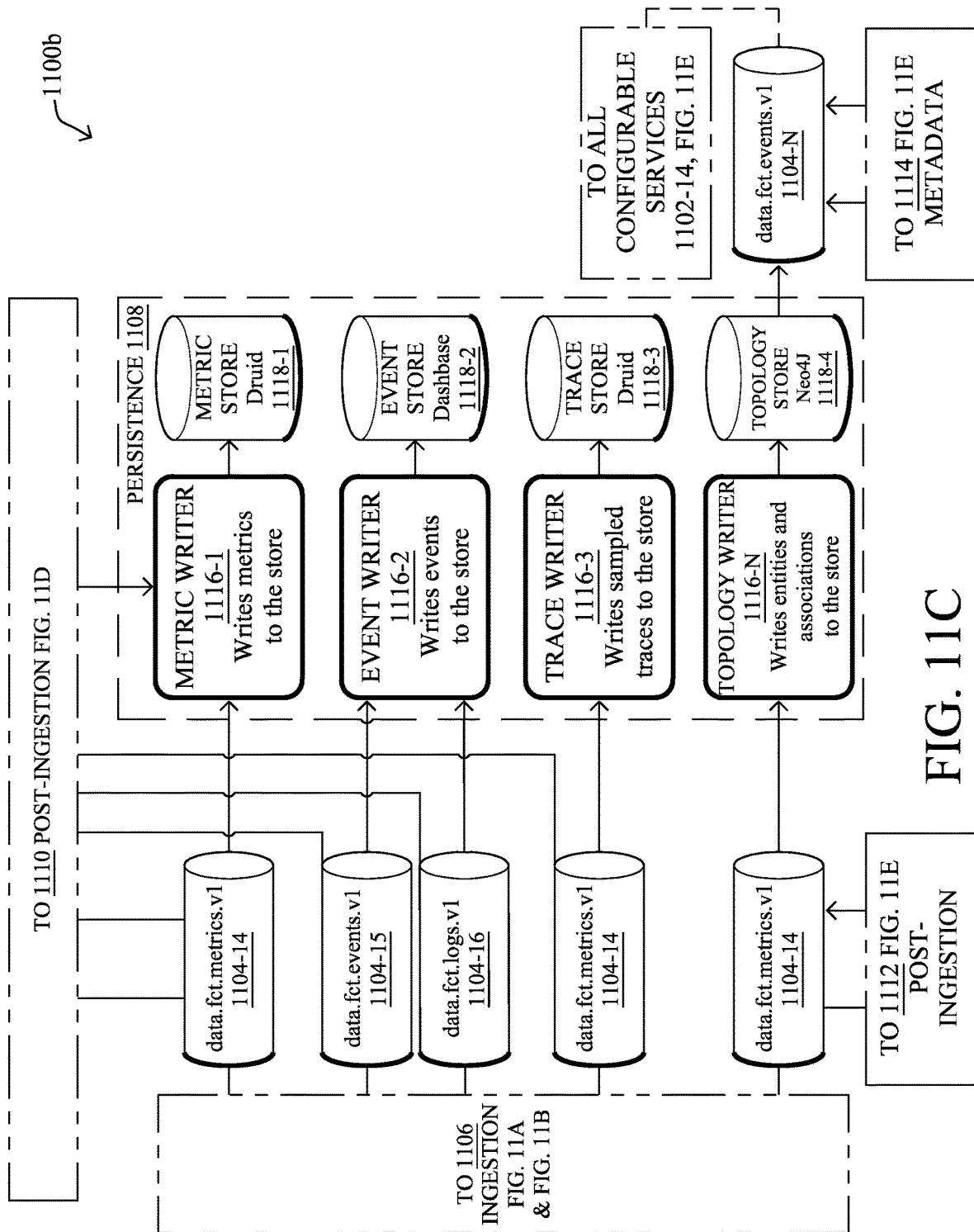
Figure 11D:
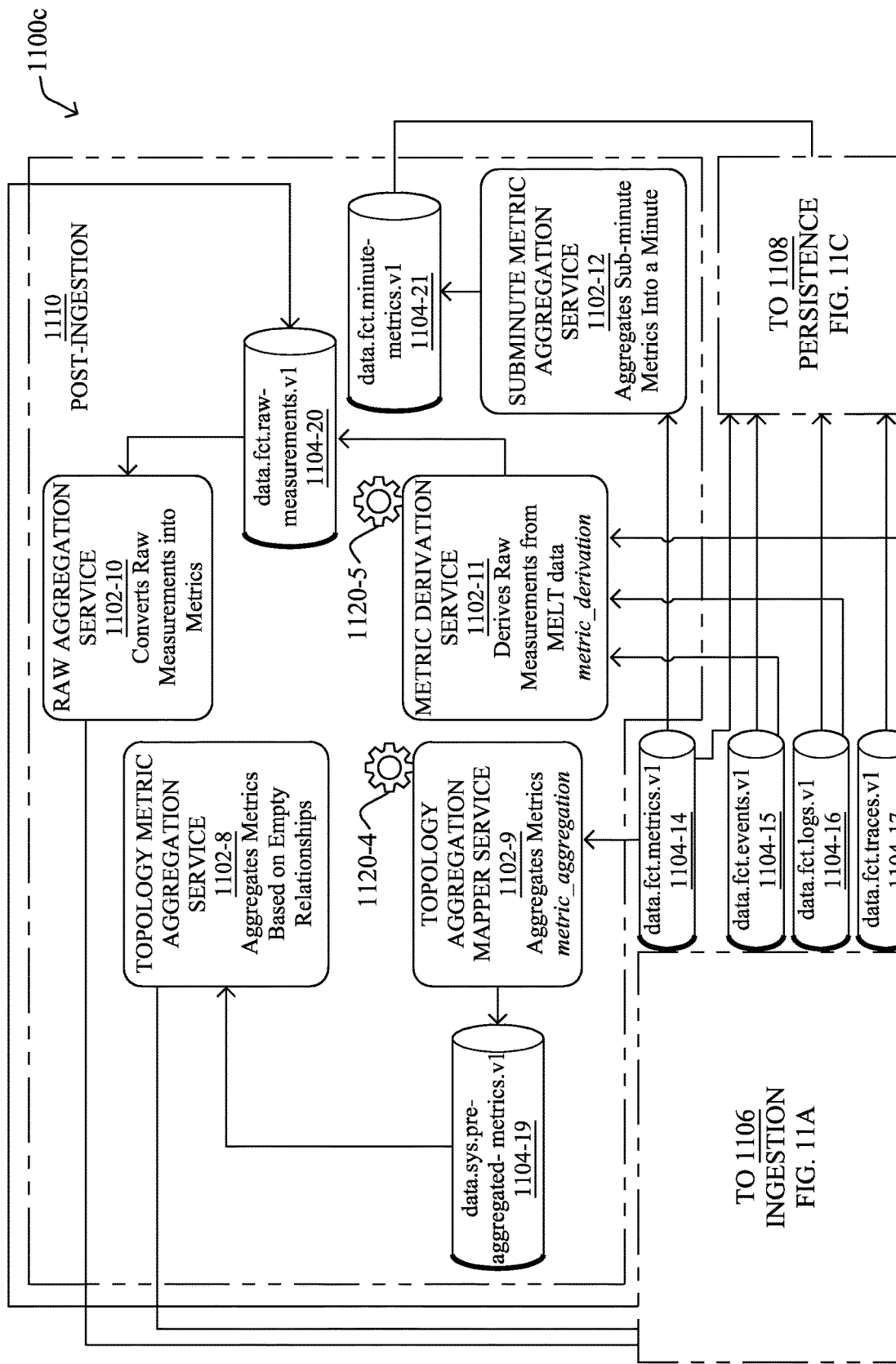
Figure 11E:
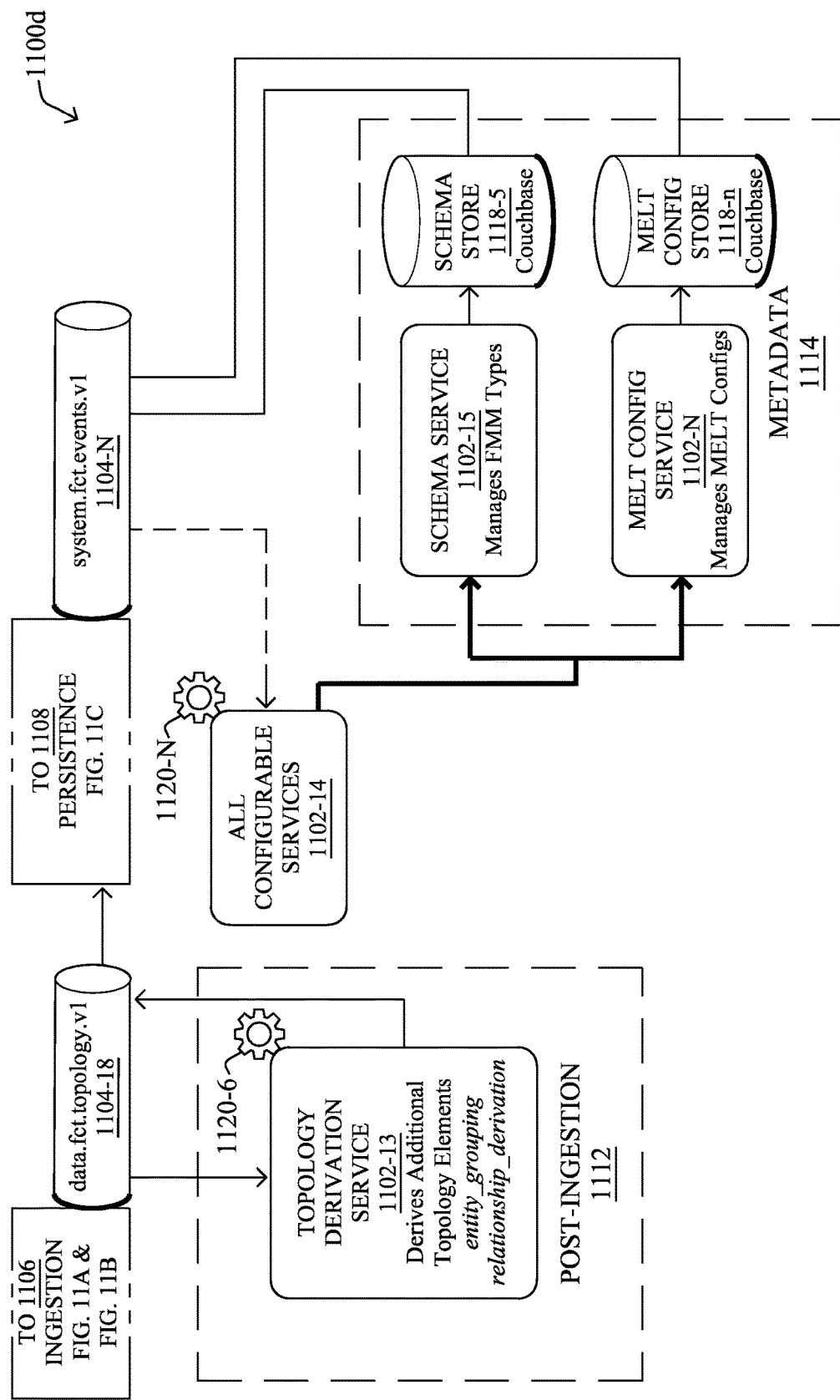

FIGS. 11A-11E illustrate an example of a common ingestion pipeline, e.g., the whole ingestion and transformation process. For clarity purposes, FIGS. 11A-11E each illustrate a respective portion of the entire pipeline. For example, FIGS. 11A-11B collectively illustrate a first quadrant 1100a including an ingestion portion 1106 of the pipeline, FIG. 11C illustrates a second quadrant 1100b including a persistence 1108 portion of the pipeline, FIG. 11D illustrates a third quadrant 1100c including a post-ingestion portion 1110 of the pipeline, and FIG. 11E illustrates a fourth quadrant 1100d including a second post ingestion portion 1112 and a metadata portion 1114 of the pipeline. Each of the quadrants may include transformation steps. These transformation steps may take the form of services 1102 (e.g., 1102-1 . . . 1102-N) or of applications 1116 (e.g., 1116-1 . . . 1116-N) which may include a collection of related services. Each of the quadrants may also include data queues 1104 (e.g., 1104-1 . . . 1104-N) (e.g., Kafka topics) that the steps subscribe to and feed into. Steps with a cogwheel symbol 1120 (e.g., 1120-1 . . . 1120-N) may be controlled by configuration objects, which means that they can be configurable extensibility taps adaptable to new domain models by the mere addition or modification of configurations. Steps with a plug symbol 1122 may include pluggable extensibility taps.

For example, the first quadrant 1100a may include common ingestion service 1102-1 (e.g., associated with rate limiting, license enforcement, and static validation), resource mapping service 1102-2 (e.g., associated with mapping resources to entities, adding entity metadata, resource_mapping, entity_priority, etc.), metric mapping service 1102-3 (e.g., associated with mapping and transforming OT metrics to FMM, metric_mapping, etc.), log parser service 1102-4 (e.g., associated with parsing and transforming logs into FMM events, etc.), span grouping service 1102-5 (e.g., associated with grouping spans into traces within a specified time window, etc.), trace processing service 1102-6 (e.g., associated with deriving entities from traces and enriching the spans, etc.), and/or tag enrichment service 1102-7 ((e.g., associated with adding entity tags to MELT data and entities, enrichment, etc.).

In addition, this quadrant may include data.fct.ot-raw-metrics.v1 data queue 1104-1, data.fct.ot-raw-logs.v1 data queue 1104-2, data.fct.ot-raw-spans.v1 data queue 1104-3, data.sys.raw-metrics.v1 data queue 1104-5, data.sys.raw-logs.v1 data queue 1104-6, data.sys.raw-spans.v1 data queue 1104-7, data.fct.raw-metrics.v1 data queue 1104-8, data.fct.raw-events.v1 data queue 1104-9, data.fct.raw-logs.v1 data queue 1104-10, data.fct.raw-traces.v1 data queue 1104-11, data.fct.processed-traces.v1 data queue 1104-12, data.fct.raw-topology.v1 data queue 1104-13, data.fct.metrics.v1 data queue 1104-14, data.fct.events.v1 data queue 1104-15, data.fct.logs.v1 data queue 1104-16, data.fct.traces.v1 data queue 1104-17, and/or data.fct.topology.v1 data queue 1104-18.

The second quadrant 1100b may include metric writer application 1116-1 (e.g., associated with writing metrics to the metric store 1118-1 (e.g., druid)), event writer application 1116-2 (e.g., associated with writing events to the event store 1118-2 (e.g., dashbase)), trace writer application 1116-3 (e.g., associated with writing sampled traces to the trace store 1118-3 (e.g., druid)), and/or topology writer 1116-N (e.g., associated with writing entities and associations to the topology store 1118-4 (e.g., Neo4J). Additionally, this quadrant may include system.fct.events.v1 data queue 1104-N.

The third quadrant 1100c may include topology metric aggregation service 1102-8 (e.g., associated with aggregating metrics based on entity relationships, etc.), topology aggregation mapper service 1102-9 (e.g., associated with aggregating metrics, mertic_aggregation, etc.), raw measurement aggregation service 1102-10 (e.g., associated with converting raw measurements into metrics, etc.), metric derivation service 1102-11 (e.g., associated with deriving measurements from melt data, metric_derivations, etc.), and/or sub-minute metric aggregation service 1102-12 (e.g., associated with aggregating sub-minute metrics into a minute, etc.). Additionally, this quadrant may include data.sys-.pre-aggregated-metrics.v1 data queue 1104-19, data.fct.raw-measurements.v1 data queue 1104-20, and/or data.fct.minute-metrics.v1 data queue 1104-21.

The fourth quadrant 1100d may include topology derivation service 1102-13 (e.g., associated with deriving additional topology elements, entity_grouping, relationship_derviation, etc.), all configuration services 1102-14, schema service 1102 (e.g., associated with managing FMM types), and/or MELT config service 1102-N (e.g., associated with managing MELT configurations, etc.). In addition, this quadrant may include schema store 1118-5 (e.g., couchbase) and/or MELT config store 1118-N (e.g., couchbase).

Other components and interconnections/relationships may be made in a common ingestion pipeline architecture. The views and products illustrated in FIG. 11A-11E are shown herein merely as example implementations that may be used to provide and/or support one or more features of the techniques herein.

A typical example of rule-driven transformation is the mapping of the Open Telemetry Resource descriptor to an entity in the domain model. The Resource descriptor contains key-value pairs representing metadata about the instrumented resource (e.g., a service) that a set of observed data (e.g., metrics) refers to. The task of the Resource Mapping Service is to identify the entity, which the Resource descriptor describes, and to create it in the Topology Store (which stores entities and their relations) if it isn't known yet.

FIG. 12 illustrates an example of resource mapping configurations 1200. In particular, the three specific examples for a resource mapping configuration are, essentially:

1210: For service instances, copy all matching attribute names to properties and remaining to tags (match by convention);

1220: Copy all attributes starting with "service." to entity properties—copy remaining to tags;

1230: Define specific mappings for entity attribute and tags.

As shown in FIG. 12, an expression "scopeFilter" is used to recognize the input (i.e., records not matching the scope filter are ignored) and "fmmType" assigns an entity type to the resource if it is recognized. The mappings rules then populate the fields of the entity (as declared in the domain model) with content derived from the OpenTelemetry content. Thus the resource mapping configuration refers to, and complements, the domain model, enabling individual tenants to observe and analyze the respective entities in their own system landscape regardless of whether the extensibility platform (e.g., the observability intelligence platform above) supports these entity types as part of the preconfigured ("out of the box") domain models.

The totality of these models and configurations can be considered as one composite multi-level model. Composite in the sense that it has parts coming from different organizations (e.g., the observability intelligence platform distributor, customers, third parties, etc.) and multi-level in the sense that the artifacts drive the behavior of different parts of the whole system, e.g., ingestion, storage, User Interface, etc. Since artifacts refer to each other both across origin and across technical level, the reliable operation of the system heavily relies on the JSON store's ability to understand and enforce the consistency of these references.

For the Trace Processing Service, even more flexibility is required. What is shown as a single box in the diagram is actually itself a workflow of multiple processing steps that need to be dynamically orchestrated depending on the respective domain.

The description below provides greater details regarding the Configuration-Driven Data Processing Pipeline.

Regarding embedding custom container images and FaaS, in accordance with the techniques herein, especially in the complex trace processing workflows, but also in pre-ingestion processing (such as the enrichment of observed data with geographic information derived from IP addresses), some required transformations are too sophisticated for generic rule-driven algorithms. In such cases, the customer must be able to provide their logic as a function that can be executed as a service (e.g., a FaaS) or even a container image exposing a well-defined service interface.

Note that where custom functions are running external to the extensibility platform, the corresponding secrets to access them need to be made available to calling services.

Another security-related problem coming with custom services is that their access may need to be restricted based on user roles. One solution to this is to use custom representational state transfer (REST) endpoints and extensible role-based access control (RBAC) for an extensibility platform.

The extensibility platform herein also illustratively uses a graph-based query engine. In particular, an important precondition for the configuration-driven consumption of customer-specific content is the ability to query data via a central query engine exposing a graph-based query language (as opposed to accessing data via multiple specific services with narrow service interfaces).

Figure 13:
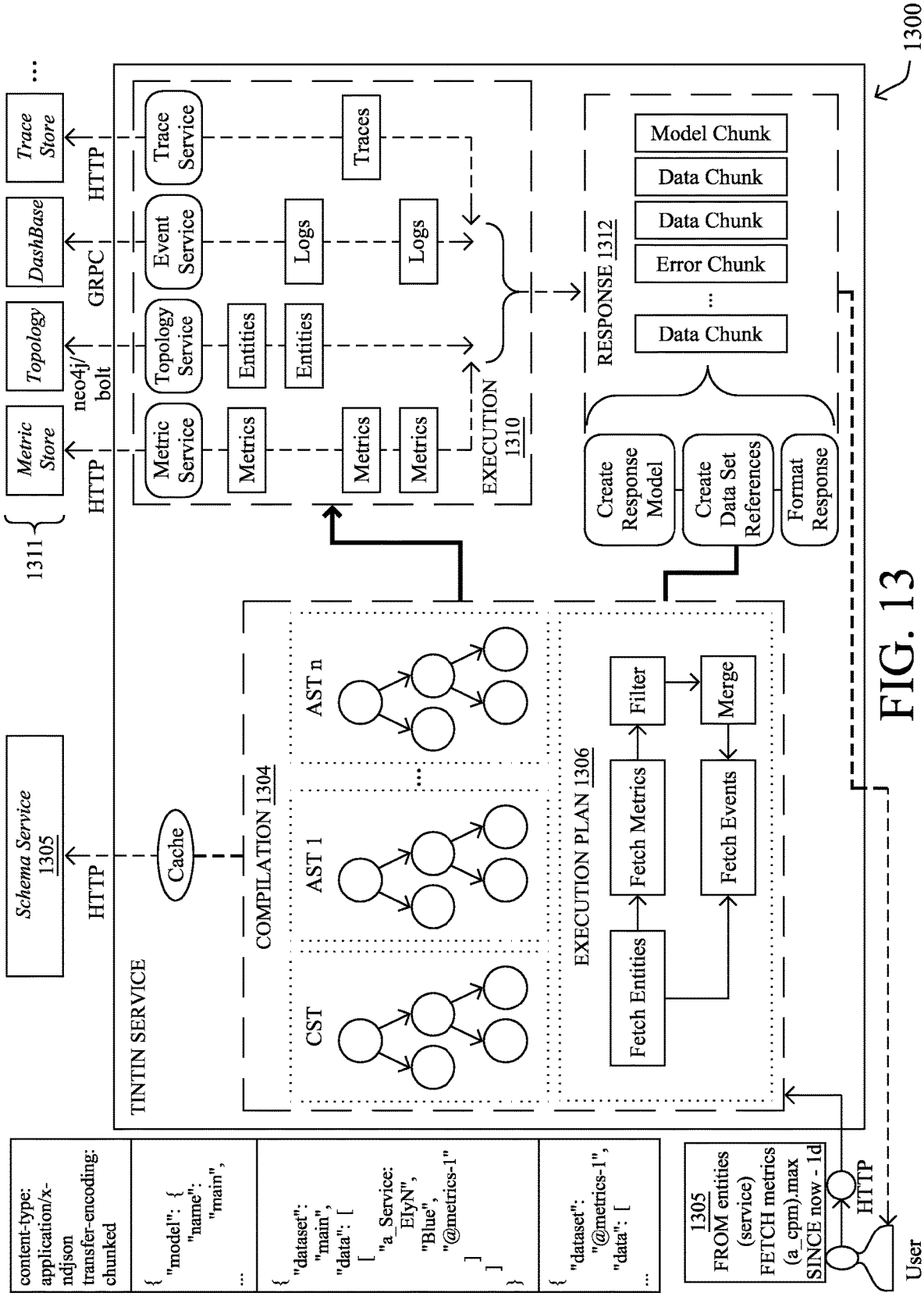
FIG. 13 illustrates an example of a design of a Unified Query Engine (UQE)

FIG. 13 illustrates an example of a design of a Unified Query Engine (UQE) 1300. The Unified Query Engine 1300, in particular, provides combined access to:

Topology (Entities and their relationships);

Metrics;

Events;

Logs; and

Traces.

The Unified Query Engine 1300 may provide the combined access by receiving a fetch request 1302, performing compilation 1304 and determining execution plan 1306. In addition, Unified Query Engine 1300 may execution 1310 and response 1312. Results of performing compilation 1304 and/or execution plan 1306 may be cached with schema service 1305. Results of execution 1310 may be stored in observability stores 1311 which may include a metric store, a topology store, a DashBase store, a trace store, etc. For example, the topology data may be stored in a graph database, and the unified query language (UQL) may allow the platform to identify sets of entities and then retrieve related data (MELT) as well as related entities. The ability to traverse relationships to find related entities enables the application of graph processing methods to the combined data (entities and MELT).

The extensibility platform herein also uses a Configuration-Driven User Interface. In order to allow customers and third parties to create domain-specific UIs without deploying code, the UI is built according to the following principles:
1. No domain knowledge is hard-coded into any UI components.
   In particular, no references whatsoever to FMM model content occur in the UI code.
2. Domain knowledge is modeled into UI configurations.
   The appearance of the UI, as far as it is domain-specific, is determined by declarative configurations for a number of predefined building blocks.
3. Uniform modeling approach, reusable configurations.
   Regardless of the page context (Dashboard, Object Centric Pages (OCP), etc.), the same things are always configured in the same way. Existing configurations can be reused in different contexts. Reusable configurations declare the type of entity data they visualize, and reuse involves binding this data to a parent context.
4. Dynamic selection of configurations.
   On all levels, configurations can be dynamically selected from multiple alternatives based on the type (and subtype) of the data/entity to which they are bound. The most prominent example is the OCP template, which is selected based on the type of the focus entity (or entities).
5. Nesting of configurable components, declarative data binding.
   Some components can be configured to embed other components. The configurations of these components declare the binding of their child components to data related to their own input. No extension-specific hard-coded logic is required to provide these components with data. This gives third parties enough degrees of freedom to create complex custom visualizations.
6. Limited Interaction Model.
   In contrast to the visualization, third parties have limited ways to influence the behavior of the application. The general Human Computer Interaction mechanics remain the same for all applications. For example, it is possible to select the "onclick" behavior for a component out of a given choice, e.g., drilldown, set filter, etc.

The extensibility platform herein also uses a Cell-based Architecture. That is, the extensibility platform herein is a cloud-native product, and it scales according to a cell-based architecture. In a cell architecture, in particular, the "entire system" (modulo global elements) is stamped out many times in a given region. A cell architecture has the advantages of limiting blast radius (number of tenants per cell affected by a problem), predictable capacity and scalability requirements, and dedicated environments for bigger customers.

Figure 14:
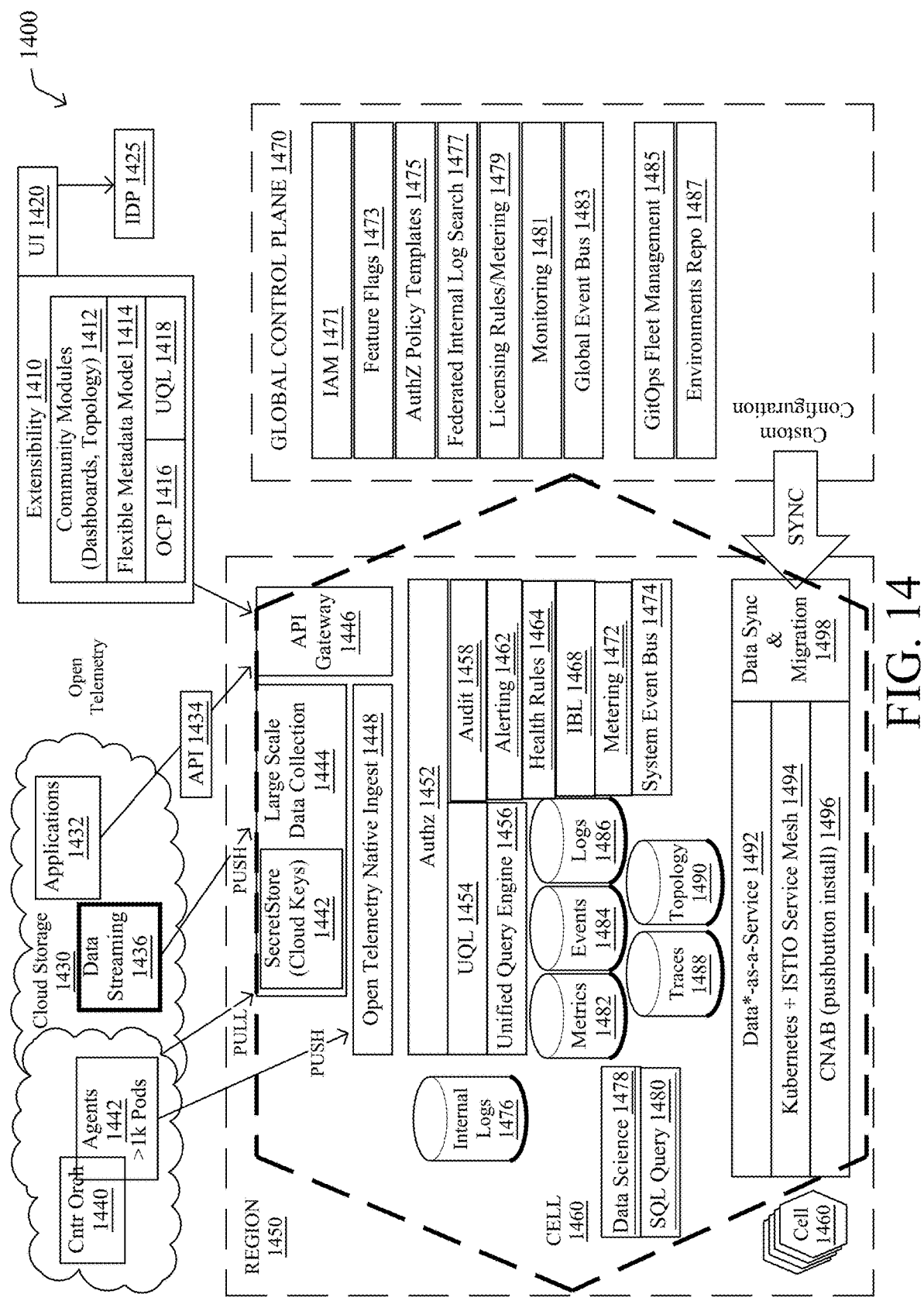
FIG. 14 illustrates an example of a deployment structure of an observability intelligence platform in accordance with the extensibility platform herein, and the associated cell-based architecture.

FIG. 14 illustrates an example of a deployment structure of an observability intelligence platform in accordance with the extensibility platform herein, and the associated cell-based architecture. As shown in extensibility platform diagram 1400, an extensibility platform 1410 has community modules 1412 (dashboards, topology), a flexible meta model (FMM) 1414, an OCP 1416, and a UQL 1418. A UI 1420 interfaces with the platform, as well as an IDP (Identity Provider) 1425. Cloud Storage/Compute 1430 has various Applications 1432 (and associated APIs 1434), as well as Data Streaming services 1436. A Container Orchestration Engine 1440 (e.g., K8s) may have numerous deployed Agents 1442. The MELT data is then pushed or pulled into a particular Region 1450 and one or more specific Cells 1460. Each cell may contain various features, such as, for example:
   SecretStore (cloud keys) 1442, Large Scale Data Collection 1444
   API Gateway 1446
   Open Telemetry Native Ingest 1448
   AuthZ (authorization) 1452
   UQL 1454
   Unified Query Engine 1456
   Audit 1458
   Alerting 1462
   Health Rules 1464
   IBL 1468
   Metering 1472
   System Event Bus 1474
   Internal Logs 1476
   Data Science 1478
   SQL Query 1480
   Metrics 1482
   Events 1484
   Logs 1486
   Traces 1488
   Topology 1490
   data-as-a-service 1492
   Kubernetes+ISTIO Service Mesh 1494
   CNAB (pushbutton install) 1496
   Data Sync & Migration 1498
   Etc.

Global control plane 1470 may also contain a number of corresponding components, such as, for example:
   IAM (Identity and Access Management) 1471
   Feature Flags 1473
   Authz Policy Templates 1475
   Federated Internal Log Search 1477
   Licensing Rules/Metering 1479
   Monitoring 1481
   Global event bus 1483
   GitOps fleet management 1485
   Environments Repository 1487
   Etc.

Note that the global control plane 1470 passes Custom Configurations to sync into the Cell 1460 (data sync & migration), as shown.

Note that a specific challenge in certain configurations of this model may include the balancing of resources between the multiple tenants using a cell, and various mechanisms for performing service rate limiting may be used herein.

Another specific challenge in this model is in regard to disaster recovery. Again, various mechanisms for disaster recovery may be used herein, as well.

The techniques described herein, therefore, provide for an extensibility platform, and associated technologies. In particular, the techniques herein provide a better product to customers, where more features are available to users, especially as feature development is offloaded from a core team to the community at-large. The extensibility platform provides a clean development model for first party apps (e.g., EUM, Secure App, etc.) and second party apps (e.g., observability, etc.), enabling faster innovation cycles regardless of complexity, particularly as there is no entanglement with (or generally waiting for) a core team and roadmap. The techniques herein also enable a software as a service (SaaS) subscription model for a large array of features.

Figure 15A:
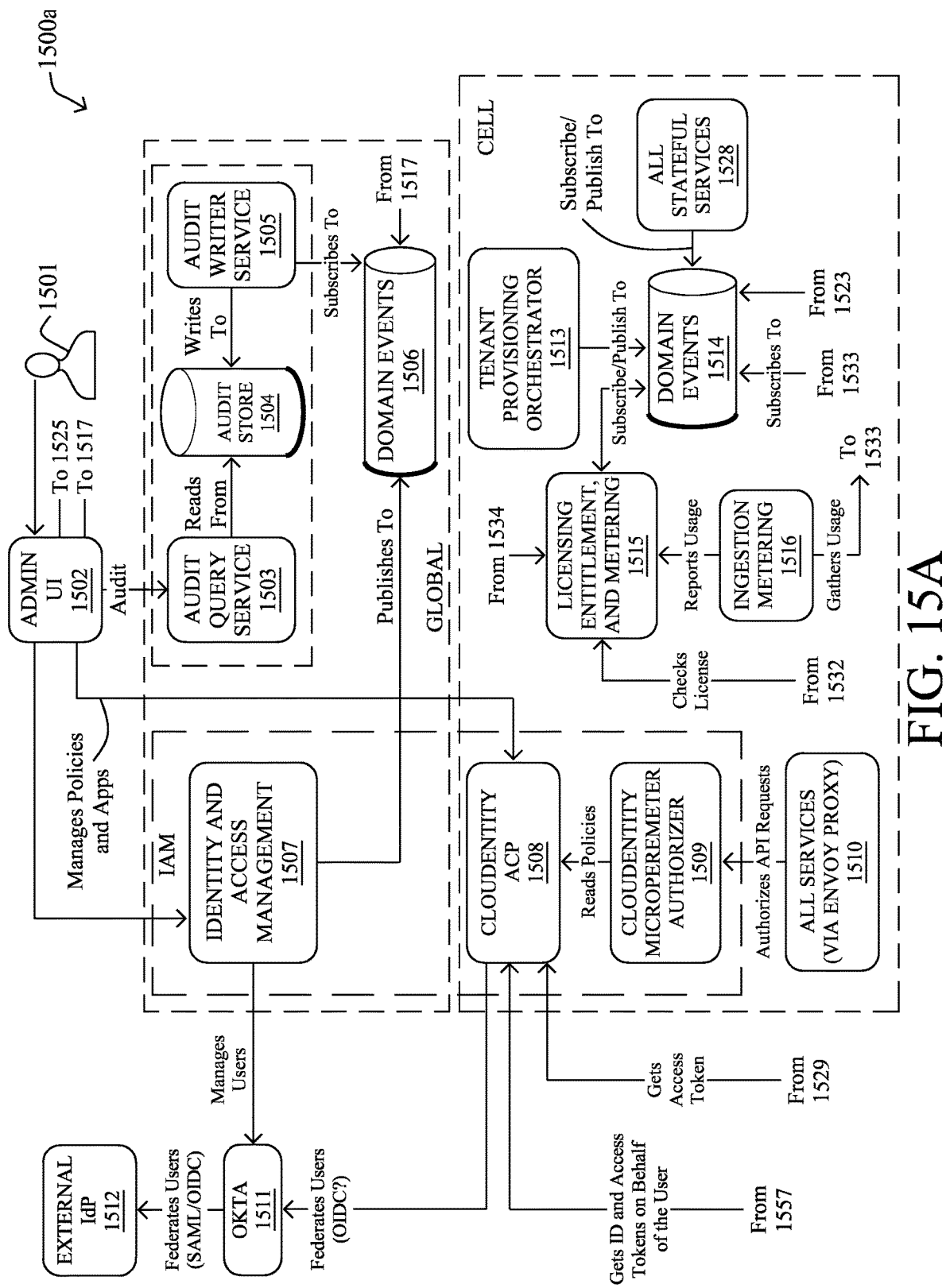
FIGS. 15A-15D illustrate an example of a system for utilizing a configuration-driven data processing pipeline for an extensibility platform, in particular where each of FIGS. 15A-15D illustrate respective quadrants of the system.
Figure 15B:
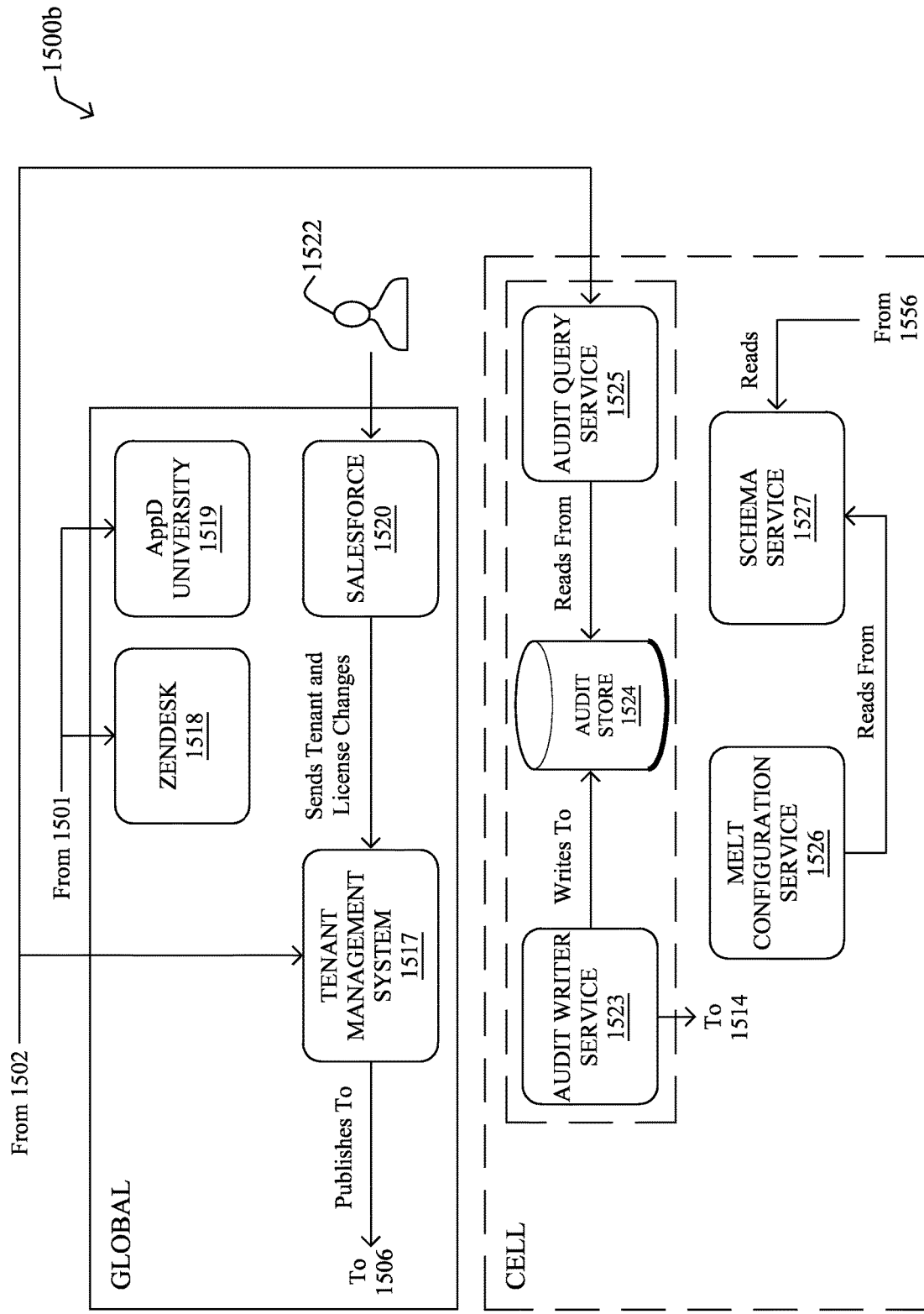
Figure 15C:
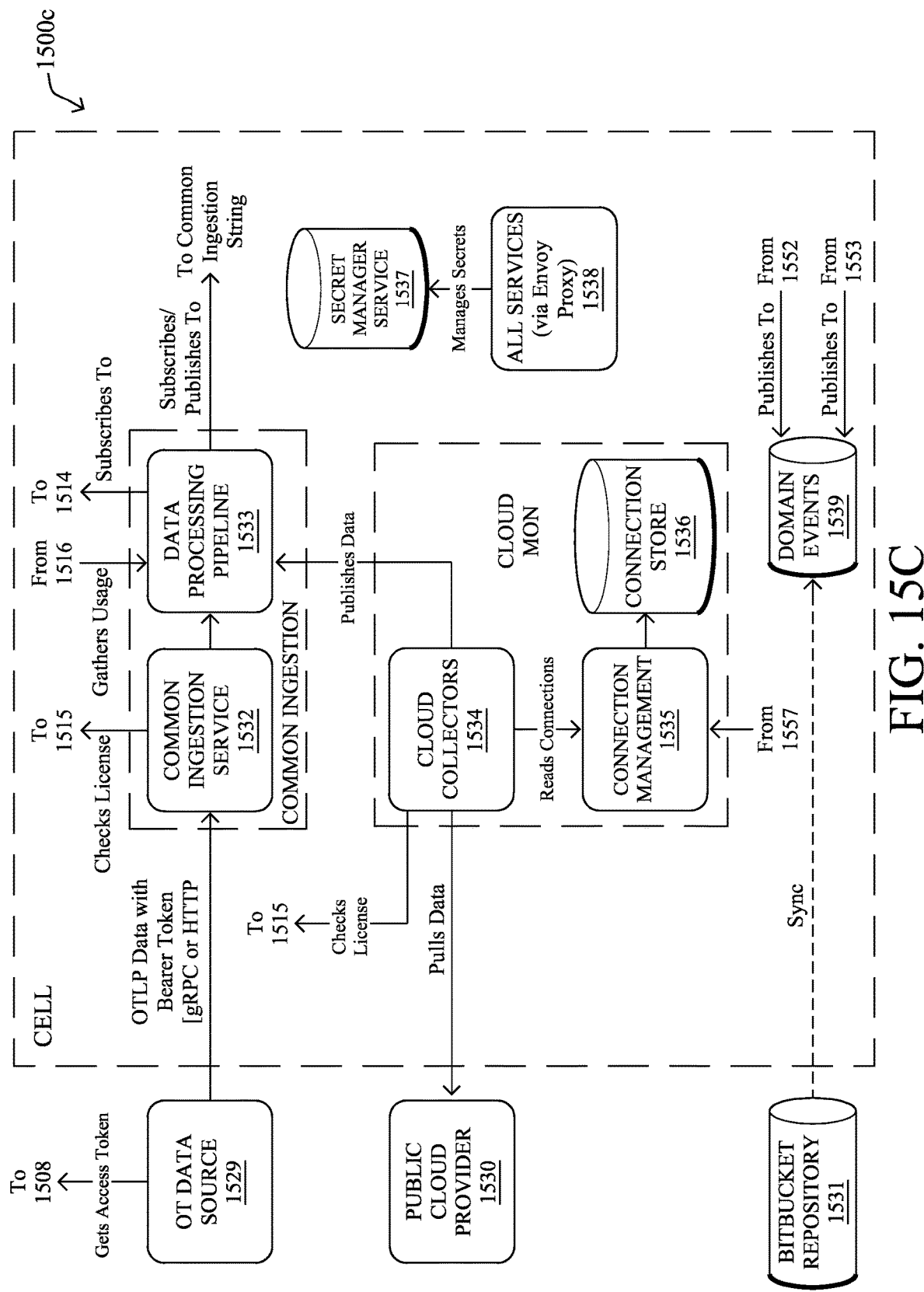
Figure 15D:
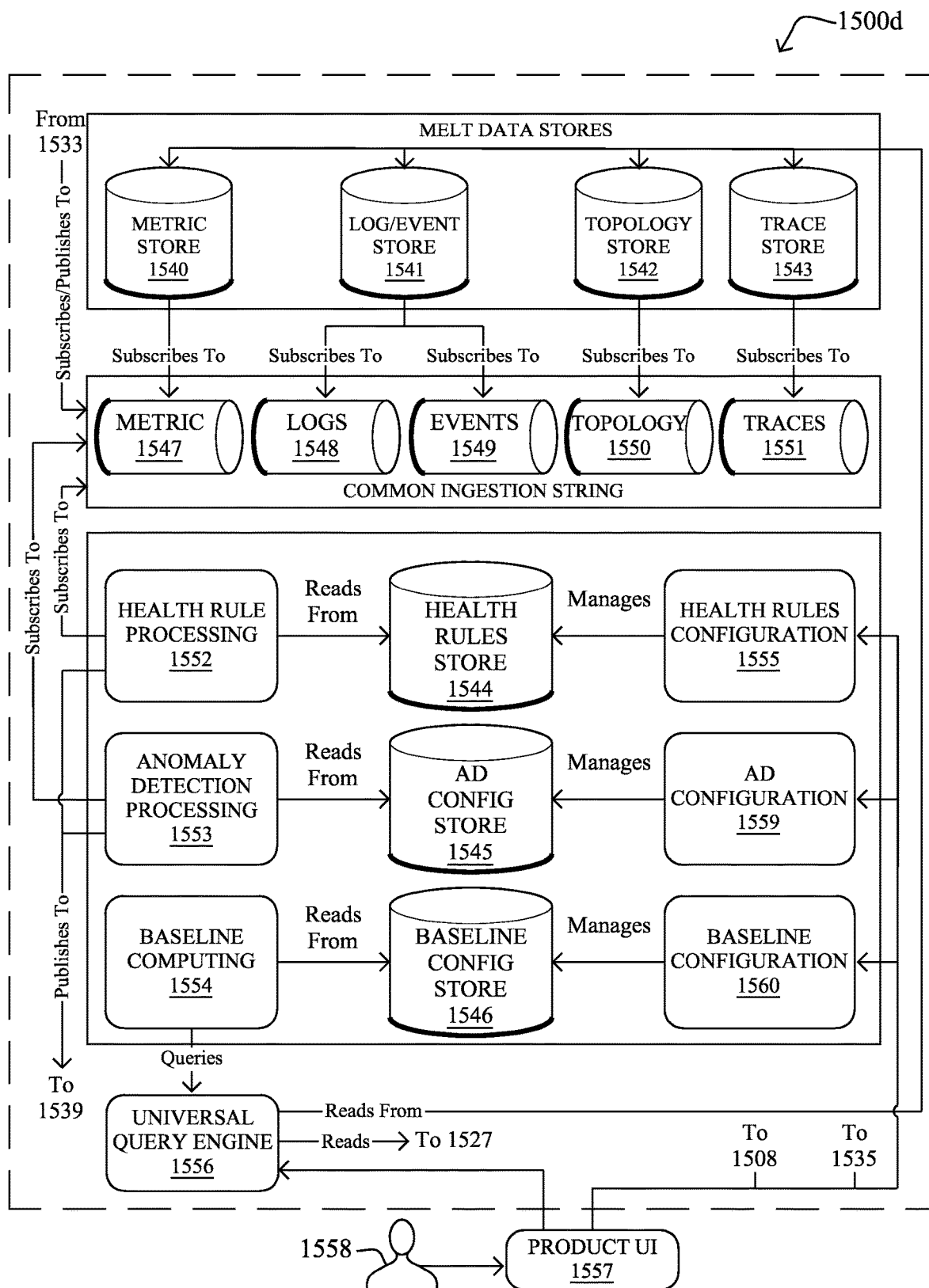

FIGS. 15A-15D illustrate another example of a system for utilizing an extensibility platform. For clarity purposes, FIGS. 15A-15D each illustrate a respective quadrant of the entire system. For example, FIG. 15A illustrates a first quadrant 1500a of the system, FIG. 15B illustrates a second quadrant 1500b of the system, FIG. 15C illustrates a third quadrant 1500c of the system, and FIG. 15D illustrates a fourth quadrant 1500d of the system.

The system may receive input from a customer and/or admin 1501 of the system, via an admin user interface 1502. The system may include a global portion. This global portion may include an audit component. The audit component may include an audit query service 1503 that may allow the querying of an audit log, an audit store 1504 (e.g., dashbase), and/or an audit writer service 1505 that may populate the audit store 1504. In addition, the global portion may include Zendesk 1518 or another component that will support requests, "AppD university" 1519 or another component that will manage training material and courses, salesforce 1520 or another component that allows management of procurement and billing, and/or a tenant management system 1517 for managing tenant and license lifecycle. An "AppD persona" 1522 may interact with salesforce 1520. The global portion may additionally include domain events 1506 for global domain events and identity and access management 1507 that facilitates management of users, application, and their access policies and configure federation.

The system may also include external IdP 1512 which may include a SAML, OpenIS or OAuth2.0 compliant identity provider. The system may include Okta 1511 which may include an identity provider for managed users. In addition, the system may interface with OT data source 1529 which may act as an OT agent/collector or a modern observability agent. In various embodiments, the system may interface with public cloud provider 1530 such as AWS, Azure, GCP, etc. The system may also include BitBucket repository 1531 to produce configs and/or models as code.

In addition to the global portion, the system may also include a cell portion. The cell portion may include a cloudentity MP 1508 which may operate as an openID provider, perform application management, and/or perform policy management. Further, the cell portion may include cloudentity microperemeter authorizer 1509 for policy evaluation. Furthermore, the cell may include all services 1510 via envoy proxy.

The cell portion may include a second audit component which may include a second audit query service 1525, a second audit store 1524, and/or a second audit writer service 1523. The cell portion may also include a second domain event 1514 for cell domain events. Further, the cell portion may include a tenant provisioning orchestrator 1513, an ingestion meter 1516 that meters ingestion usage, and/or a licensing, entitlement, and metering manager 1515 that facilitates queries of licensing usage, performs entitlement checks, and/or reports on usage. Again, the cell portion may include all stateful services 1528.

The cell portion may include a common ingestion component. The common ingestion component may include data processing pipeline 1533 which may validate and transform data. Data processing pipeline 1533 may also enrich entities and MELT based on configurations. The common ingestion component may also include common ingestion service 1532, which may authenticate and/or authorize requests, enforces licenses, and/or validate a payload.

Moreover, the cell portion may include a common ingestion stream component. The common ingestion stream component may include metrics 1547 (e.g., typed entity aware metrics), logs 1548 (e.g., entity aware logs), events 1549 (e.g., typed entity aware events), topology 1550 (e.g., typed entities and associations), and/or traces 1551 (e.g., entity aware traces). In addition, the cell portion may include a MELT data stores components that includes metric store 1540 (e.g., druid), log/event store 1541 (e.g., dashbase), topology store 1542 (e.g., Neo4j), and/or trace store 1543 (e.g., druid).

In various embodiments, the cell portion of the system may include a cloudmon component, which may include cloud collectors 1534 that collect data from public cloud providers 1530. Additionally, the cloudmon component may include connection management 1535, which may facilitate management of external connections and their credentials. In some instances, the cloudmon component may include a connection store 1536 (e.g., postgreSQL).

The cell portion may also include an alerting component. The alerting component may include a health rule processor 1552 for evaluating health rules and generating entity health events. Further, the alerting component may include a health rule store 1544 (e.g., mongo DB) and/or a health rule configuration 1555 that facilitates the management of health rules. Likewise, the altering component may include an anomaly detection processor 1553 to detect anomalies and/ or publish their events, an anomaly detection config store 1545 (e.g., mongoDB), and/or an anomaly detection configuration 1559 that facilitates enabling/disabling/providing feedback for anomaly detection. The alerting component may also include a baseline computer 1554 for computing baselines for metrics, a baseline config store 1546 (e.g., mongoDB), and/or a baseline configuration 1560 to facilitate configuration of baselines.

The cell portion may include a secret manager service 1537 (e.g., HashiCorp Vault) exposed to all services 1538 via envoy proxy. The cell portion may include a third domain event 1539 for cell domain events. In addition, the cell portion of the system may include a universal query engine 1556 that may expose a query language for ad-hoc queries. An end user 1558 may interface with universal query engine 1556 over a product user interface 1557. In addition, the universal query engine 1556 may read from schema service 1527. Schema service 1527 may facilitate querying and management of FMM types. Furthermore, MELT configuration service 1526 may perform configuration of data processing pipeline 1533.

Other components and interconnections/relationships may be made in an example extensibility platform herein, and the views and products illustrated in FIG. 15A-15D are shown herein merely as example implementations that may be used to provide and/or support one or more features of the techniques herein.

——Flexible Meta Model (FMM) for an Extensibility Platform——

The techniques herein extend and/or support the extensibility platform described above by defining a specialized modeling system for MELT data known as "Flexible Metadata Modeling" (or Flexible Meta Model) (FMM). The focus here is on the interweaving of multiple models in a matrix form, where one dimension is the different artifact types (MELT, processing pipeline configs, UI configs, etc.) and the other dimension is the domain (e.g. APM, Kubernetes, End User Monitoring, etc.). Interweaving refers to the fact that at any point in that matrix you can have safe references to artifacts across both dimensions.

As described in greater detail below, the FMM is based on a system of entities ('things' under observation by the system), with associated model Metrics, Events, Logs and Traces (MELT data). FMM is a system of defining Entities, and of defining new types, where each type is one of these Kinds: metric; event (includes logs); or trace. FMM also defines relationships between entities, the entity effectively constituting a graph representing the system under observation.

As also described below, in one embodiment, an implementation of FMM allows the FMM type system to be encapsulated as a system solution, where solutions can create new FMM types, and where solutions can reference and extend the FMM types of the system and other solutions.

To enable FMM, techniques are also presented herein for solution lifecycles and packaging. That is, a portion of the FMM techniques herein is based on solutions, along with their packaging, distribution, and dependency model. Solutions have a heavy reliance on the JSON Store, mentioned above, and as described in greater detail below, which makes solution artifacts available to services at runtime.

Figure 16A:
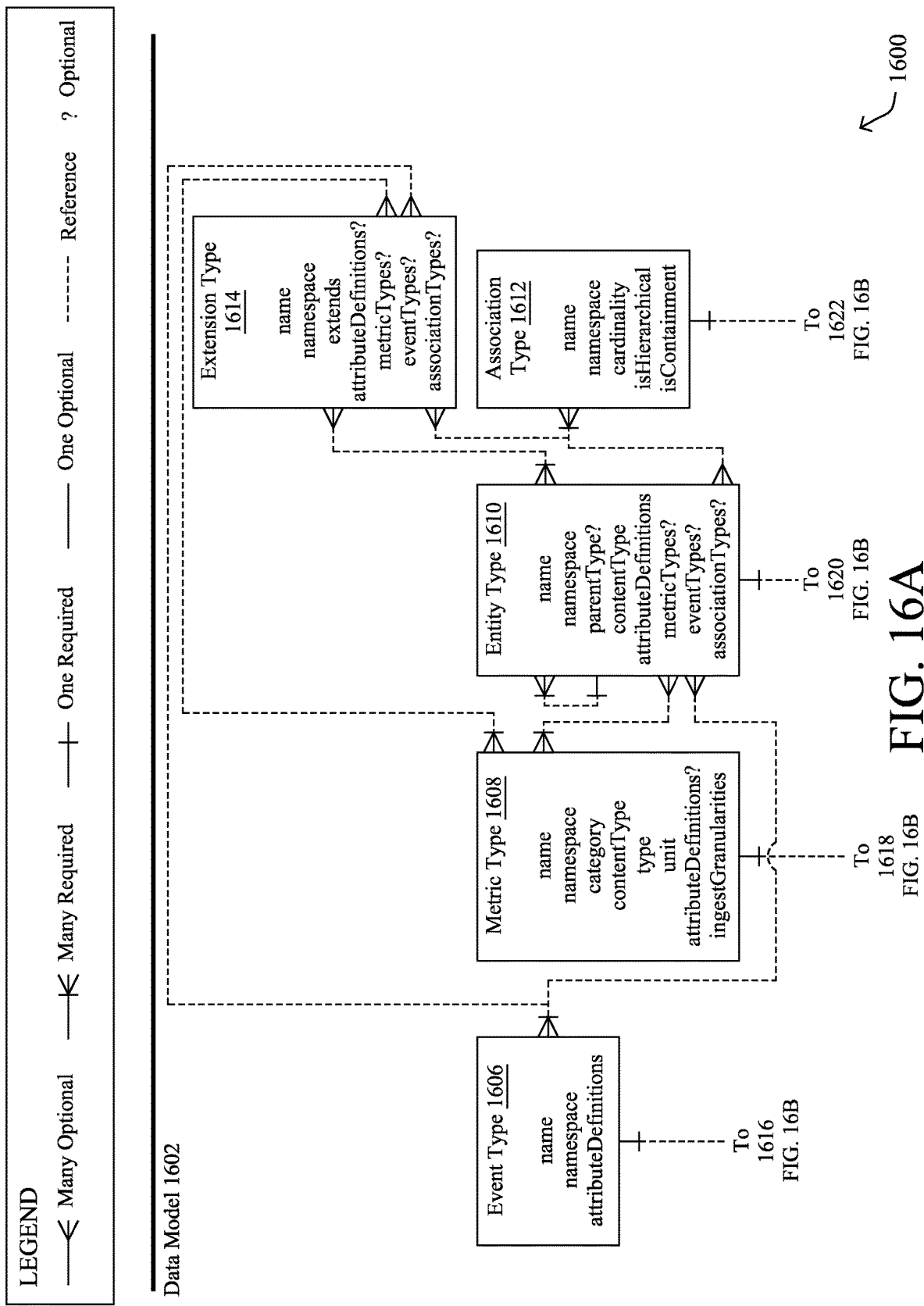
FIGS. 16A-16B illustrate a diagram representative of a Metrics, Events, Logs and Traces (MELT) data model herein.
Figure 16B:
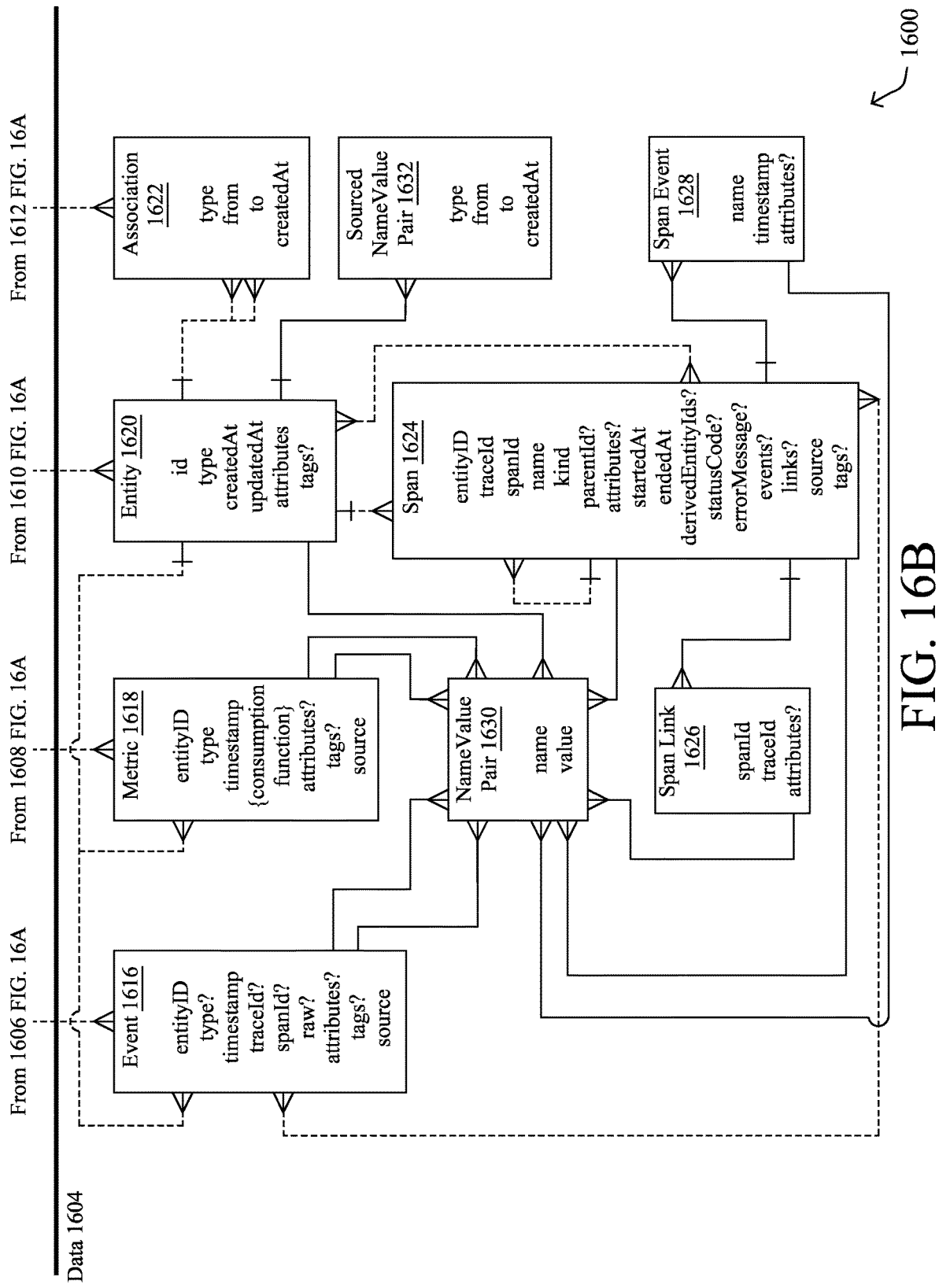

FIGS. 16A-16B illustrate a diagram representative of a Metrics, Events, Logs and Traces (MELT) data model 1600 herein. (Note that in one embodiment, the entities in the model 1600 are associated with a single "tenant" in an observability intelligence platform). As shown in the model 1600 has a data model 1602 and data interrelationship 1604, such as event types 1606 and events 1616, metric types 1608 and metrics 1618, entity types 1610 and entities 1620, and association types 1612 and associations 1622. Extension types 1614 are also listed within the data model 1602. Various features of the data, including spans 1624 (and links 1626 and events 1628), NameValue pairs 1630, 1632, and so on, also enhance the data, as detailed therein.

As defined herein, a "source" is what observes a specific data point (e.g., infra-agent, etc.). When multiple sources report data for the same entity, the techniques herein provide a mechanism to determine the source of data in order to enable an end user to clearly identify a source of this data, and/or to enable an end user to 'mute' a specific source. Mute, for example, may mean commanding a specific source to stop the collection (for configurable sources, e.g., observability platform controlled agents), or commanding the ingestion pipeline to drop the data from a specific data source (for non-configurable sources, e.g., OpenTelemetry agents).

A source should be attached to each reported data point, since it can be difficult (e.g., impossible) to guarantee that a given property/metric/etc. is always reported by the same source.

In order to identify a source, it is derived in the following order of precedence:

1. From the telemetry.sdk.name attribute in the OpenTelemetry payload (in order to enable collectors/proxies to propagate the information about the actual source of the data);
2. From the agent type in the application principal's metadata (agent type is extracted from a specific claim in JSON Web Token and propagated via the observability-agent-type header);
3. Set to sys:unknown.

Once derived, the source is added to each data point propagated through the platform, and is preserved in each data store. (Note that source names starting with the "sys:" prefix are reserved for the platform.) The source values can be further transformed using source-mapping configs. This allows correction of source values and mapping to a few standard sources. (Also note that for the source for derived/ generated data (e.g., aggregated metrics or entities), the source may be set to "sys:derived".

To define a "kind" herein, each 'thing' represented in the 'data' section in model 1600 of FIGS. 16A-16B is called a kind and has a set of defined fields that semantically describes it. Some kinds are typeless, while others must be associated with a type. There are only a few kinds in the platform, and adding a new kind is not a lightweight operation, as it requires adding support for processing and storing that kind in the data platform. Only the extensibility platform can add new kinds, thus the kinds are considered static.

A "type" is applicable to a single kind and it defines a set of validation constraints for the instances of this type. These validation constraints are always applied to either specific (extensible) fields of these instances, i.e. attributes for entity kind, or to the external data that belongs to these instances (e.g., restricting metric types allowed to be associated with a given entity type). Each type has the following common fields:

name (uniquely identifies this type; can be used to reference this type);
namespace (a versioned namespace for this type).

A fully qualified type reference is constructed as follows:
<namespace>:<name>

If a type is referenced from the same namespace, then <namespace>: prefix can be omitted.

A "field" is a key/value pair which is specific to a resource that it is associated with and cannot be modified/extended. Field values can have different types (integer, string, boolean, . . . ) and additional validation rules (e.g., format, pattern, etc.). Field definitions (keys and value types) are always the same across all tenants. Fields are defined values cannot be modified (since kinds are static). Examples of fields follow:

Entity: id, type, attributes, . . . .
Association: type, from, to . . . .

An "attribute" is a key/value pair which is specific to a resource that it is associated with. Attributes may be declared in a corresponding type, which makes them extensible. Attribute values can have different types (integer, string, boolean, . . . ). Attribute values can have high cardinality (potentially a unique value for each instance). Attribute definitions (keys and value types) declared in a given type are always the same across all tenants. Attribute values can only be modified by the source (agent, collector, etc.) that is monitoring that object, or by an extension, they cannot be managed via the UI or APIs. Examples of attributes:

Entity of type k8s:pod: name, namespace name, cluster name, . . . .
Entity of type apm:service.instance: name, version, . . . .

A "tag" is a key/value pair which is not specific to a resource that it is associated with. Tags are not declared, and can only have values of type string. Tag key is unique in a given resource instance. Same tags can be associated with multiple resources (e.g., entities or metrics of different types, etc.). Tags are intended to be used to specify attributes of resources that are meaningful and relevant to users, but do not directly imply semantics to the core system. Tags should be used to organize and to select subsets of resources (and apply access control rules), not for defining extra information for them. Thus the cardinality of tag values must remain low. Tag keys can differ across tenants, or have a different semantic meaning for the same key across tenants. Only entities can be tagged directly, other kinds can only be tagged based on the related entities via the enrichments.

Tags can be modified by the source that is monitoring that entity, and they can also be managed from within the UI/APIs. Examples of tags:
  department: sales
  environment: production
Table 1 below offers a comparison of each of the terms above:

TABLE 1

| | Value Types | Cardin-ality | Pre-defined? | Can Delete Keys? | Can Add Keys? | Can Modify Values? | Used To Identify Object? |
|---|---|---|---|---|---|---|---|
| Field | Any | Any | Yes, in kind | No | No | Yes | Yes (e.g., ID in entity) |
| Attri-bute | String, number, Boolean | Any | Yes (partial), in type | No | Yes | Yes | Yes (e.g., required attributes in entity) |
| Tag | String | Low | No | Yes | Yes | Yes | No |

Specifically with regards to kinds, each kind is marked with a lifecycle status:
  STABLE—a kind is stable, any new changes will ensure backwards compatibility;
  UNSTABLE—a kind is unstable, new changes can break backwards compatibility, or it can be removed.
If a field is marked UNSTABLE, while the kind is STABLE, that means that only those fields can break backwards compatibility.

Notably, all timestamps associated with the MELT data must retain the precision that it was observed at, thus need to be consistently stored in nanoseconds. Since the topology is derived from the MELT data, the timestamp precision should (e.g., must) remain consistent, and thus also should be stored and queried in nanoseconds.

An entity 1620 (STABLE) represents an observable logical component that constitutes the computing environment and/or applications of an platform customer. Examples of entities are REST endpoint, Service, Container, Disk, Thread, JVM, Topic, Database, Router, Cache, etc. Some entities represent a group (aggregation) of a particular type of entities. For example, a service is an entity representing a group of service instances. Such entities are derived from other observed entities based on a configured entity derivation.

An entity 1620 should (e.g., must) always be associated with an entity type 1610, which defines:
  parentType (optional)
    a fully qualified type reference to the parent entity type
    attributes, metric, event and association types are inherited from the parent type and cannot be overridden
  attributeDefinitions
    a definition of attributes that can be used to describe an entity of this type
    each attribute has an associated data type
    at least one attribute must be marked as required
    required attributes can be used to uniquely identify this entity
  metricTypes (optional)
    a list of metric types that can be associated with this entity
  eventTypes (optional)
    a list of event types that can be associated with this entity
  associationTypes (optional)
    a list of outgoing association types that can be linked from this entity, with a list of allowed entity types to which this association can be connected, e.g.,
    associationTypes:
      'common: consists_of':
        'infra: container'//a k8s pod can only consist of containers An entity 1620 within a given tenant of a given type and the same identifying (required) attributes always has the same id. An entity consists of:
  id
    a unique identifier of this entity
    can be used to reference this entity
    must be globally unique, across all tenants
  type
    a fully qualified type reference to the entity type
  attributes
    a list of attributes that adhere to the attributeDefinitions in the entity type
    if an attribute with a given name is not defined in a type, it is considered 'typeless' and its value will always be a string
    each attribute consists of:
      name (a name of this property)
      value (a scalar value of this property)
      source (a source of this property)
    each attribute is uniquely identified by name and source
  tags (UNSTABLE) (optional)
    a list of tags
  createdAt
    a timestamp when this entity was created
  updatedAt
    a timestamp when this entity was last updated—this is modified on an update of the entity metadata or any corresponding MELT data associated with this entity An entity 1620 may have the following data associated with it via an external reference to its unique identifier: metrics (entityId); events (entityId); spans (entityId, derivedEntityIds); associations (from, to).

An extension (UNSTABLE) type 1614 adds attributes or MELT data to one or more existing entity types with the following rules:
  all extension owned data types (metrics, events) MUST be declared in the same namespace
  an extension can extend one or multiple types, it can also extend all types
  only one extension in a namespace can amend a given type
  due to the above, properties and data reported by an extension can be uniquely identified via that extension's namespace
  ext:{extension namespace} is used as a source for all data produced by this extension
  attributes and MELT data reported by extensions do not affect the lifecycle of the entity The extension type 1614 defines:
  extends (one or more entity types that this extension is applicable to)
It also defines the same elements as the entity type 1610, but associated them to all the entity types that it extends, namely:
  attributeDefinitions
  metricTypes
  eventTypes
  associationTypes
All of the above are optional, but at least one of them must be present.

An entity 1620 can be connected with another entity via an association 1622. Associations (STABLE) are connecting two entities with a directed edge, forming a directed connected graph: "topology". It is possible to traverse this topology by following any of the associations. In a traversal, associations are referenced by their type name.

An association 1622 can represent either static relationships between entities, for example:
  consists_of (one to many): a k8s pod consists of multiple containers
  relates_to (many to many): an EBS volume can be mounted to multiple EC2 instances. An EC2 instance can have multiple EBS volumes An association 1622 can also represent dynamic relationships, for example:
  a service instance interacts with a REST endpoint in another service instance
  a service instance updates a record in a database An association 1622 is generally always derived from MELT data, either based on a convention, configuration, or via an extensibility tap. It remains valid until either from or to entities expire. An association 1622 should (e.g., must) always be associated with a single association type 1612, which defines:
  cardinality
    cardinality of this association
    allowed values:
      ONE_TO_ONE
      ONE_TO_MANY
      MANY_TO_ONE
      MANY_TO_MANY
    cardinality is enforced at an association type level, which means that, for example, for an association with a ONE_TO_MANY cardinality, an entity can have at most one outgoing association of this type to another entity
  isHierarchical
    Whether this association is hierarchical. Can only be true if cardinality is ONE_TO_MANY or ONE_TO_ONE. A subgraph formed by hierarchical associations of the same type is always a directed tree
    There cannot be more than one incoming association of a given type with isHierarchical=true for a given entity
  isContainment
    Whether this association is a containment between from and to entities. Can only be true if isHierarchical is true. If true, the lifecycle of children is tied to the parent
    There cannot be more than one incoming association, regardless of type, with isContainment=true for a given entity An association 1622 contains:
type
  a fully qualified type reference to the association type
from
  a unique identifier of the entity from where this association is originating
  this entity must list this association type in its entity or an extension type
to
  a unique identifier of the entity to which this association is connected
  this entity type must be listed in the associationTypes in the entity or an extension type of the from entity Not all associations can be uniquely identified, there can be multiple associations with the same type, from and to fields if the type cardinality is MANY_TO_MANY. For other cardinalities (ONE_TO_ONE, ONE_TO_MANY), an association can be uniquely identified via type, from and to.

A span 1624 (STABLE) represents an operation within a transaction. Traces are defined implicitly by their spans. In particular, a trace can be thought of as a directed acyclic graph (DAG) of spans, where the edges between spans are defined as parent/child relationship. Each span 1624 encapsulates the following state:
entityId
  a unique identifier of the entity that produced this span
traceId
  unique identifier of the trace, used to group all spans for a specific trace together across all processes
spanId
  unique identifier of this span
parentId
  (optional) unique identifier of the parent span
name
  concisely identifies the work represented by the span, for example, an RPC method name, a function name, or the name of a subtask or stage within a larger computation
spanKind
  the type of a span, one of:
    INTERNAL
      Indicates that the span represents an internal operation within an application, as opposed to an operation happening at the boundaries
    SERVER
      indicates that the span covers server-side handling of an RPC or other remote network request
    CLIENT
      Indicates that the span describes a request to some remote service
    PRODUCER
      Indicates that the span describes a producer sending a message to a broker. Unlike CLIENT and SERVER, there is often no direct critical path latency relationship between producer and consumer spans. A PRODUCER span ends when the message was accepted by the broker while the logical processing of the message might span a much longer time
    CONSUMER
      Indicates that the span describes consumer receiving a message from a broker. Like the PRODUCER kind, there is often no direct critical path latency relationship between producer and consumer spans.
derivedEntityIds
  (optional) a set of unique identifiers of the entities that were derived from this span
a startedAt and endedAt timestamp
attributes: a list of zero or more key-value pairs
a set of zero or more events
  each event is a tuple (timestamp, name, attributes). The name must be a string
links to zero or more causally-related spans
statusCode
  (optional) one of
    ok
    error
errorMessage
  (optional) a developer-facing human readable error message
tags (UNSTABLE) (optional)

a list of tags
a source of this span

A metric (STABLE) is a numeric measurement reported for a specific entity. Metrics 1618 can include:
A numeric status at a moment in time (like CPU % used)
Aggregated measurements (like a count of events over a one-minute time, or a rate of events-per-minute)

A metric 1618 should (e.g., must) always be associated with a metric type 1608, which defines:
category
one of: meter_legacy, counter_legacy, rate_legacy, monotonic_legacy, average, sum, rate, sum_per_instrumented_entity, current_per_instrumented_entity, current
governs how this metric is consumed by default (how is value field calculated)
contentType
one of: sum, distribution, gauge
Content type of this metric
aggregationTemporality
one of "delta", "unspecified"
Aggregation temporality of this metric. For contentType sum and distribution it will be delta and for gauge it can only be unspecified
isMonotonic
Monotonicity property is understood in OpenTelemetry
type
A primitive type of the metric, allowed values: long, double
unit
UCUM compliant unit code, i.e. ms, s, min, /s, /min, /h, %
ingestGranularities
granularities at which this metric can be ingested, in seconds
attributeDefinitions
definitions of attributes that can be used to describe a metric of this type Each metric 1618 encapsulates the following state:
entityId
unique identifier of an entity that this metric belongs to
type
a fully qualified type reference to the metric type
source
a source of this metric
timestamp
a timestamp for this metric
attributes
(optional) a list of key-value pairs
must adhere to the attribute definitions in the corresponding metric type
if an attribute with a given name is not defined in a metric type, it is considered 'typeless' and its value will always be a string
tags (UNSTABLE) (optional)
a list of tags Depending on the contentType, a metric 1618 can include one or more consumptions functions. Also, the same metric type 1608 can be reported on multiple entities and from multiple sources, and each unique combination of type+entityId+attributes+source is referred to as a metric time series.

An event 1616 (UNSTABLE) is a discrete data record with known semantics which happened at a moment in time for a specific entity. Events 1616 should be used for infrequent things, like a purchase in a vending machine, but not for everything that the vending machine does. For example, let's say that you want to keep a history of the temperature in the vending machine. You could store an event 1616 for every minuscule, subdegree shift in temperature, which would quickly fill up even the largest databases. Or you could instead take a sample of the temperature at a regular interval. This kind of data is better stored as a metric. A log record is also an event, however, there is a connotation that a source of a log record is a log. Logs will be distinguished by separate event types.

An event 1616 may be associated with an event type, which defines:
attributeDefinitions
definitions of the attributes of this event There is no definition of a uniqueness for an event. Each reported event is a discrete immutable entry which is stored as-is. It is possible to have multiple identical events 1616 (same type, timestamp and attributes) stored in the system.

Each event 1616 encapsulates the following state:
entityId
unique identifier of an entity that this event belongs to
type
(optional) a fully qualified type reference to the event type
timestamp
a timestamp when this event has occurred
traceId
(optional) an identifier of a trace
can be set for logs that are part of request processing and have an assigned trace id
spanId
(optional) an identifier of a span
Can be set for logs that are part of a particular processing span
If spanId is present, traceId should also be also present
raw
(optional) a raw payload of this event
attributes
(optional) a list of key-value pairs
must adhere to the attribute definitions in the corresponding event type
tags
(optional) a list of tags
source
a source of this event According to one or more of the embodiments of the techniques herein, the following discussion defines solutions, their lifecycle, their packaging, their distribution, and their dependency model. Solutions have a heavy reliance on the JSON Store (described below) which makes solution artifacts available to services at runtime.

Figure 17:
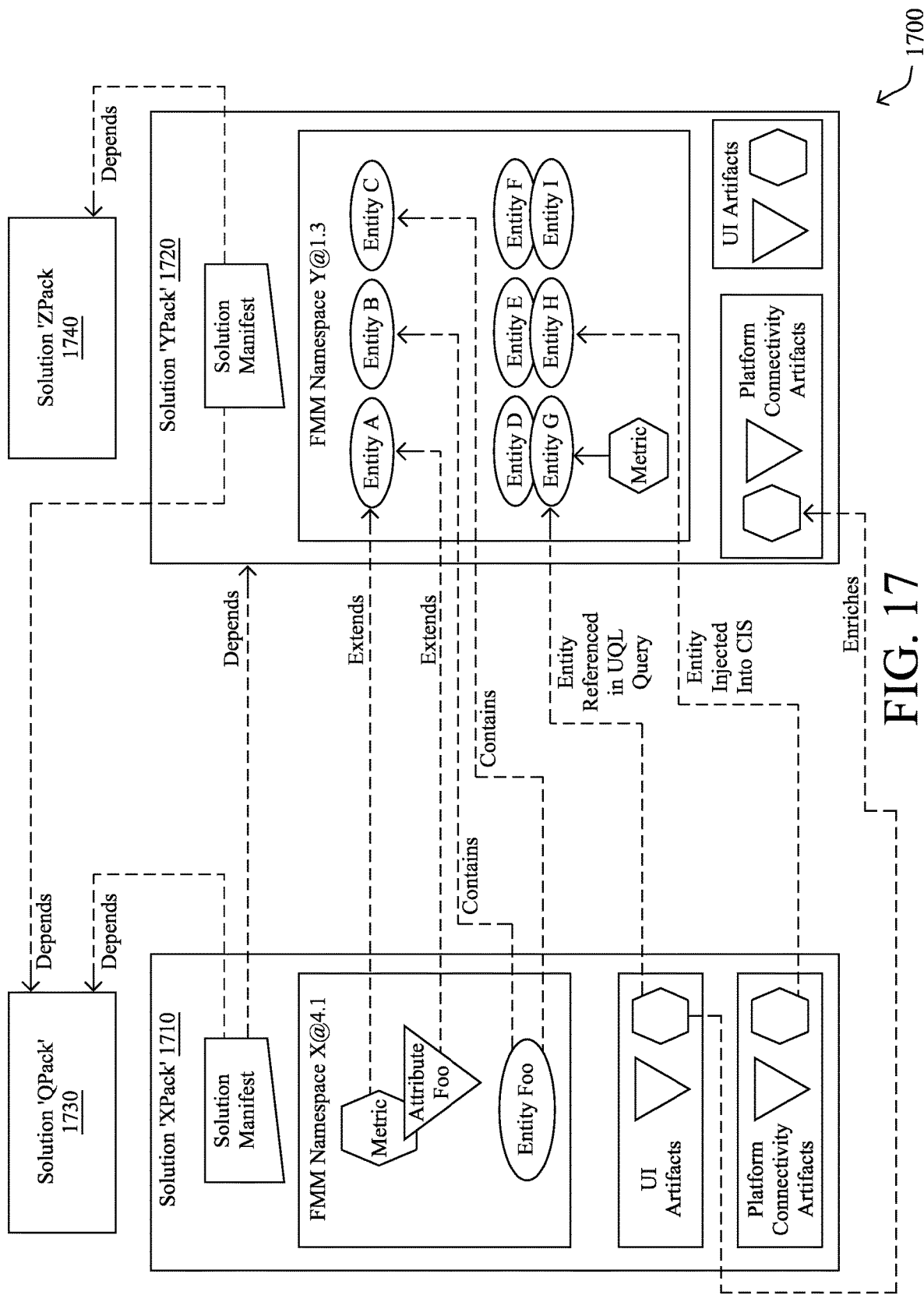
FIG. 17 illustrates an example diagram of solution packaging according to the techniques herein.

FIG. 17 illustrates an example diagram 1700 of solution packaging according to the techniques herein. In the diagram, there is a solution named "XPack" 1710 and a solution named "YPack" 1720 which are shown in detail. We also see two other solutions "QPack" 1730 and "ZPack" 1740 which are not shown in detail.

A solution is a grouping of JSON files and folders that is installed or removed from the platform atomically. As shown below, solutions contain subgroups (folders) of related artifacts:
FMM models and configs;
UI artifacts (visualizations, enrichments); and
Platform Connectivity Services (custom REST/GRPC endpoints, custom cloud collectors).

These artifacts are allowed to reference artifacts in other solutions packages. The reference mechanism varies based on the artifact type. For instance, in the FMM, the mechanisms of extension and Association are used to make references across FMM namespaces. The diagram 1700 shows links labeled "contains" (a type of FMM association used in rollups), and "extends" (a mechanism allowing one solution to add functionality atop another—this is how the techniques herein create a system "health" solution that adds health attribution to all system entities). The FMM has its own type reference system based on namespaces. A type reference in FMM is encoded as <namespace>:<type>, therefore Namespace X can extend Y: EntityB (an entity that lives in another namespace). An FMM namespace is analogous to a java package, and a type is analogous to a class. So we see that FMM components can declare a reference to an artifact defined in another namespace, however, just like in java, there still needs to be a way to ensure that the necessary "packages and classes" are present at runtime. In Java there are systems like Maven that are responsible for identifying and downloading packages with the required dependencies. The techniques herein articulate the mechanism in the extensibility platform by which FMM dependencies are located and installed into the runtime environment because the FMM itself has no position on this.

UI artifacts and platform connectivity services also make reference to FMM artifacts. For example, a UI artifact may be powered by a UQL query that is defined as part of the artifact. The UQL allows the query to specify a target entity to fetch and the UQL also uses the <namespace>:<type> system of the FMM. However, we could also foresee that a UI artifact in the XPack solution may want to enrich a UI artifact in the YPack solution. It may not be known what this reference mechanism looks like. A UI artifact is not an FMM model so presumably it cannot be referenced by an FMM reference (<namespace>:<type>). Such a reference is shown on the line labeled "enriches" in the diagram 1700.

In order for the system to locate and install all required dependencies (FMM models, UI artifacts, etc.), the package contains a manifest. The manifest tells the platform what solution dependencies are required. Although there are some approaches to parsing artifacts to determine dependencies, the most straightforward solution is to allow the solution developer to provide a manifest with a list of dependencies.

A manifest JSON (manifest.json for Xpack Solution) might look like this:

```
{
  "name": "XPack",
  "version": "2.2",
  "dependencies": ["YPack", "Qpack"],
  "description": "Provides FMM entities for enhanced MongoDB monitoring",
  "contact": "foo@bar.com",
  "homepage": "solutions.appd.com/XPack",
  "gitRepoUrl": "https://github.com/XPack/solution"
}
```

Solution packaging itself is based on a number of defined terms below:
- solution—a collection of files, each file/folder having a purpose known to the platform.
  - Every solution must have a structure that we can call the "solution package format or layout".
  - Solutions can be packaged into a tar-zip (.tgz) file and hosted in a binary repository such as artifactory
  - A solution .tgz file should be named as <solution-name>-<major>.<minor>.tgz
    the solution name should be descriptive; For instance, if a single FMM model like common: k8s is placed in a solution with no other artifacts, it probably makes sense to call the package common-k8s.3.2.tgz
  - solution version—the solution's version is read from manifest.json
    FMM namespace is independent of a solution version and has no impact on solution versioning.
- Solution Registry—
  - a global registry used to map solutions to tenants (the mapping constitutes a subscription)
  - the solution registry is integrally linked to the JSON store. The solution registry's interplay with the JSON store is shown here in the JSON store docs.
  - this registry can be wrapped in consumer user interfaces and web pages so that a human "solution owner" can manage the solution in the registry
  - the solution owner is responsible for updating the solution if the package changes. The registry keeps (or has a pointer to) only one version of a solution.
  - The solution registry will record a checksum (and store a history of version→checksum) over the solution package each time the solution package changes. If package contents are changes, this system ensures that the version in manifest.json must at least be different.
  - The solution registry can perform some basic checks on artifacts. For example it ensures that for a given FMM namespace, that there is exactly one solution registered as the owner of the namespace. This prevents namespace hijacking in which a 3rd party could alter an FMM namespace it does not own.
  - All production cells deploy the version of the solution held/pointed-to by the registry
  - Solution registry allows special test cells to be fooled into thinking a version of a solution other than current, is current. This allows test cells to have tenants subscribed to a version that is not yet promoted to current.
- FMM namespace
  - An FMM namespace is a collection of all FMM artifact definitions.
  - An FMM namespace has no required relationship to a solution name
  - An FMM namespace is deployed to a cell in its entirety, from a solution version.
  - An FMM namespace's artifacts will never be "cobbled" together from multiple solution repos.
  - The cell solution syncer (in a cell) tracks a 1:1 mapping from FMM namespace to repo+sha mapping and will reject any FMM artifacts that attempt to be deployed "on top of" an existing FMM namespace. In other words, namespace artifacts are conveyed as an atomic unit, from a single solution version, into a cell.
  - An FMM namespace is either present, or absent, in its entirety on a cell.
- Subscribing—
  - For a tenant to be subscribed to a solution, the solution artifacts must exist in the global level of the cell's JSON store (as mentioned earlier the git repo syncer handles this; it is part of the JSON store)
  - The first tenant to subscribe to Solution Foo, triggers all FMM namespaces to sync from Solution Foo and all its transitive dependencies, into the global level of the cell's JSON store.
  - The second tenant to subscribe to Solution Foo triggers no installation actions, since Solution Foo's artifacts are already installed in the cell's JSON store.

Local tenant-to-subscriptions mapping
  When a solution is "subscribed" by a tenant, it means that activities described by the solution will be executed upon that tenant's MELT data. For example, an FMM namespace may provide a "contains" relationship performing spatial metric rollup.
  when MELT data flows through the system is must be accompanied by sufficient meta data to identify its tenant
  conditional execution—execution logic described by FMM configs for Solution Foo is executed conditionally for Tenant X based on whether the cell's subscription registry contains a mapping from Tenant X to Solution Foo
  the local subscription registry is implemented as a JSON document living in the tenant layer of the JSON store (each tenant has a subscriptions document)
Unsubscribing—
  when a tenant unsubscribes, the mapping of Tenant X to Solution Foo is removed from the local tenant-to-subscriptions mapping
  If no tenant remains subscribed to Solution Foo, Solution Foo's FMM namespaces can all be automically removed from the Json Store's global level (please keep in mind that the Global level is replicated into each cell, so this amounts to simply uninstalling all the solution's namespace artifacts from the local cell)
Customizing—
  FMM configs (not models!) can allow for per-tenant customization
  Per tenant customizations are implemented according to the layering strategy described here.
  For example
    a config for trace sampling may include a sampling frequency. If allowed, each tenant may override the default.
    A config may contain default OpenTelemetry metric attribute names that map a metric to an entity. If allowed, each tenant may alter the list of attribute names.
  Customization implies that configs for actions taken in FMM pipelines must be dynamically read from the JSON stores tenant layer where per-tenant changes are applied on top of the global layer. Pipelines are free to use caching to optimize, but where allowed in a config, must be prepared for each tenant to provide a unique value for a given field in a JSON config.

——Tenant-Specific Solution Subscriptions——

The techniques herein extend and/or support the extensibility platform described above by describing Tenant-Specific Solution Subscriptions (e.g., a JSON Object Store) component of the extensibility platform described herein. In particular, as described below, the JSON store allows developers to package configs in a prescriptive manner called a "solution". Solutions are synchronized from a global solution repository into a JSON store of each cell. In the cell, configs are consumed by services through a uniform JSON store API.

As background, JSON files are needed by many elements of the platform, as well as by end users of the platform. For example, various needs are for such things as, e.g., backend FMM configs (for example, the attribute to entity mapping config in the common ingest pipeline), dashboard storage, end user preference storage, and so on.

Figure 18:
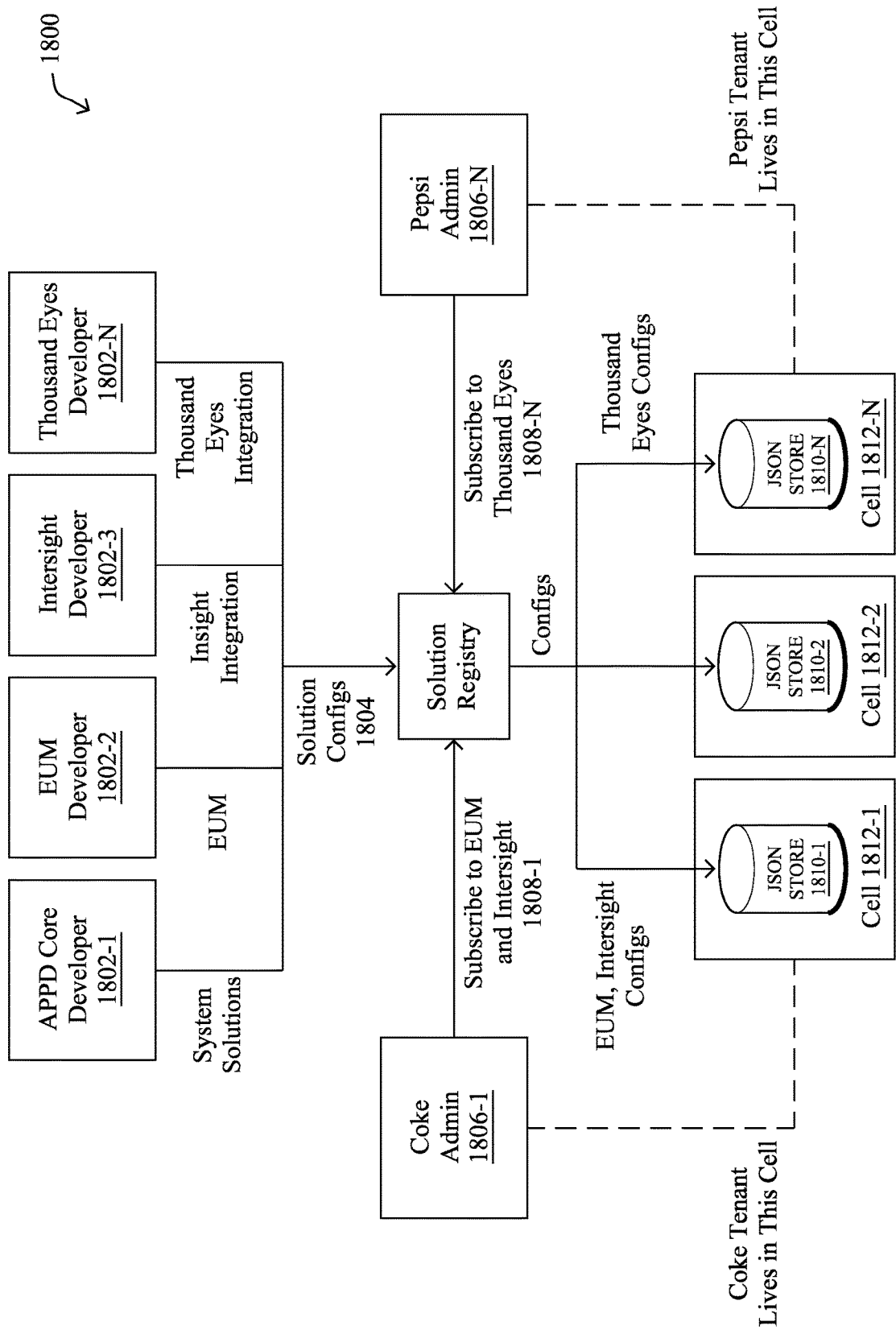
FIG. 18 illustrates an example network of solution developers who are able to package solution configurations.

Backend FMM configs are an example of JSON objects that are consumed in many places by common ingest. The problem is that these configs do not have a rigorous lifecycle. There is a manual process of "putting configs in place" across various services, which makes it impossible for anyone but a backend developer to provide configurations. The JSON store solves these problems by allowing developers to package configs in a prescriptive manner called a "solution". Solutions are synchronized from a global solution repository into the JSON store of each cell. In the cell, configs are consumed by services through the uniform JSON store API. FIG. 18 shows a network 1800 of solution developers 1802 (e.g., 1802-1 . . . 1802-N) (including internal system solutions) who are able to package solution configs 1804. Tenant admins 1806 (e.g., 1806-1 . . . 1806-N) are then able to subscribe 1808 (e.g., 1808-1 . . . 1808-N) to solutions (such as Intersight, a third party app), which results in the solution configs 1804 being loaded into the JSON store 1810 (e.g., 1810-1 . . . 1810-N) of the cell 1812 (e.g., 1812-1 . . . 1812-N) where the tenant resides.

Figure 19:
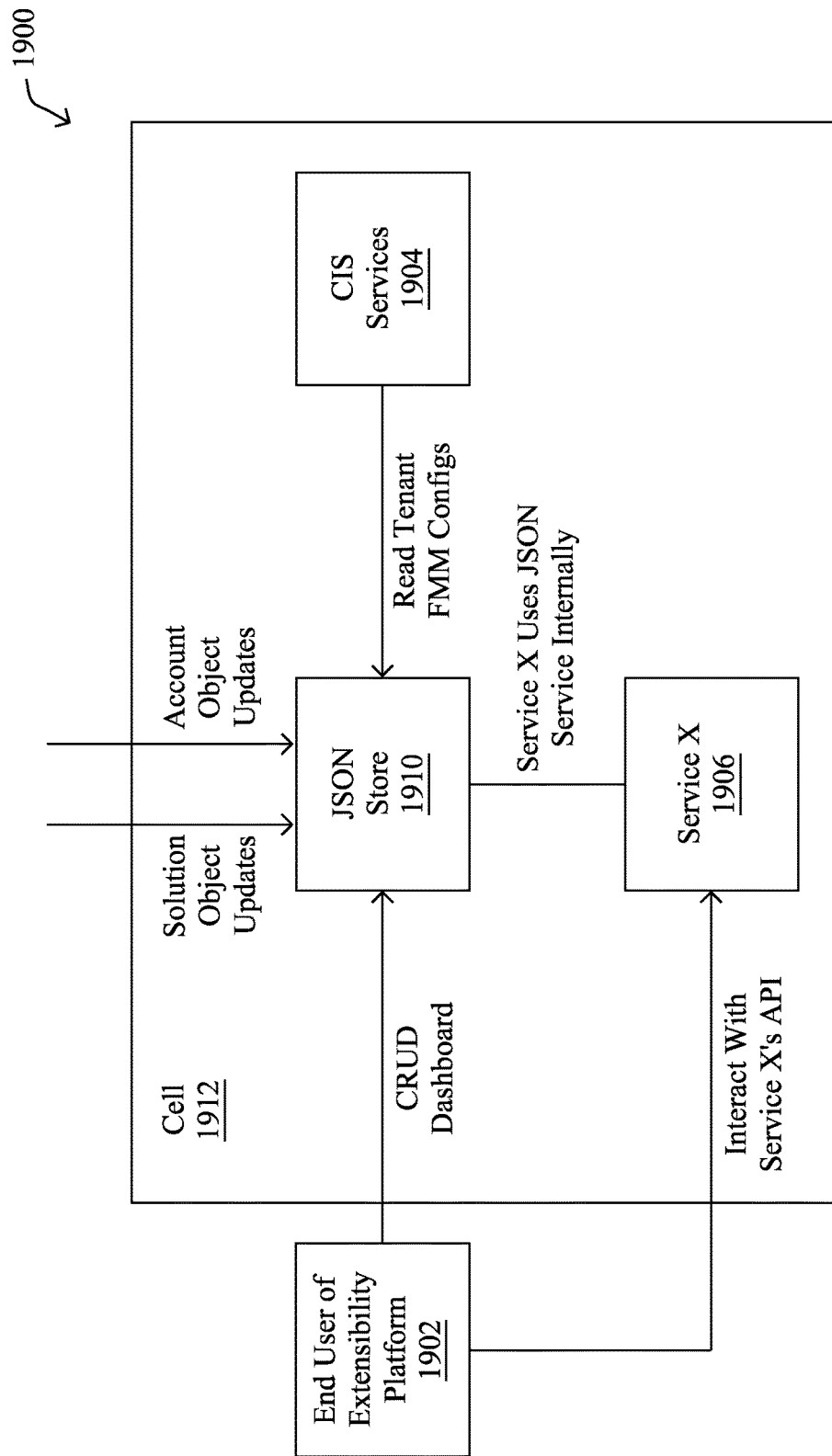
FIG. 19 illustrates an example of how the JSON store manages JSON objects.

In addition to solution configs 1804, which are accessed by platform services such as CIS, the JSON store 1810 manages JSON objects such as dashboards that are owned by individual users. This is shown in FIG. 19 in the illustration 1900 shows an end-user 1902 interacting with JSON store 1910, CIS services 1904, and/or service API 1906 within a cell 1912. Illustration 1900 shows how the JSON store 1910 manages JSON objects. These JSON objects are not packaged into solutions, but are created directly by the actions of end-users 1902 such as "create new dashboard". The JSON store 1910 manages the user-to-object mapping, which makes life easier for any platform service that needs per-user content. If a service is nothing more than CRUD on a JSON object, then the extensibility platform user interface can directly use the JSON store 1910, without a wrapper service. More complex services will use the JSON store 1910 both to avoid wheel-reinvention, and to allow their service to be configured by solutions. As shown, it may be possible for the extensibility platform UI web client to directly CRUD a dashboard object. The illustration 1900 also shows the indirect CRUD model in which the "Service X" is standing in front of the JSON store 1910 to provide complex object validation and other domain logic.

Regarding automatic management of user objects, it is important to note that the JSON store 1910 transparently manages "ownership" of objects. Whether it is a user's dashboard, or a tenant's pipeline config, the JSON store 1910 automatically recognizes the identity principal of the user, and uses this information to target the objects owned by that principal. The identity principal can be a tenant itself. This allows platform configs to be retrieved by internal services that are using the config to provide data processing parameters.

According to the extensibility platform herein and with reference again to the example 1000 of FIG. 10 above, every object in the json store 1910 has a type defined by a schema. Solutions can create their own types. The JSON store 1910 logically segregates objects of the same types into tables. Within a single cell, there can be many JSON stores 1910, each operated by a different team. A service mesh istio traffic rule may be used to determine which type-table lives in which store. This is enabled by the JSON store REST API which is structured as /json/<type>. The <type> in the path is used to route API requests for objects of different types to the correct underlying JSON store 1910. In this manner, if the type is "dashboard", API requests regarding dashboards are always directed to the JSON store istio virtual service operated by the dashboards team. A given store may hold many different type-tables. However, a type-table may live in exactly one JSON store. This design allows teams to operate their own JSON store 1910 without taking an operational dependency on other teams.

Figure 20:
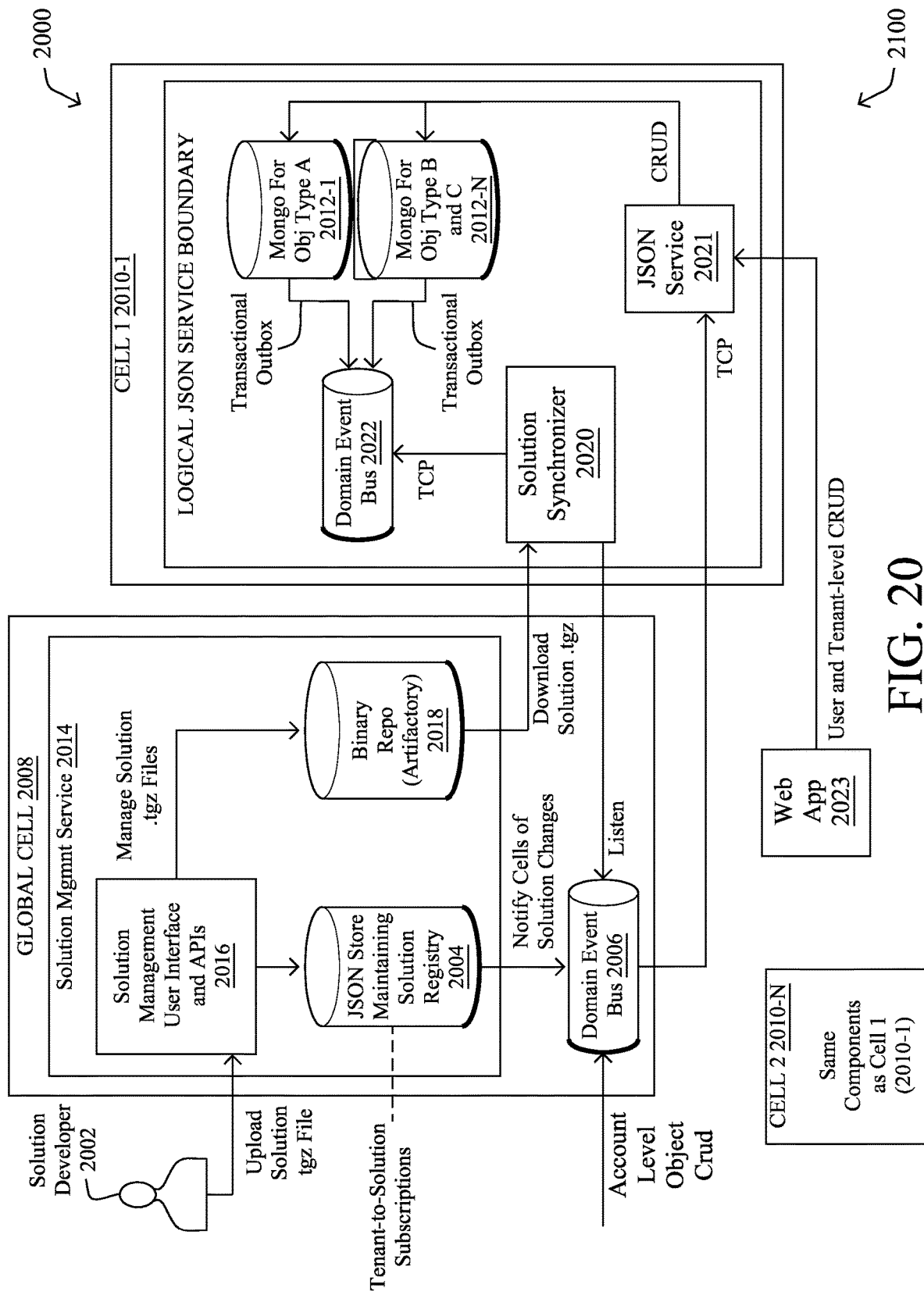
FIG. 20 illustrates an example architecture diagram for cell-based JSON stores.

FIG. 20 illustrates an example architecture diagram 2000 for cell-based JSON stores. In particular, solutions are collections of JSON content (configs of one form or another). These solutions are managed outside of the JSON store, meaning developers 2002 (both internal and external) create these solutions and upload them to a solution registry 2004. However, there is a close tie-in with the JSON store. At runtime, systems that need to consume configs, talk to the JSON store in their cell. This means that solution configs may be required to be synced from the solution repository to the local JSON store of a cell (e.g., synchronization involving solution synchronizer 2020 and/or binary repository 2018). A more detailed view of the system shows how a solution is packaged as a binary tgz file, and how the solution registry 2004 uses the global cell 2008 domain event bus 2006 to inform cells 2010 (2010-1 . . . 2010-N) that a package of solution configs needs to be redeployed into the JSON store (due to changes in the package). The developer 2002 may be a third part solution developer who may be free to utilize git but may be required to upload their solution package to the solution management service 2014 of the system (e.g., via solution management user interfaces and/or APIs 2016. The diagram 2000 also shows multiple mongoDB instances 2012 (e.g., 2012-1 . . . 2012-N) that are used as the document stores accessible by JSON service 2021 and/or domain event bus 2022. As described earlier, document types are segregated into different physical document stores operated independently by domain teams. In order to provide atomic, eventually consistent transactions across stores (which is needed for the inter-object references) the system will provide built in support for sagas. The sagas provides a guarantee of eventual consistency for atomic multi-store actions such as "insert an entry into Table A, and add a reference to from an item in Table B" Where A and B may be in different document stores.

In an example CRUD operation, a user may save changes to a dashboard at web application 2023. For example, a tenant admin may change a trace sampling frequency.

Due to the distributed nature of the system, there is no way to ensure instantaneous activation of multiple solution artifacts in multiple stores. Two phase commit (TPC) helps the techniques herein to minimize the time in which application artifacts are in an inconsistent state (for instance when some but not all the solution artifacts have been activated), and also to handle the case when a proposed solution artifact is in an invalid state (solution developer has made a mistake or error in their config that cannot be detected before the solution is published). In this latter case, there are new or updated solution artifacts, where one or more of the artifacts is broken, and TPC helps prevent activation of a broken artifact by progressing in phases:

1. pre-commit phase—each solution artifact is published on the bus as part of a "pre-commit" message. The message must have a TPC id. There will be one message per artifact. And each message will contain index of the artifact in the solution. When a store has received all the messages for a solution, it will reply with 'pre-commit response' containing success or failure, depending on whether all artifacts are valid as per the store, or not.

2. commit phase (happy path)—This happens when all the stores have voted "success". In response a single commit message is published on the domain event bus with the TPC id. All stores must now act on the commit message and commit the updates.

3. abort (sad phase, mutually exclusive with commit phase)—in the pre-commit phase some stores have responded with "failure". In response a single "abort" message is published.

In addition, when a proposed solution artifact is in an invalid state, the techniques herein may raise appropriate audit events to alert the subscriber and possibly the solution developer that a TPC has been aborted or did not complete due to timeouts of ack's.

As will be appreciated, the JSON stores files, but it is more than just that. If a file has no default values, or simple defaults that can be captured in its JSON schema, then the JSON store can store that file as simple JSON "blob". However, more complex cases for defaults, and overriding defaults are common. For example, consider the common case where each tenant wants to set the default timezone shown in the user interface for users of that tenant, but each end user can override the timezone setting. The JSON store is built to accommodate these scenarios with a concept called "layering".

Figure 21A:
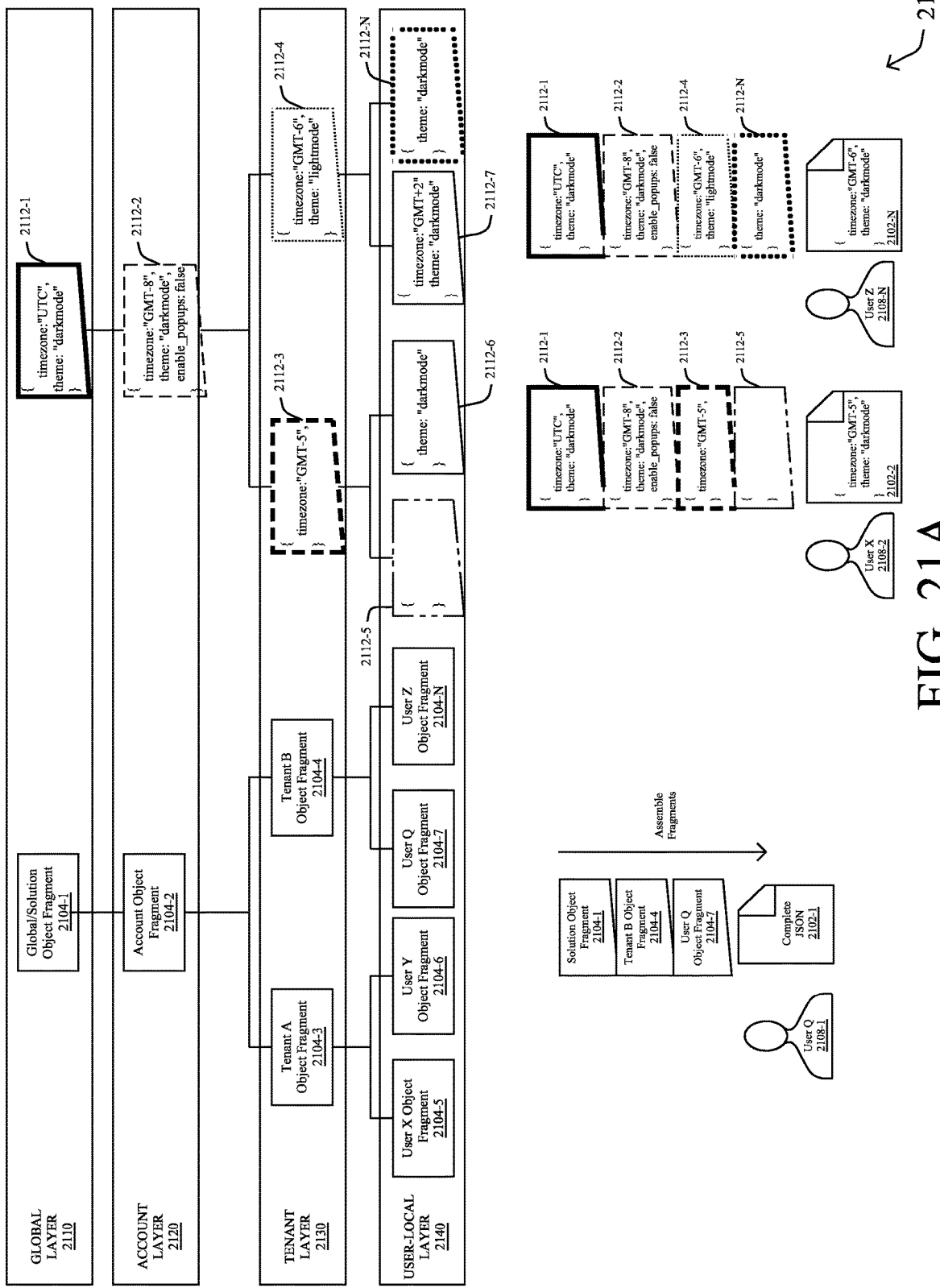
FIGS. 21A-21E illustrate an example of layering within the JSON object store, in particular where
Figure 21B:
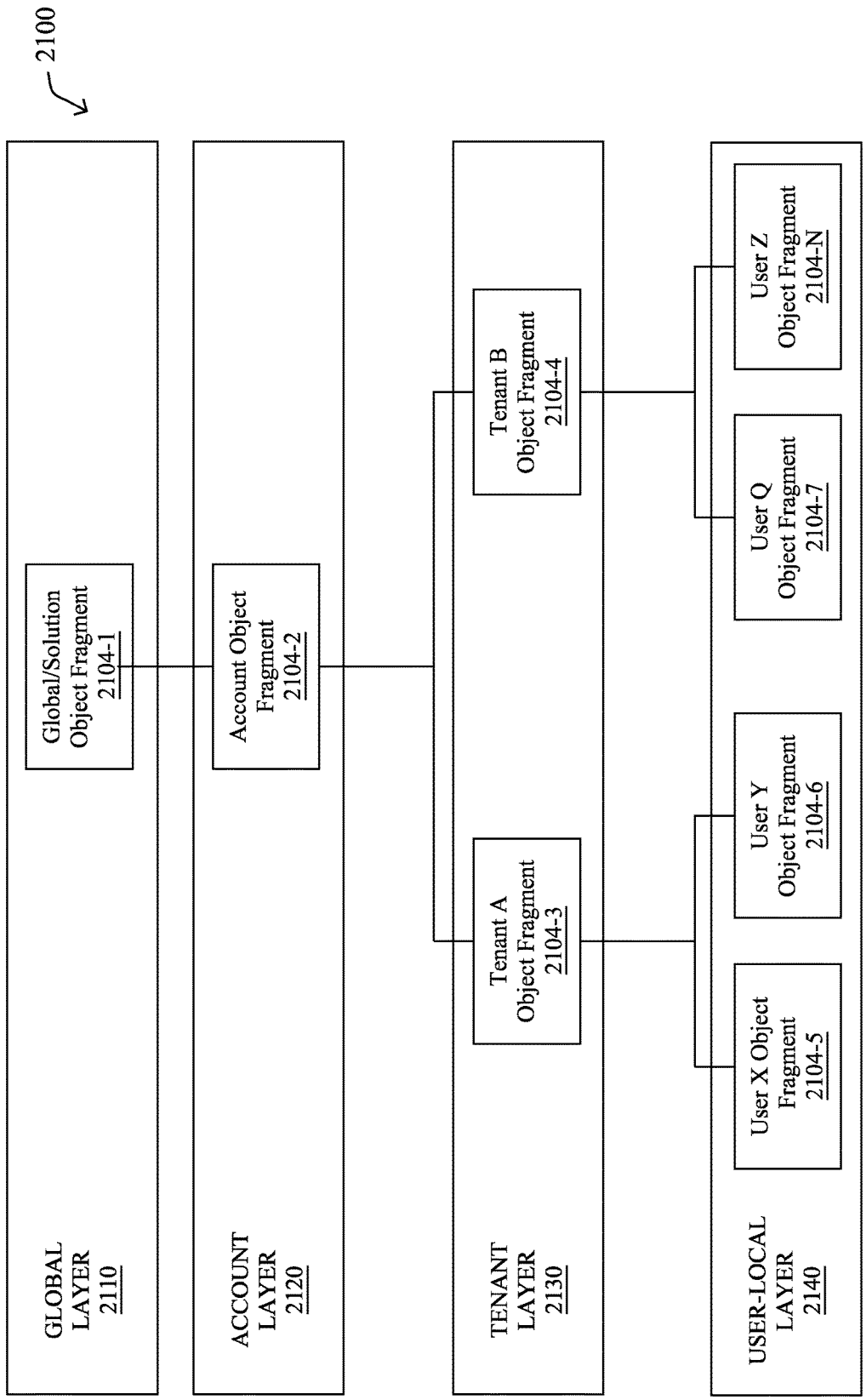

FIGS. 21A-21E illustrate an example 2100 of layering within the JSON object store (with FIGS. 21B-21E illustrated zoomed-in quadrants of FIG. 21A). Layering means that the JSON document (e.g., complete document 2102 (e.g., 2102-1 . . . 2102-N)) returned to the caller (e.g., user 2108 (e.g., 2108-1 . . . 2108-N)) is assembled at read-time by composing a hierarchy of document fragments 2104 (e.g., 2104-N). As illustrated in FIG. 21B, a JSON store may store the object fragments 2104 at different levels of ownership. The fragments 2104 by themselves are partial documents. The JSON store may lazily assemble JSON documents by combining one fragment 2104 from each level to create a complete document 2102 which conforms to a descried JSON schema. That is, when the fragments 2104 are assembled in layers, a complete document 2102 results. Layering allows for mutable defaults. With this model, a solution can provide default UI settings at the Global level 2110, and again at the account level 2120. At the tenant level 2130, each tenant can save a fragment that overrides a field, for example the timezone setting. And at the user level 2140, end-users can adjust their timezone or any other user-mutable settings. When a user queries the JSON store for their UI settings, they receive a settings object that complies with the json schema provided by the solution for user settings.

Figure 21C:
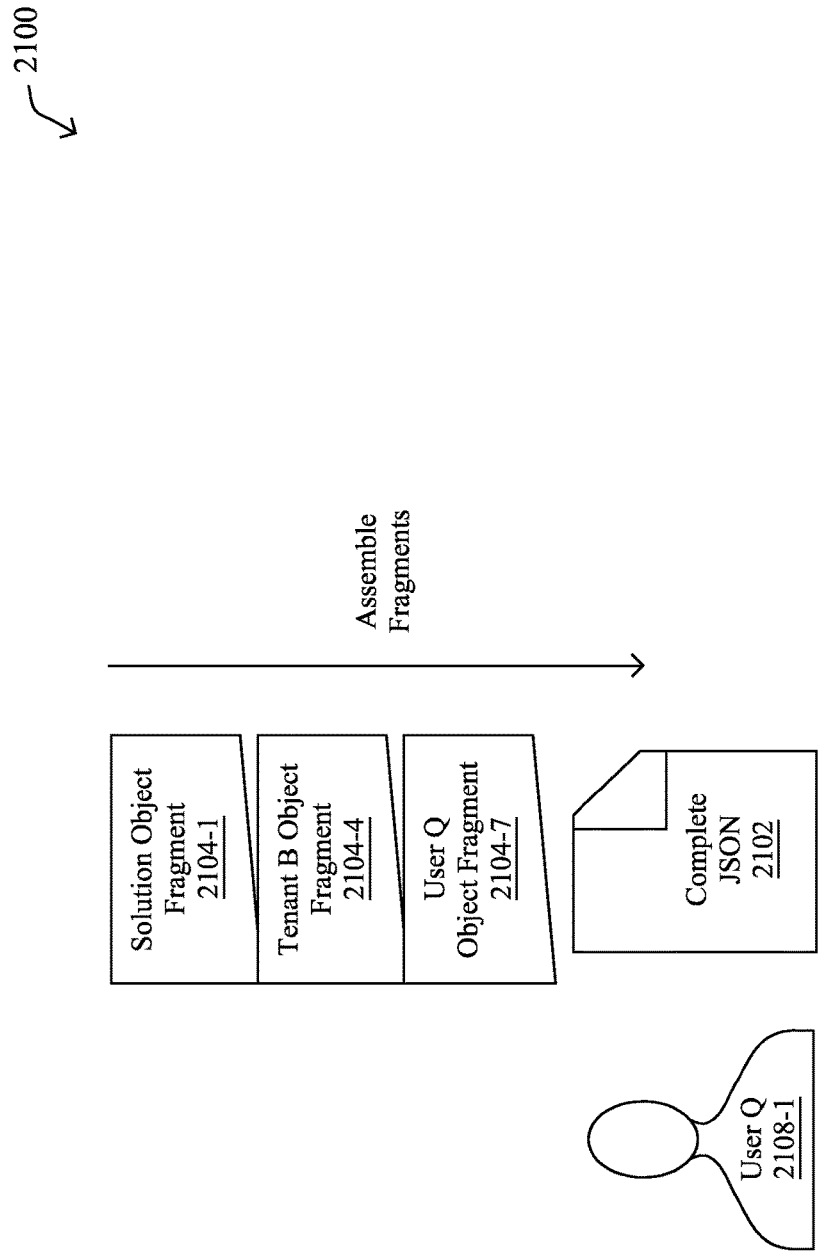
Figure 21D:
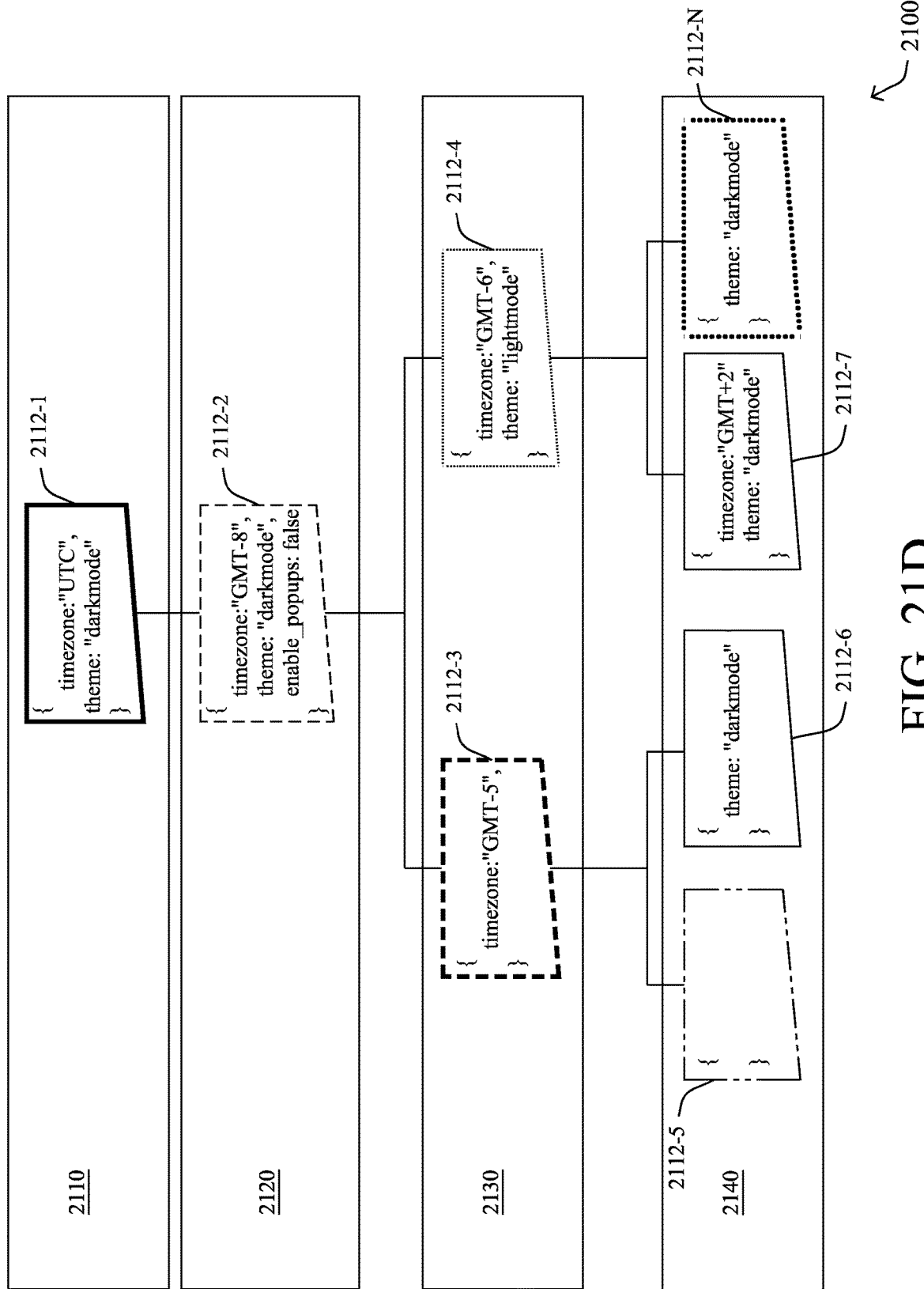

FIG. 21C illustrates a specific example of how each UI config object 2112 (e.g., 2112-1 . . . 2112-N) is stored in terms of a time zone and/or theme configuration. A global default (e.g., saved as UI config object 2112-1) may be stored at the global level 2110. At the tenant level 2130, different tenants (e.g., tenant A and tenant B) have each made their own customizations to the defaults (e.g., saved as UI config object 2112-3 and UI config object 2112-4). At the user level 2140, many different users may have saved their own values for the time zone and/or theme configurations (e.g., saved as UI config object 2112-5, UI config object 2112-6, UI config object 2112-7, and UI config object 2112-4).

Figure 21E:
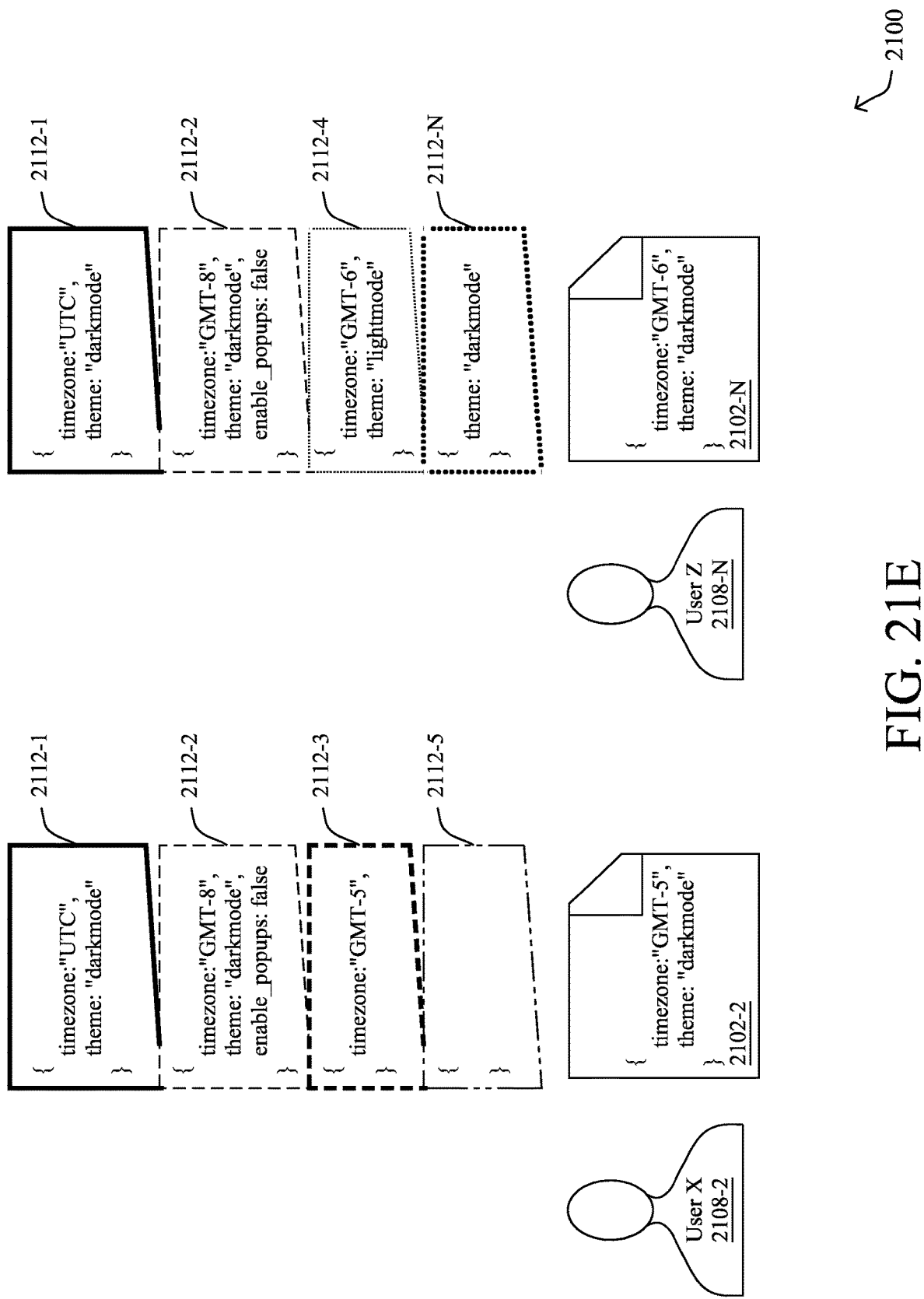

FIG. 21E then shows how the UI config objects 2112 of User X (e.g., user 2108-2) and User Z (e.g., user 2108-N) are assembled, respectively. Each final document 2102 may be built from the fragments 2104 that trace a path from a global object (e.g., UI config object 2112-1), through the tenant object (e.g., UI config object 2112-3 and UI config object 2112-4) where the corresponding user 2108 resides, and down to a leaf user object (e.g., UI config object 2112-5 and UI config object 2112-N) of the corresponding user 2108.

The fragment model exists to support object models that require defaults, but it does not force that model onto consumers. In other words, if a service needs to store an object it is free to store a complete object and not to use layering.

Figure 22:
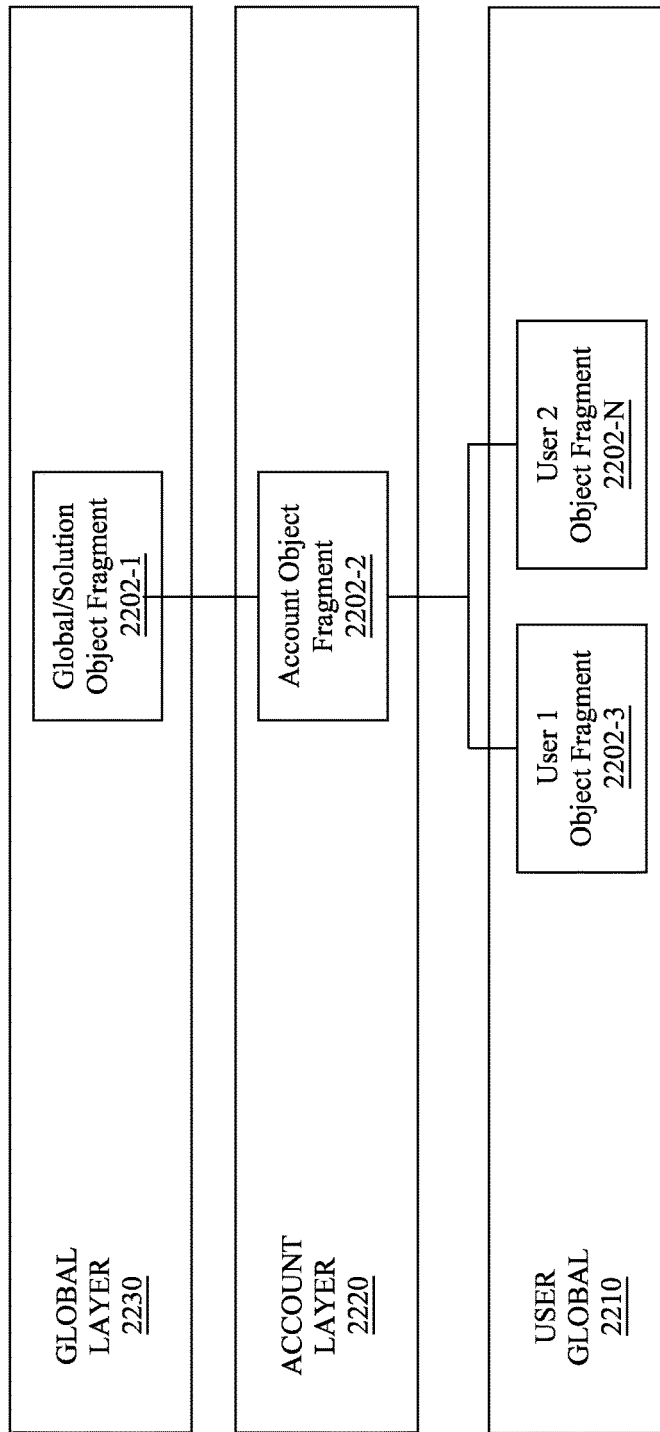
FIG. 22 illustrates an alternative example of layering within the JSON object store, in particular with regard to a user-global layer arrangement.

In addition to the user-local layer, as shown in the alternative example 2200 of FIG. 22, fragments 2202 (e.g., 2202-1 . . . 2202-n) can be layered among a user-global layer 2210 used for user objects like UI preferences that must follow the user to any tenant the user logs into. Account layer 2220, and user-global layer 2210 are replicated globally on the global event bus (global level 2230).

As defined herein, therefore, the following layers/levels can be used with the layering model herein:

Global Level—a fragment (e.g., fragment 2202-1) in the global level can be either:
  a true singleton object (some kind of global setting. For instance the Disaster Recovery service could use a global object to store backup snapshot frequency. It is literally a single value that is needed by every cell.)
  a "default" for tenant scope objects like tenant-customizable ingestion configs.

Account Level—account level fragments (e.g., fragment 2202-2) allow each account to have independent settings.

Tenant Level—tenant level fragments allow each tenant to have independent settings.
  The EUM application will allow tenants to save a custom trace sampling frequency. Any settings that affect the ingest pipeline are likely to be either global, or per tenant. (It is unlikely that individual users will have customized ingest pipelines.)
  A particular tenant admin may decide that she wishes to change the default of "enable_help_popups". This change will "shadow/override" the global value, for her tenant, thus customizing the application for her tenant.

User-global Level—user-global level fragments (e.g., fragment 2202-3 and fragment 2202-N) are likely to be used for end-user specific settings such as personalized true/false for 'enable_help_popups' and many other user UI preferences that should be available in any cell the user can log into.

User-local level—user-local level fragments are used to save objects that are specific to a cell, such as a tenant-specific dashboard.

Note that one of the key reasons for layering is to support global-wide and tenant-wide changes easily. Layering is a form of normalization of data. Layering allows a solution to make a change in a single place, and have that change affect all tenants and users, if desired. This is optimal because it keeps solution management simple. The solution owner does not need to adjust defaults in every tenant. They use the global layer to make a single adjustment, and rely on the JSON store to ensure that every tenant receives the new value.

Figure 23:
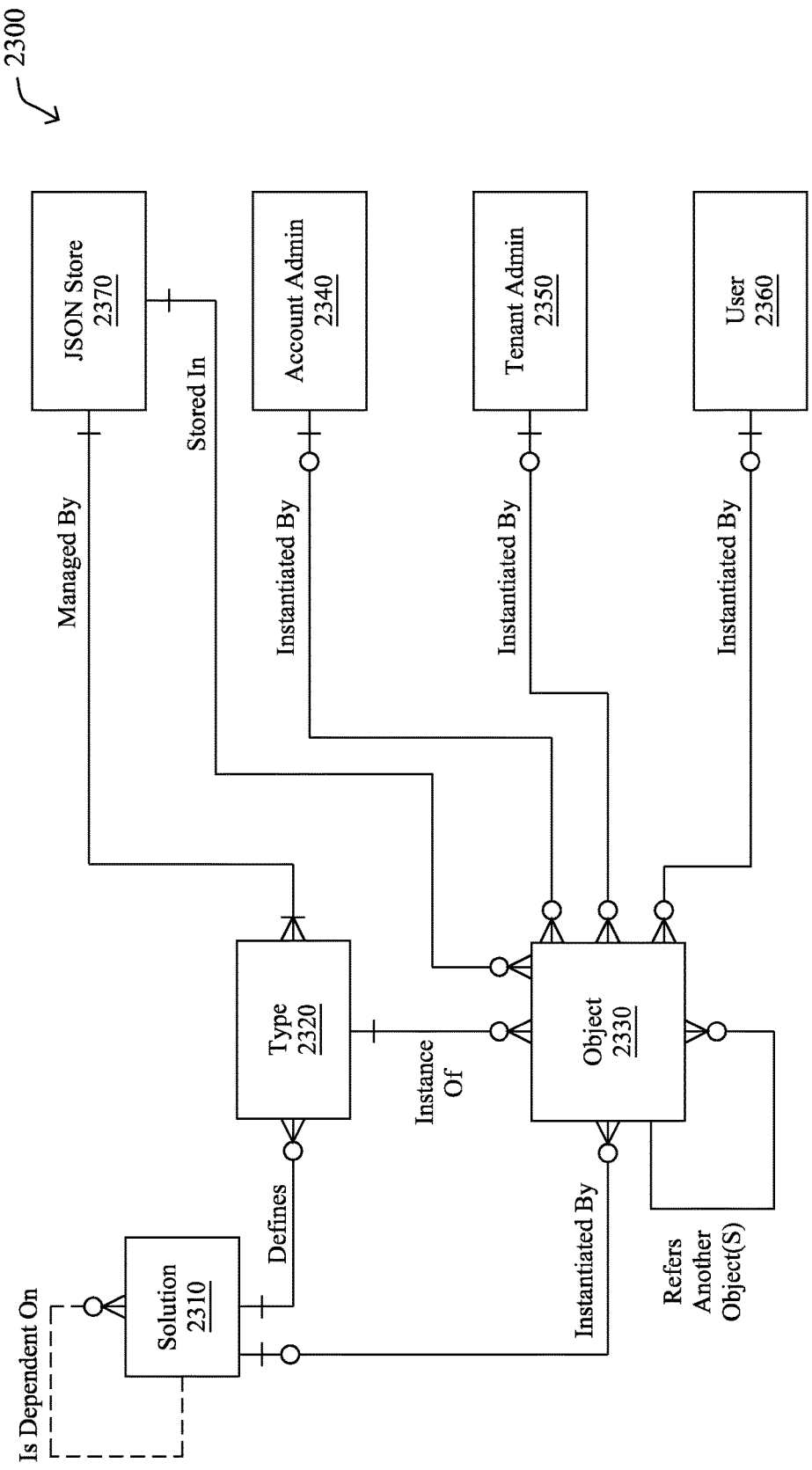
FIG. 23 illustrates an example of a logical model that defines the relation between various pieces of a JSON store.

Further according to the techniques herein, FIG. 23 illustrates an example of a logical model 2300 that defines the relation between various pieces of a JSON store. Here it can be seen that Solution 2310 defines zero or more Type 2320, e.g., a dashboard solution could define a dashboard type. There could be zero or more instances of dashboard which is represented as an Object. Objects 2330 could be instantiated by Solution 2310, Account Admin 2340, Tenant Admin 2350, or Users 2360 directly. For example if a solution would like to create built-in dashboards, which will be available to all tenants subscribing to that solution, those dashboards will be instantiated by Solution. Similarly Users can instantiate more dashboards. Having said that, there could be a few types which can't be instantiated by Account Admin, Tenant Admin or users. The Type definition of those types will annotate the type accordingly. Also there could be situations where the single object for a type can exist for a Solution, Account Admin, Tenant Admin or Users. That is defined as a Singleton. (Singleton vs Collection is described below). Type definition of such types will also annotate the type mentioning the singleton behavior.

The JSON store 2370 can be thought of as several logically separate data stores; one store for each "type" of object stored in the JSON store. Each type must have a JSON schema, and each type appears in the REST API for the JSON store. For instance a system solution called "visualization" contains a type definition called "dashboard". Therefor all dashboards objects are rooted at the REST path/json/visualization/dashboard and must adhere to the schema. However, JSON schema may be insufficient to carry all of the information needed to define a type. One place where additional needed metadata not conveyed in a JSON schema has to do with object identities, and references.

To access an object in the JSON store via its REST path the object id must be included. In general, /json/<solution>/ <type>/<id>. Consider an REST path:

/json/shopzilla/shoppingcart/1214ca56-83b9-416f-8536-fa953308429b.

Shown below is what the JSON store would return (for a shopping cart that only includes one product) for an object reference:

```
{
    lastUpdated:"04:19:21:13 06/12/2021"
    product: "fdd3bed-126b-4ee9-a513-ae5f856946fe",
    total: 15.32
}
```

Looking at the json shopping cart object above, we can guess from the field named 'product' that "fdd3bed-126b-4ee9-a513-ae5f856946fe" is a unique identifier of a product. But the system doesn't (and cannot) rely on any guessing or heuristics. Instead, the solution packaging system includes type metadata that tells us very specifically which fields of the JSON document are allowed to contain id's ("references") to other objects, and what type of objects the references refer to. The type definition of the shopping cart type would have metadata shown below to define the reference to the object of type product. The "referenceQualifiers" section of a type definition tells the JSON store which fields of an object are references that must be "qualified". Qualifying means that the information shown in the JSON document is an id (aka a 'reference' to an object of another type) and must be combined (qualified) with the reference prefix telling the solution and type.

```
"referenceQualifiers" : {
    "$.product" : [
        "/json/shopzilla/product"
    ]
}
```

In this way, the JSON store knows that the field product is a reference (an id) equal to fdd3bed-126b-4ee9-a513-ae5f856946fe and that this id must be qualified (combined) with /json/shopzilla/product/ to form the fully qualified reference:

/json/shopzilla/product/dd3bed-126b-4ee9-a513-ae5f856946fe

Additionally herein, references may also point to arrays. Using the understanding of references from above, the definition of a shopping cart can be expanded to include an array of products in the cart: This is illustrated in the below array reference:

```
{
    lastUpdated:"04:19:21:13 06/12/2021"
    products: [
        "fdd3bed-126b-4ee9-a513-ae5f856946fe",
        "0df36d2-4164-4f66-88a3-efd587a306ce"
    ]
    total: 25.64
}
```

Regarding dereferenced fetching, the API herein allows for instructing the server to prefetch references. For instance, imagine the shopping cart object has a reference array called 'products'. As such, the techniques herein can perform an operation to GET /json/shoppingcart/1214ca56-83b9-416f-8536-fa953308429b?prefetch=*. When this is performed, all the object references are prefetched. Note that instead of the products field having products: "fdd3bed-126b-4ee9-a513-ae5f856946fe", the content of the products array has been transitively prefetched, as shown in the following prefetched reference:

```
{
    lastUpdated:"04:19:21:13 06/12/2021"
    products: [{name:foo, cost:0.99, status: "available", sellers: [{name: Seller1}, {name: Seller2}]}, {name: bar, cost:14.99, status: "outOfStock", sellers: [{name: Seller2}, {name: Seller3}]}]
    total: 25.64
}
```

The techniques herein also allow for being selective to specify exactly which fields to dereference: /json/shoppingcart/1214ca56-83b9-416f-8536-fa953308429b?prefetch=products. As with all URL query parameters, the parameter can be repeated to specify a list of fields to prefetch.

Regarding object spreading herein, consider an Employee object containing a field named 'team'. The following query, which does not use spreading, shows the dereferenced fetch of the 'team' field: /json/Employee/1214ca56-83b9-416f-8536-fa953308429b?prefetch=*. As can be seen, the 'team' object has been prefetched, as in the prior examples of prefetch.

```
{
    firstName: 'john',
    lastName: 'doe'
    team: {
        teamName: "municipal waste cleanup",
        code: "SFO"
    }
}
```

Using the 'spread' operator, the team object can be spread into the parent: /json/Person/1214ca56-83b9-416f-8536-fa953308429b?prefetch=*&spread=*. As can be seen below, teamName and region are now spread into the enclosing object.

```
{
    firstName: 'john',
    lastName: 'doe'
    teamName: "municipal waste cleanup",
    code: "SFO"
}
```

Spread can also be used to finely control which prefetched fields are spread. For instance, if the Employee had two reference fields, 'team' and 'location', the techniques herein could allow specifying that only team is spread: /json/Person/1214ca56-83b9-416f-8536-fa953308429b?prefetch=*&spread=team. As you can see below, location has been prefetched but not spread.

```
{
    firstName: 'john',
    lastName: 'doe'
    teamName: "municipal waste cleanup",
    code: "SFO"
    location:{
        city: "san francisco",
        state: "ca"
    }
}
```

Regarding breadth and depth herein, reference prefetching allows for specifying the depth of prefetching. That is, one can specify a prefetch depth (how many object references are pursued) as well as a breadth (how many array items are prefetched in the case of array references). For instance, suppose that a product type exists, and that the product type contains an array of sellers, and a status (as shown above). However, assume that seller is a type, that is itself referenced from a product. One can then make this API call to GET/json/shopzilla/shoppingcart/1214ca56-83b9-416f-8536-fa953308429b?prefetch=true?breadth=1&depth=2. This will result in one array product being prefetched (breadth=1) into any array, such as in the breadth and depth limiting example below.

```
{
    lastUpdated:"04:19:21:13 06/12/2021"
    products: [{name:foo, cost:0.99, status: "available", sellers: [{ }]}]
    total: 15.32
}
```

Furthermore, it can be seen that the content of the seller array has not been filled, because the depth=2 parameter prevents the prefetching of seller content (the products object, and the seller array have already been prefetched). Also note that the seller array contains only one object (breadth=1).

To update simple fields and references, objects may be updated using JSON patching. For example, this Merge Patch tells the server to change the total field to 20 (updating a single field):

```
{
    total: 20.00
}
```

The platform herein can also update reference fields. For instance, this is a Merge Patch that can be PATCHed to /json/shopzilla/shoppingcart/1214ca56-83b9-416f-8536-fa953308429b, which will update the total, and point the product to a different product object:

```
{
    product: "fdd3bed-126b-4ee9-a513-ae5f856946fe"
    total: 15.32
}
```

Note that Patches cannot be applied to fields that were reference-prefetched such as products, unless the update is a valid reference (as in the first example above). For instance, the following JSON Merge Patch will fail because products is a reference field (i.e., prefetched references cannot be updated):

```
{
    lastUpdated:"SOME NEW DATE"
    products: [{name:foo, cost:0.99, status: "available", sellers: [{name: Seller1}, {name: Seller2}]}]
    total: "SOME NEW PRICE"
}
```

If one wishes to update the products array, they must keep in mind that products is an array of product objects located at /json/shopzilla/product. To add an item to the array, we can use an RFC 6902 JSON Patch which must be PATCHed to the
"fdd3bed-126b-4ee9-a513-ae5f856946fe"
That is, to add an element to an array:

```
[
    { "op": "add", "path": "/products/-", "value": "fdd3bed-126b-4ee9-a513-ae5f856946fe" }
]
```

On the other hand, to empty products array in /json/obj/shoppingcart/1214ca56-83b9-416f-8536-fa953308429b, the following patch can be used (this patch will fail):

```
[
    { "op": "replace", "path": "/products", "value": [ ]}
]
```

According to the techniques herein, the JSON store can act as a facade for values that are stored in other systems. For example, an illustrative system herein may support marking certain fields as "secrets". A secret field is stored in vault and is never actually placed into a solution or JSON Store. The JSON store will just store an ID of the secret stored in the vault. However, clients with sufficient privileges can read fields from the json store that are secret. Based on the RBAC, the JSON Store will pull a secret in the realtime from the vault and return in data.

For security reasons, a solution developer should not be able to store a secret in a solution. This is because a solution is a file containing type and code artifacts, and will be potentially stored in not-so-secure storage engines or any other Solution Registry. With this in mind, solution developers are expected to create/update the secrets out of band.

On the other hand, tenants may always call the JSON store API to manage secrets. In addition to marking certain fields as secret, there is a system solution in an illustrative embodiment which provides a "Secret" Object Type which has fields like—name of secret, value of secret, expiry datetime, etc. Only value is marked as a secure field, and will be stored in vault, while maintaining its reference in a Secret object. Solution developers will be allowed to ask for reference to a secret object as part of subscription requirements.

Notably, in certain embodiments, the JSON Store provides a data model for RBAC via a system solution. This data model makes no prescription as to how it is used to enforce RBAC. It simply records facts about who is allowed what. The permission model is designed so that permissions can be assigned to any kind of resource (be it a JSON store object or a rest/http endpoint). For example the information could be used by a REST proxy to enforce the http permission kind.

The illustrative RBAC package provides three core types: permissions, roles, and roleAssignments.

A "permission" is a combination of particular kind, and access actions along with its context. An example permission on a type of object in the json store may be seen below:

```
{
    name: can_edit_dashboard,
    displayName: "Can Edit Dashboard",
    kind: jsonStore,
    actions: [{
        verbs: [create, update],
        context: {
            solution: visualization,
            type: dashboard
        }
    }]
}
```

As an example permission on an http path (a REST resource):

```
{
    name: can_launch_investigation,
    displayName: "Can Launch Investigation",
    kind: http,
    actions: [{
        verbs: [PUT, POST],
        context: {
            path: /investigation,
            endpoint: <customer>.observe.appdynamics.com/ext/securityboss
        }
    }]
}
```

As an example permission on a set of data, identified by tags:

```
{
    name: qa_observerer,
    displayName: "Can see read data from QA cluster",
    kind: tags,
    actions: [{
        verbs: [read],
        context: {
            tags: [qa_logs, qa_cluster4_logs]
        }
    }]
}
```

A "role" is a name for a set of permissions. This could be defined at solution, account, or tenant layer. For example:

```
{
    name: security_investigator,
    displayName: "Security Investigator",
    permissions: [
        investigation:can_launch_investigation,
        investigation:can_close_investigation,
        investigation:can_assign_investigators,
        investigation:can_add_asset_toInvestigation
    ]
}
```

Regarding "roleAssignments", an assignment is simply a link between a user (or group), and a role. Assignments happen at the tenant level. But it can also be defined at the account level. Role assignments can be used in a solution package to assign a role (defined in the solution) to an existing group.

Note that solution packages are not allowed to include role assignments that are automatically invoked. There must be an intermediation process invoked when a solution is installed in the cell that prompts the installer to accept or reject any role assignments proposed in the solution. The person subscribing to the solution can be asked to "accept all" or cherry pick the proposed assignments. Essentially the solution has recommendations and the subscriber is popped to a screen that allows them to easily accept or modify the proposal.

As an example:
{as signedTo: {type: user, identity: fred@coke.com}, assignedRoles:[investigation: security_investigator, visualization: dashboard_admin]}
{as signedTo: {type: group, identity: "appdynamics.defaultgroups.poweruser"}, assignedRoles: [investigation: security_investigator, visualization: dashboard_admin] }

When a user is trying to create an object of a type 'type_X', the below set of actions will need to be done to evaluate whether the user is allowed to act on it:
1. Find the groups which the user is part of (e.g., extracting this information from a JWT or synced in JSON Store from IDP).
2. Find the roles assigned to the user and the assigned groups.
3. Get permissions with 'resources' containing 'type_X' and 'verbs' containing 'create'.
4. Filter the roles found in step 2 which has permissions found in step 3.
5. If there is even a single role, object creation on 'type_X' will be allowed.

Notably, in addition to these three core types, the RBAC solution herein may manage two more types:
user—This type will include the emailId of the logged in user, so that admin can refer this user in the role assignment or group assignment.
group—This type will try to group one or more users/groups into a collection, so that the collection could be collectively assigned a role in the roleAssignments table.

Fine-grained RBAC may be available herein through object ownership. That is, fine-grained RBAC requires that the provenance of every object is known. To that end, every object in the JSON store may be created with an internal field called '_owner' that records the identity of the creator of the document. The presence of this data in every record allows the JSON store know what objects belong to whom:

```
_owner:{
    id: janedoe@coke.com,
    type: tenantUser
}
```

However what might not be self-evident is that there are cases when the owner isn't an end-user. These correspond to the solution and tenant layers in the JSON store. In cases of objects included in a solution the owner may look like this:

```
_owner:{
    id: developer1@appdynamics.com,
    type: developer
}
```

Also, in cases where the object was created by a tenant service account, it may look like this:

```
_owner:{
    id: <tenant_id>,
    type: tenantService
}
```

Apart for storing owner info, each object may store level information, which would define what is the level of object in the level hierarchy. One such example of the level of a solution level object is as below (which would help in allowing co-developers in same developer account to edit solution level data—similarly for the tenant level objects):

```
_level:{
    layer: 'solution',
    id: 'visualization'
}
```

Lastly, for object sharing, the _owner field and _level field is sufficient to allow the json store to handle the common use case of showing a user her own content. However, in the cases where the user wants to share content with another user or group, the techniques herein may also include within each object a _share field:

```
_share:[
    { assignedTo: { type:user, identity:fred@coke.com},
assignedRoles: [investigation:security_investigator, visualization: dashboard_admin]}
```

-continued

```
{ assignedTo: { type:group, identity:"appdynamics.rbac.poweruser"},
assignedRoles: [investigation: security_investigator, visualization:
dashboard_admin]}
]
```

Figure 24:
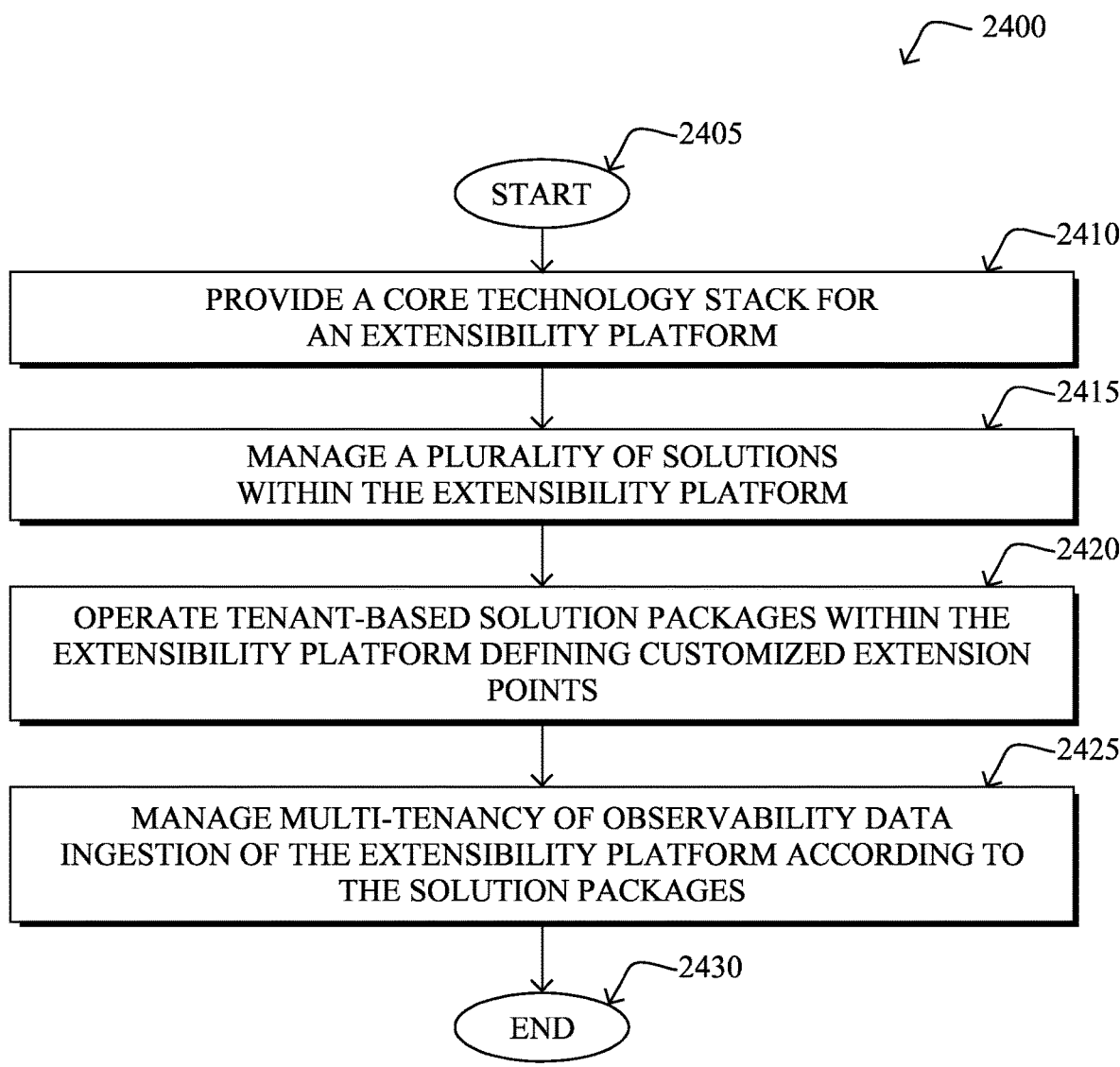
FIG. 24 illustrates an example simplified procedure for implementing an extensibility platform.

FIG. 24 illustrates an example simplified procedure for implementing an extensibility platform in accordance with one or more embodiments described herein. For example, a non-generic, specifically configured device (e.g., device 200) may perform procedure 2400 by executing stored instructions (e.g., extensibility platform process 248). The procedure 2400 may start at step 2405, and continues to step 2410, where, as described in greater detail above, a process may include providing a core technology stack for an extensibility platform. The extensibility platform may include a multi-celled architecture and the process may further include synchronizing a local copy of the one or more globally shared core solution packages across each globally distributed cell of the multi-celled architecture; and maintaining, within each globally distributed cell of the multi-celled architecture, one or more specific tenant-based solution packages based on one or more specific tenants corresponding to that globally distributed cell.

At step 2415, as detailed above, the process may include managing a plurality of solution packages within the extensibility platform that are separated from the core technology stack, each of the plurality of solution packages defining a data model, access to that data model, and dependencies for that data model, wherein the plurality of solution packages have one or more globally shared core solution packages.

As noted above, at step 2420 the process may include operating, according to one or more tenant-based solution packages within the plurality of solution packages within the extensibility platform, the one or more tenant-based solution packages defining corresponding tenant-specified models and configurations for soft-coded customized extension points for the extensibility platform. The one or more tenant-based solution packages may include one or more container images. The process may, in various embodiments, include receiving configuration of tenant-specific iconography as part of the one or more tenant-based solution packages; and displaying the tenant-specific iconography within a tenant-specific interface according to the one or more tenant-based solution packages. The soft-coded customized extension points may be selected from a group consisting of: a model-based extension point defining one or more of entity types, association types, and metric types; a pre-ingestion-based extension point defining one or more of collection configuration, agent configuration, and pre-ingestion transformations; a processing-based extension point defining one or more of mapping rules and processing rules; and a consumption-based extension point defining one or more of interface configuration, report configuration, and webhook configuration.

Further to the detailed disclosure, the process may include managing multi-tenancy of an observability data ingestion pipeline of the extensibility platform according to the plurality of solution packages including the soft-coded customized extension points for the extensibility platform. In various embodiments, managing the multi-tenancy of the observability data ingestion pipeline may include obtaining observability data according to large-scale data collection; mapping the observability data to a plurality of entities according to models as defined within the plurality of solution packages, and/or processing the observability data for each tenant of the extensibility platform according to the core technology stack, the one or more globally shared core solution packages, and the one or more tenant-based solution packages including their soft-coded customized extension points for that tenant. The observability data ingestion pipeline may be based on metrics, entries, logs, and trace.

The process may further include determining an object type of particular traffic within the observability data ingestion pipeline and/or routing the particular traffic within the extensibility platform to a specific object store based on the object type of the particular traffic. The process may also include providing an object layering system based on a global layer of settings and fields and global layer of applications and solution constructs, an account layer of multi-cell tenants, a tenant layer, and/or a user layer. The object layering system may provide hierarchical modification control between layers.

Additionally, the process may include providing subscription-based access for tenants to subscribe to registered third-party solution packages of the extensibility platform. The process may include grouping entities for composite observability data processing. Further, the process may include processing queries into observability data and/or entities based on the observability data ingestion pipeline. The process may also include providing processed assessments of a status of entities based on the observability data ingestion pipeline. In various embodiments, the process may include processing custom logic provided as a container image to expose a service interface for execution within a controlled sandbox of the extensibility platform. Further, the process may include, evolving the core technology stack for the extensibility platform without affecting the plurality of solution packages within the extensibility platform.

Furthermore, the process may include, updating one or more of the plurality of solution packages within the extensibility platform without affecting the core technology stack for the extensibility platform. In various embodiments, the process may include receiving updates for one or more of the plurality of solution packages from any of a first-party developer, a second-party developer, or a third-party developer.

The simplified procedure 2400 may then end in step 2430, notably with the ability to continue managing solution packages, operating tenant-based solution packages, and/or managing multi-tenancy of observability ingestion additionally accounting for any updates. Other steps may also be included generally within procedure 2400.

It should be noted that while certain steps within procedure 2400 may be optional as described above, the steps shown in FIG. 24 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms implementing an extensibility platform. The extensibility platform may provide a solution packaging system that allows for data-type dependencies. As such, the described techniques provide a mechanism that facilitates coordination of data handling when adapting or extending solutions operating across distributed systems. In particular, the techniques may accommodate a centralized development process utilizing the data-type dependencies allowing modules to have dependencies like traditional code/packaging systems while simultaneously allowing the models to define their data model, access to that data model, packaging of objects conforming to other data solution models, etc.

Figure 25:
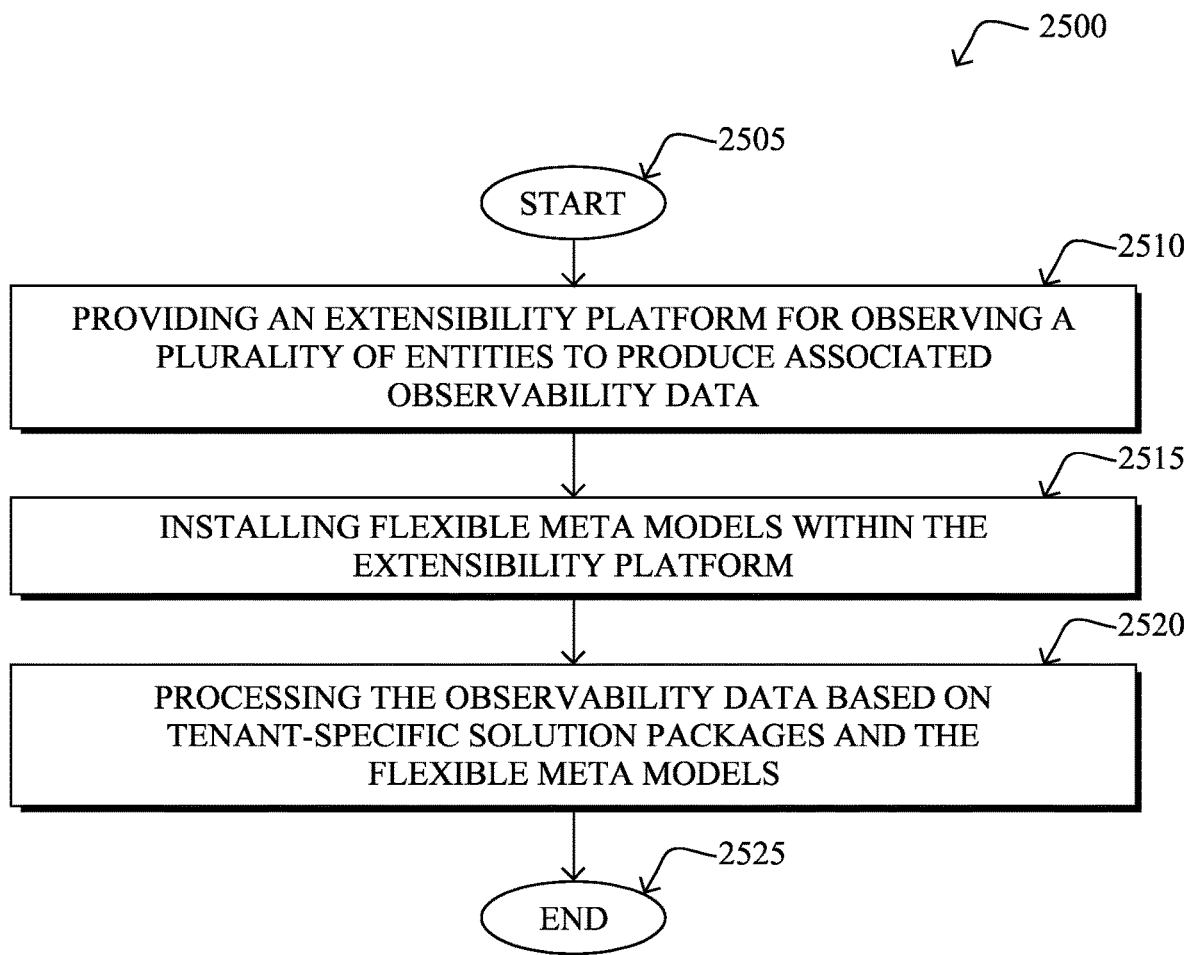
FIG. 25 illustrates an example simplified procedure for utilizing Flexible Meta Model (FMM) for an extensibility platform.

FIG. 25 illustrates an example simplified procedure for utilizing FMM for an extensibility platform in accordance with one or more embodiments described herein. For example, a non-generic, specifically configured device (e.g., device 200,) may perform procedure 2500 by executing stored instructions (e.g., extensibility platform process 248). The procedure 2500 may start at step 2505, and continues to step 2510, where, as described in greater detail above, a process may include providing an extensibility platform for observing a plurality of entities to produce associated observability data, the extensibility platform configured in part by one or more tenant-specific solution packages. The observability data may comprise metrics, events, spans, and directional associations. In various embodiments, the observability data may comprise metrics, events, logs, and traces.

At step 2515, as detailed above, the process may include installing a plurality of flexible meta models within the extensibility platform, wherein the plurality of flexible meta models define the plurality of entities, a globally unique identifier of each of the plurality of entities, a type of each of the plurality of entities, relationships between the plurality of entities, kinds of observability data, and dependencies among the plurality of flexible meta models. In various embodiments, the relationships between the plurality of entities may comprise how one entity is hierarchically related to another entity. In addition, the relationships between the plurality of entities may comprise how one entity interacts with another entity.

Entity types may further comprise one or more of: a parent type, a metric type, an event type, or an association type. The type of each of the plurality of entities may provide validation constraints to be applied to instances of that type of entity to ensure attributes of an entity adhere to its entity kind, and to restrict metric types that are allowed to be associated with that type of entity. A particular entity may be defined as an aggregation of a particular plurality of entities of a particular type. The plurality of entities may be selected from a group consisting of a service, a service instance, a business transaction, a host, a representational state transfer endpoint, a container, a disk, a thread, a java virtual machine, a topic, a database, a router, and a cache.

Kinds of observability data may be defined as one of either a metric, an event, or a trace. In some examples, kinds of observability may be statically set within the extensibility platform. The plurality of flexible meta models may be defined within the one or more tenant-specific solution packages. Each flexible meta model of the plurality of flexible meta models may correspond to a particular tenant in a multi-tenant architecture for the extensibility platform.

As noted above, at step 2520 the process may include processing the observability data obtained within the extensibility platform based on the one or more tenant-specific solution packages and the plurality of flexible meta models, wherein the observability data is associated to the plurality of entities based on external references to corresponding globally unique identifiers of the plurality of entities, and wherein the observability data is sourced by a plurality of sources configured to populate, based on a corresponding observed entity, one or more attribute fields and one or more tenant-specified tag fields according to that corresponding observed entity.

The process may also include installing user interface artifacts within the extensibility platform. Further, the process may include locating the plurality of flexible meta models according to a manifest within one or more of the one or more tenant-specific solution packages. Furthermore, the process may include processing, from a particular flexible meta model, an extension that either adds one or more attributes or specific observability data to an existing entity type.

In some embodiments, the process may include determining a particular source of particular observability data. Determining the particular source may be based on one of a telemetry software developer kit name within a payload or an agent type within metadata.

The simplified procedure 2500 may then end in step 2525, notably with the ability to continue updating tenant-specific solution package configurations and/or FMMs and processing the observability data obtained based thereupon. Other steps may also be included generally within procedure 2500.

It should be noted that while certain steps within procedure 2500 may be optional as described above, the steps shown in FIG. 25 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms for utilizing FMM for an extensibility platform. In particular, the techniques herein are directed toward a specialized modeling system for Metrics, Events, Logs, and Traces (MELT) data known as "Flexible Metadata Modeling" FMM. These techniques facilitate the interweaving of multiple models in a matrix form, where one dimension is the different artifact types (MELT, processing pipeline configs, user interface configurations, etc.) and the other dimension is the domain (e.g. observability intelligence platforms, container orchestration engines, end user monitoring, etc.). Interweaving refers to the fact that at any point in that matrix there can be safe references to artifacts across both dimensions. The extensibility platform may provide a solution packaging system that allows for data-type dependencies. As such, the described techniques provide a mechanism that facilitates coordination of data handling when adapting or extending solutions operating across distributed systems. In particular, the techniques may accommodate a centralized development process utilizing the data-type dependencies allowing modules to have dependencies like traditional code/packaging systems while simultaneously allowing the models to define their data model, access to that data model, packaging of objects conforming to other data solution models, etc.

Figure 26:
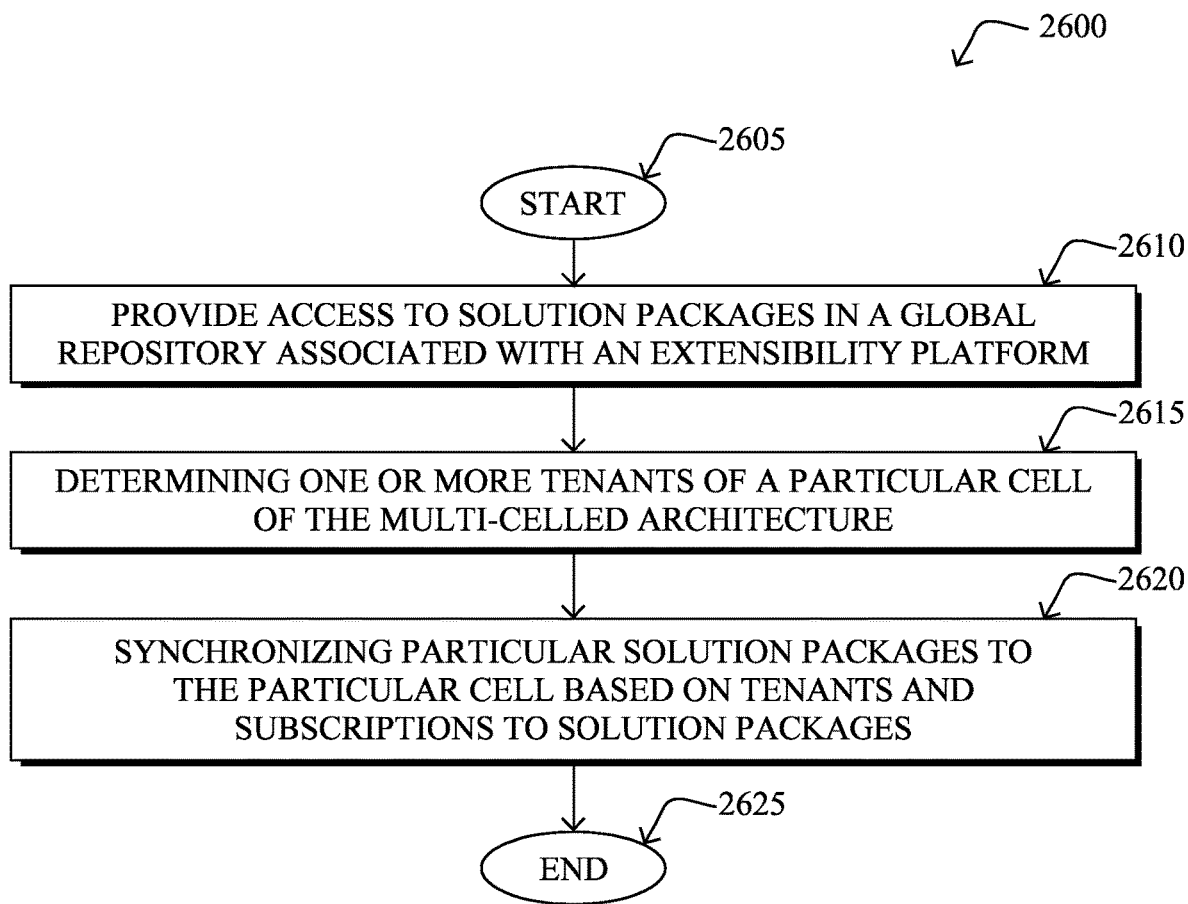
FIG. 26 illustrates an example simplified procedure for utilizing tenant-specific solution subscriptions for an extensibility platform, in accordance with one or more embodiments described herein.

In closing, FIG. 26 illustrates an example simplified procedure for utilizing tenant-specific solution subscriptions for an extensibility platform, in accordance with one or more embodiments described herein. For example, a non-generic, specifically configured device (e.g., device 200) may perform procedure 2600 by executing stored instructions (e.g., extensibility platform process 248). The procedure 2600 may start at step 2605, and continues to step 2610, where, as described in greater detail above, a process may include providing access to a plurality of solution packages in a global repository associated with an extensibility platform, wherein the extensibility platform is a multi-celled architecture, the plurality of solution packages having specific configurations for execution of the extensibility platform. The plurality of solution packages may be established into the global repository by one or more of first-party developers, second-party developers, or third-party developers.

The specific configurations may comprise a dashboard. The dashboard may comprise a user-specified dashboard. In various embodiments, one or more of the specific configurations may comprise tenant-specific configurations. In addition, one or more of the specific configurations may define flexible meta models. In some instances, one or more of the specific configurations may define a data ingestion pipeline for the extensibility platform. The global repository may comprise a JavaScript Object Notification store.

At step 2615, as detailed above, the process may include determining one or more tenants of a particular cell of the multi-celled architecture. The particular cell may comprise a plurality of data stores, and wherein synchronizing the one or more particular solution packages of the plurality of solution packages from the global repository to the particular cell is based on any of the plurality of data stores requiring the one or more particular solution packages.

In various embodiments, determining one or more tenants may be based on recognition of an identity principal of a given user of the particular cell. The one or more tenants may comprise one of either a user or an organization.

As noted above, at step 2620 the process may include synchronizing one or more particular solution packages of the plurality of solution packages from the global repository to the particular cell based on one or more tenants of the particular cell and subscriptions of the one or more tenants to the one or more particular solution packages. The one or more particular solution packages may define type metadata that specify tenant-specific fields and associated processing of the tenant-specific fields.

The process may include storing a plurality of model layers consisting of hierarchically mutable settings; and generating a layered model as a particular solution package of the plurality of solution packages based on aggregating tiered fragments of the plurality of model layers according to the one or more tenants of the particular cell. The plurality of model layers may comprise a global layer, an account layer, a tenant layer, and a user layer.

In addition, the process may include preventing activation of invalid artifacts within the plurality of solution packages based on a two-phase commit process. Access may be provided via a repository application programming interface. The process may include performing role-based access control against objects within the specific configurations. In some examples, the process may include storing secrets on the global repository that remain unshared across tenants and are separate from the plurality of solution packages.

The simplified procedure 2600 may then end in step 2625, notably with the ability to continue synchronizing particular solution packages from the global repository to the particular cell based on updates to tenants of the particular cell and/or updates to the subscriptions of the one or more tenants to the one or more particular solution packages. Other steps may also be included generally within procedure 2600.

It should be noted that while certain steps within procedure 2600 may be optional as described above, the steps shown in FIG. 26 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 2400, 2500, and/or 2600 are described separately, certain steps from each procedure may be incorporated into each other procedure, and the procedures are not meant to be mutually exclusive.

The techniques described herein, therefore, introduce mechanisms tenant-specific solution subscriptions for an extensibility platform are described herein. In particular, the techniques herein are directed toward a JavaScript Object Notation (JSON) store that allows developers to package configs in a prescriptive manner called a "solution". Solutions are synchronized from a global solution repository into the JSON store of each cell. In the cell, configs are consumed by services through the uniform JSON store application programming interface (API). The described techniques provide a mechanism that facilitates coordination of data handling when adapting or extending solutions operating across distributed systems. In particular, the techniques may accommodate a centralized development process utilizing the data-type dependencies allowing modules to have dependencies like traditional code/packaging systems while simultaneously allowing the models to define their data model, access to that data model, packaging of objects conforming to other data solution models, etc.

Illustratively, the techniques described herein may be performed by hardware, software, and/or firmware, such as in accordance with the illustrative extensibility platform process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: providing, by a process, access to a plurality of solution packages in a global repository associated with an extensibility platform, wherein the extensibility platform is a multi-celled architecture, the plurality of solution packages having specific configurations for execution of the extensibility platform; determining, by the process, one or more tenants of a particular cell of the multi-celled architecture; and synchronizing, by the process, one or more particular solution packages of the plurality of solution packages from the global repository to the particular cell based on one or more tenants of the particular cell and subscriptions of the one or more tenants to the one or more particular solution packages.

In one embodiment, the method further comprises storing a plurality of model layers consisting of hierarchically mutable settings; and generating a layered model as a particular solution package of the plurality of solution packages based on aggregating tiered fragments of the plurality of model layers according to the one or more tenants of the particular cell. In one embodiment, the plurality of model layers comprise a global layer, an account layer, a tenant layer, and a user layer. In one embodiment, the method further comprises preventing activation of invalid artifacts within the plurality of solution packages based on a two-phase commit process.

In one embodiment, the particular cell comprises a plurality of data stores, and wherein synchronizing the one or more particular solution packages of the plurality of solution packages from the global repository to the particular cell is based on any of the plurality of data stores requiring the one or more particular solution packages. In one embodiment, determining one or more tenants is based on recognition of an identity principal of a given user of the particular cell. In one embodiment, the one or more tenants comprise one of either a user or an organization.

In one embodiment, the specific configurations comprise a dashboard. In one embodiment, the dashboard comprises a user-specified dashboard. In one embodiment, one or more of the specific configurations comprise tenant-specific configurations. In one embodiment, the plurality of solution packages is established into the global repository by one or more of first-party developers, second-party developers, or third-party developers. In one embodiment, access is provided via a repository application programming interface. In one embodiment, the global repository comprises a JavaScript Object Notification store.

In one embodiment, the method further comprises performing role-based access control against objects within the specific configurations. In one embodiment, one or more of the specific configurations define flexible meta models. In one embodiment, the method further comprises storing secrets on the global repository that remain unshared across tenants and are separate from the plurality of solution packages. In one embodiment, one or more of the specific configurations define a data ingestion pipeline for the extensibility platform. In one or more embodiment, the one or more particular solution packages define type metadata that specify tenant-specific fields and associated processing of the tenant-specific fields.

According to the embodiments herein, an illustrative tangible, non-transitory, computer-readable medium herein may have computer-executable instructions stored thereon that, when executed by a processor on a computer, may cause the computer to perform a method comprising: providing access to a plurality of solution packages in a global repository associated with an extensibility platform, wherein the extensibility platform is a multi-celled architecture, the plurality of solution packages having specific configurations for execution of the extensibility platform; determining one or more tenants of a particular cell of the multi-celled architecture; and synchronizing one or more particular solution packages of the plurality of solution packages from the global repository to the particular cell based on one or more tenants of the particular cell and subscriptions of the one or more tenants to the one or more particular solution packages.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: provide access to a plurality of solution packages in a global repository associated with an extensibility platform, wherein the extensibility platform is a multi-celled architecture, the plurality of solution packages having specific configurations for execution of the extensibility platform; determine one or more tenants of a particular cell of the multi-celled architecture; and synchronize one or more particular solution packages of the plurality of solution packages from the global repository to the particular cell based on one or more tenants of the particular cell and subscriptions of the one or more tenants to the one or more particular solution packages.

While there have been shown and described illustrative embodiments above, it is to be understood that various other adaptations and modifications may be made within the scope of the embodiments herein. For example, while embodiments are described herein with respect to certain types of applications in particular, such as the observability intelligence platform, the techniques are not limited as such and may be used with any computer application, generally, in other embodiments. For example, as opposed to observability and/or telemetry data, particularly as related to computer networks and associated metrics (e.g., pathways, utilizations, etc.), other application platforms may also utilize the general extensibility platform described herein, such as for other types of data-based user interfaces, other types of data ingestion and aggregation, and so on, may also benefit from the extensibility platform described herein.

Moreover, while specific technologies, languages, protocols, and associated devices have been shown, such as Java, TCP, IP, and so on, other suitable technologies, languages, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
providing, by a process, access to a plurality of solution packages in a global repository associated with an extensibility platform, wherein the extensibility platform is a multi-celled architecture, the plurality of solution packages having specific configurations for execution of the extensibility platform;
determining, by the process, one or more tenants of a particular cell of the multi-celled architecture; and
synchronizing, by the process, one or more particular solution packages of the plurality of solution packages from the global repository to the particular cell based on one or more tenants of the particular cell and subscriptions of the one or more tenants to the one or more particular solution packages.

2. The method as in claim 1, further comprising:
storing a plurality of model layers consisting of hierarchically mutable settings; and
generating a layered model as a particular solution package of the plurality of solution packages based on aggregating tiered fragments of the plurality of model layers according to the one or more tenants of the particular cell.

3. The method as in claim 2, wherein the plurality of model layers comprise a global layer, an account layer, a tenant layer, and a user layer.

4. The method as in claim 1, further comprising:
preventing activation of invalid artifacts within the plurality of solution packages based on a two-phase commit process.

5. The method as in claim 1, wherein the particular cell comprises a plurality of data stores, and wherein synchronizing the one or more particular solution packages of the plurality of solution packages from the global repository to the particular cell is based on any of the plurality of data stores requiring the one or more particular solution packages.

6. The method as in claim 1, wherein determining one or more tenants is based on recognition of an identity principal of a given user of the particular cell.

7. The method as in claim 1, wherein the one or more tenants comprise one of either a user or an organization.

8. The method as in claim 1, wherein the specific configurations comprise a dashboard.

9. The method as in claim 8, wherein the dashboard comprises a user-specified dashboard.

10. The method as in claim 1, wherein one or more of the specific configurations comprise tenant-specific configurations.

11. The method as in claim 1, wherein the plurality of solution packages are established into the global repository by one or more of first-party developers, second-party developers, or third-party developers.

12. The method as in claim 1, wherein access is provided via a repository application programming interface.

13. The method as in claim 1, wherein the global repository comprises a JavaScript Object Notification store.

14. The method as in claim 1, further comprising:
performing role-based access control against objects within the specific configurations.

15. The method as in claim 1, wherein one or more of the specific configurations define flexible meta models.

16. The method as in claim 1, further comprising:
storing secrets on the global repository that remain unshared across tenants and are separate from the plurality of solution packages.

17. The method as in claim 1, wherein one or more of the specific configurations define a data ingestion pipeline for the extensibility platform.

18. The method as in claim 1, wherein the one or more particular solution packages define type metadata that specify tenant-specific fields and associated processing of the tenant-specific fields.

19. A tangible, non-transitory, computer-readable medium having computer-executable instructions stored thereon that, when executed by a processor on a computer, cause the computer to perform a method comprising:
providing access to a plurality of solution packages in a global repository associated with an extensibility platform, wherein the extensibility platform is a multi-celled architecture, the plurality of solution packages having specific configurations for execution of the extensibility platform;
determining one or more tenants of a particular cell of the multi-celled architecture; and
synchronizing one or more particular solution packages of the plurality of solution packages from the global repository to the particular cell based on one or more tenants of the particular cell and subscriptions of the one or more tenants to the one or more particular solution packages.

20. An apparatus, comprising:
one or more network interfaces to communicate with a network;
a processor coupled to the one or more network interfaces and configured to execute one or more processes;
a memory configured to store a process that is executable by the processor, the process, when executed, configured to:
provide access to a plurality of solution packages in a global repository associated with an extensibility platform, wherein the extensibility platform is a multi-celled architecture, the plurality of solution packages having specific configurations for execution of the extensibility platform;
determine one or more tenants of a particular cell of the multi-celled architecture; and
synchronize one or more particular solution packages of the plurality of solution packages from the global repository to the particular cell based on one or more tenants of the particular cell and subscriptions of the one or more tenants to the one or more particular solution packages.

* * * * *